United States Patent
Yasumoto et al.

(10) Patent No.: US 10,822,446 B2
(45) Date of Patent: Nov. 3, 2020

(54) MODIFIED CONJUGATED DIENE POLYMER, MODIFIED CONJUGATED DIENE POLYMER COMPOSITION, TIRE, AND METHOD FOR PRODUCING MODIFIED CONJUGATED DIENE POLYMER

(71) Applicant: Japan Elastomer Co., Ltd., Tokyo (JP)

(72) Inventors: Atsushi Yasumoto, Tokyo (JP); Hideki Yamasaki, Tokyo (JP)

(73) Assignee: Japan Elastomer Co., Ltd., Tokyo (JP)

( * ) Notice: Subject to any disclaimer, the term of this patent is extended or adjusted under 35 U.S.C. 154(b) by 32 days.

(21) Appl. No.: 16/335,584

(22) PCT Filed: Sep. 1, 2017

(86) PCT No.: PCT/JP2017/031666
§ 371 (c)(1),
(2) Date: Mar. 21, 2019

(87) PCT Pub. No.: WO2018/056025
PCT Pub. Date: Mar. 29, 2018

(65) Prior Publication Data
US 2020/0024383 A1  Jan. 23, 2020

(30) Foreign Application Priority Data

Sep. 23, 2016  (JP) ................... 2016-185937

(51) Int. Cl.
| C08F 236/10 | (2006.01) |
|---|---|
| C08L 9/06 | (2006.01) |
| C08K 5/00 | (2006.01) |
| C08K 3/013 | (2018.01) |
| B60C 1/00 | (2006.01) |
| B60C 11/00 | (2006.01) |

(52) U.S. Cl.
CPC .......... *C08F 236/10* (2013.01); *B60C 1/0016* (2013.01); *B60C 11/0008* (2013.01); *C08K 3/013* (2018.01); *C08K 5/0025* (2013.01); *C08L 9/06* (2013.01); *B60C 2011/0025* (2013.01)

(58) Field of Classification Search
CPC . C08F 236/10; C08L 9/06; C08K 5/00; C08K 3/013; B60C 1/00; B60C 11/00
USPC ....................................................... 524/572
See application file for complete search history.

(56) References Cited

U.S. PATENT DOCUMENTS

| 2008/0319151 A1 | 12/2008 | Oshima |
| 2009/0203843 A1 | 8/2009 | Fukuoka et al. |
| 2010/0210760 A1 | 8/2010 | Kitagawa et al. |
| 2011/0172344 A1 | 7/2011 | Yoshida et al. |
| 2013/0267649 A1 | 10/2013 | Sasajima et al. |
| 2014/0213721 A1 | 7/2014 | Yamada et al. |
| 2014/0371383 A1 | 12/2014 | Hayata et al. |
| 2018/0162167 A1 | 6/2018 | Kyo et al. |

FOREIGN PATENT DOCUMENTS

| EP | 0924256 A1 | 6/1999 |
| EP | 2003146 A2 | 12/2008 |
| EP | 2749575 A1 | 7/2014 |
| JP | 2000-290465 A | 10/2000 |
| JP | 2001-131230 A | 5/2001 |
| JP | 2003-171418 A | 6/2003 |
| JP | 2012-172077 A | 9/2012 |
| JP | 2013-213162 A | 10/2013 |
| JP | 2014-055264 A | 3/2014 |
| JP | 2014177520 A | * 9/2014 |
| TW | 201313745 A | 4/2013 |
| TW | 201708273 A | 3/2017 |
| WO | 2007/114203 A1 | 10/2007 |
| WO | 2010/044252 A1 | 4/2010 |
| WO | 2012/086496 A1 | 6/2012 |
| WO | 2013/035589 A1 | 3/2013 |

OTHER PUBLICATIONS

International Search Report issued in corresponding International Patent Application No. PCT/JP2017/031666 dated Oct. 10, 2017.
International Preliminary Report on Patentability issued in corresponding International Patent Application No. PCT/JP2017/031666 dated Mar. 26, 2019.
Supplementary European Search Report issued in counterpart European Patent Application No. 17852804.8 dated Aug. 26, 2019.

\* cited by examiner

*Primary Examiner* — Deve V Hall
(74) *Attorney, Agent, or Firm* — Morgan, Lewis & Bockius LLP

(57) ABSTRACT

A modified conjugated diene polymer satisfying the following conditions (I) to (IV):

(I) at least two peaks are observed in a molecular weight distribution curve;

(II) when a peak of the highest molecular weight is defined as a peak (B), a peak of the largest peak area except for the peak (B) is defined as a peak (T), a peak molecular weight of the peak (B) is from 500,000 to 2,500,000 and a peak molecular weight of the peak (T) is from 150,000 to 600,000;

(III) an area of the peak (T) is from 30% to 80% and a total value of an area of the peak (B) and the area of the peak (T) is 65% or more; and (IV) a proportion of a modified polymer chain(s) in a region ranging from a low-molecular-weight side to a point of 5% cumulative area is from 60% to 99%.

13 Claims, No Drawings

MODIFIED CONJUGATED DIENE POLYMER, MODIFIED CONJUGATED DIENE POLYMER COMPOSITION, TIRE, AND METHOD FOR PRODUCING MODIFIED CONJUGATED DIENE POLYMER

TECHNICAL FIELD

The present invention relates to a modified conjugated diene polymer, a modified conjugated diene polymer composition, a tire, and a method for producing a modified conjugated diene polymer.

BACKGROUND ART

Environmental considerations including reduction of carbon dioxide emissions have become a social demand in recent years. Specifically, higher fuel efficiency has been increasingly demanded for automobiles.

In such current circumstances, development of materials with low rolling resistance (low hysteresis loss) has been desired for materials of automobile tires, in particular, of tire treads, which are to come into contact with the ground.

For safety, on the other hand, development of materials with superior wet skid resistance and abrasion resistance enough for practical use has been desired.

To achieve these properties, various modified conjugated diene polymers have been proposed. For example, a modified conjugated diene polymer has been proposed as a rubber for automobile tires, the modified conjugated diene polymer obtained by modifying an end of a conjugated diene polymer with a compound having an amino group and an alkoxysilyl group (e.g., see Patent Literatures 1 to 4).

Carbon black, silica, and so forth have been conventionally used as a reinforcing filler for tire treads.

Use of silica is advantageous in that low hysteresis loss and wet skid resistance can be achieved to be enhanced. However, in contrast to the surface of carbon black being hydrophobic, the surface of silica is hydrophilic, and hence silica has disadvantages of low affinity for conjugated diene rubber and poor dispersibility as compared with carbon black, and needs to further addition of a silane coupling agent or the like to improve the dispersibility or providing bonds between silica and conjugated diene rubber.

Attempts have been recently made to reduce hysteresis loss by introducing a functional group having affinity for or reactivity to silica to an active end of a rubbery polymer to improve the dispersibility of silica in the rubbery polymer and further capping the modified polymer end portion through bonding to a silica particle.

For example, Patent Literature 1 proposes, as a rubber for automobile tires, the modified diene rubber obtained by reacting an end of a conjugated diene polymer with an amino group-containing alkoxysilane, and a composition of the modified diene rubber and silica.

Patent Literature 2 proposes a modified diene rubber obtained by subjecting a polymer active end and a polyfunctional silane compound to coupling reaction.

On the other hand, introduction of an amino group, which has affinity for carbon black, to an end of polymerization initiation of a rubbery polymer is known to allow carbon black to capture thereon the polymerization-starting end, which has high motility, leading to reduction of hysteresis loss.

Patent Literature 3 proposes a technique of introducing an amino group, which has high affinity for carbon black, to a starting end of a rubbery polymer and introducing an amino group-containing alkoxysilane to a terminating end to allow both silica and carbon black to capture the ends of the rubbery polymer, by which further reduction of hysteresis loss can be achieved for a modified rubbery polymer composition produced by using such a modified rubbery polymer.

Moreover, Patent Literature 4 proposes a modified conjugated diene polymer having superior balance between low hysteresis loss and wet skid resistance, abrasion resistance enough for practical use, and superior processability in use for automobile tires, and a method for producing the modified conjugated diene polymer, where the method includes: a polymerization step including subjecting a conjugated diene compound or a conjugated diene compound and an aromatic vinyl compound to polymerization or copolymerization with a polymerization initiator containing a compound having a specific structure and having at least one nitrogen atom in the molecule and an organic lithium compound to obtain a conjugated diene polymer having an active end; and a modification step including reacting the conjugated diene polymer with a compound having a specific structure.

CITATION LIST

Patent Literature

Patent Literature 1: Japanese Patent Laid-Open No. 2003-171418
Patent Literature 2: International Publication No. WO 07/114203
Patent Literature 3: Japanese Patent Laid-Open No. 2001-131230
Patent Literature 4: International Publication No. WO 2013/035589

SUMMARY OF INVENTION

Technical Problem

The modified diene rubbers disclosed in Patent Literatures 1 and 2 exhibit effect of reducing hysteresis loss in a composition with silica blended therein; however, the modified diene rubbers still have points to be improved, and the properties are desired to be further improved.

The modified rubbery polymer composition in Patent Literature 3 exhibits even higher effect of reducing hysteresis loss by virtue of the functional group introduced to each end of polymer; however, reaction proceeds between the modifying group at an end of the molecular chain of the modified polymer and an inorganic filler such as silica to increase the viscosity during kneading, which tends to disadvantageously lead to deteriorated processability such as difficulty in kneading and frequent occurrence of roughness or splitting in a sheet in processing into a sheet after kneading.

In addition, the modified conjugated diene polymer in Patent Literature 4 still has points to be improved in order for the modified conjugated diene polymer to stably exhibit superior balance between low hysteresis loss and wet skid resistance.

In summary, various techniques of introducing a modifier to conjugated diene polymer have been previously proposed to attain enhanced fuel-saving performance, and a certain degree of effect has been obtained with respect to fuel-saving performance; however, problems such as deteriorated processability are caused, on the other hand.

In blending silica or the like in polymer in production of tires, when the Mooney viscosity of the polymer is high, homogeneous stress is not applied in kneading, which complicates kneading and deteriorates the dispersibility of the silica. The processability is advantageously improved when the amount of low-molecular-weight components is increased as a countermeasure, but the modifying group concentration decreases to disadvantageously lead to lowered fuel-saving performance.

Therefore, conventional methods, namely, changing a modifier or simple setting of molecular weight cannot achieve fuel-saving performance and processability in combination.

In view of the problems inherent in the conventional techniques, an object of the present invention is to provide a modified conjugated diene polymer which has superior balance between low hysteresis loss and wet skid resistance and abrasion resistance enough for practical use, and exhibits superior processability in use for automobile tires, even in the case of a high modifying group concentration, for example, due to modification of both ends.

Solution to Problem

The present inventors diligently examined and found that a modified conjugated diene polymer having at least two peaks in a molecular weight distribution curve, wherein the molecular weight at a peak (B) of the highest molecular weight and the molecular weight at a peak (T) of the largest peak area except for the peak (B) are each within a specific numerical range, the area of the peak (T) and the total value of the area of the peak (B) and the area of the peak (T) are each within a specific numerical range when the total area of the molecular weight distribution curve is defined as 100%, and the proportion of modified polymer chain(s) in a region ranging from a low-molecular-weight side to a point of 5% cumulative area in the molecular weight distribution curve is within a specific numerical range, exhibits superior balance between low hysteresis loss and wet skid resistance, superior processability, and abrasion resistance enough for practical use in use for automobile tires.

In addition, the present inventors found that a modified conjugated diene polymer which exhibits superior balance between low hysteresis loss and wet skid resistance, superior processability, and abrasion resistance enough for practical use in use for automobile tires can be obtained in a manner such that a polymer having a specific peak of molecular weight is obtained and at least two modifiers are then added to the polymer to obtain a modified conjugated diene polymer, or that a high-molecular-weight conjugated diene polymer and low-molecular-weight conjugated diene polymer having different peak molecular weights are mixed together to obtain polymer chains intended, and the present invention was thus completed.

Specifically, the present invention is as follows.

[1]

A modified conjugated diene polymer satisfying the following conditions (I) to (IV):

(I) at least two peaks are observed in a molecular weight distribution curve obtained from measurement by gel permeation chromatography (GPC);

(II) when a peak of the highest molecular weight is defined as a peak (B), a peak of the largest peak area except for the peak (B) is defined as a peak (T) in the molecular weight distribution curve, a peak molecular weight of the peak (B) is from 500,000 to 2,500,000 and a peak molecular weight of the peak (T) is from 150,000 to 600,000;

(III) an area of the peak (T) is from 30% to 80% and a total value of an area of the peak (B) and the area of the peak (T) is 65% or more when the total area of the molecular weight distribution curve is defined as 100%; and (IV) a proportion of a modified polymer chain in a region ranging from a low-molecular-weight side to a point of 5% cumulative area is from 60% to 99% in the molecular weight distribution curve.

[2]

The modified conjugated diene polymer according to [1], satisfying the following conditions (1) to (4):

(1) at least three peaks are observed in a molecular weight distribution curve obtained from measurement by gel permeation chromatography (GPC);

(2) when a peak of the lowest molecular weight is defined as a peak (A), a peak of the highest molecular weight is defined as a peak (B) in the molecular weight distribution curve, a peak molecular weight of the peak (A) is from 50,000 to 200,000 and a peak molecular weight of the peak (B) is from 500,000 to 2,500,000;

(3) an area of the peak (A) is from 3% to 15% when the total area of the molecular weight distribution curve is defined as 100%; and (4) a proportion of a modified polymer chain in the peak (A) is from 60% to 99% to the area of the peak (A).

[5]

The modified conjugated diene polymer according to [1] or [2], wherein the nitrogen content is from 60 ppm to 600 ppm.

[4]

The modified conjugated diene polymer according to any one of [1] to [3], wherein a content of an aromatic vinyl compound is from 10 to 70% by mass, and a vinyl bond content of a conjugated diene-based compound moiety is from 25 to 70%.

[5]

The modified conjugated diene polymer according to any one of [1] to [4], wherein a Mooney viscosity is from 40 to 90.

[6]

The modified conjugated diene polymer according to any one of [1] to [5], wherein the proportion of the modified polymer chain contained in the modified conjugated diene polymer is from 40% to 99%.

[7]

The modified conjugated diene polymer according to any one of [1] to [6], wherein a proportion of the modified polymer chain in the peak (B) is 60% or more to the area of the peak (B).

[8]

The modified conjugated diene polymer according to any one of [1] to [7], wherein a molecular weight distribution (Mw/Mn) is from 1.2 to less than 2.5.

[9]

The modified conjugated diene polymer according to any one of [1] to [8], wherein a content of an aromatic vinyl compound of polymer chains in the peak (B) is from 10 to 70% by mass and a vinyl bond content of a conjugated diene-based compound moiety is from 25 to 70%.

[10]

A modified conjugated diene polymer composition comprising:

100 parts by mass of a rubber composition containing the modified conjugated diene polymer according to any one of [1] to [9];

1 part by mass to 150 parts by mass of a reinforcing filler; and 0.1 parts by mass to 20 parts by mass in total of a vulcanizing agent and a vulcanization accelerator.

[11]

A tire comprising the modified conjugated diene polymer composition according to [10].

[12]

A method for producing the modified conjugated diene polymer according to any one of [1] to [9], the method comprising (Step 1) to (Step 3):

(Step 1) a step of forming a conjugated diene polymer by polymerization, the conjugated diene polymer having a peak molecular weight of from 50,000 to 200,000 in a molecular weight distribution curve obtained from measurement by gel permeation chromatography (GPC);

(Step 2) a step of adding at least two modifiers to the conjugated diene polymer to obtain a polymer solution containing a modified conjugated diene polymer; and (Step 3) a step of desolvating the polymer solution obtained in (Step 2).

[13]

A method for producing the modified conjugated diene polymer according to any one of [1] to [9], the method comprising (Step A) to (Step D):

(Step A) a step of obtaining a polymer solution containing a high-molecular-weight conjugated diene polymer having a peak of peak molecular weight of from 500,000 to 2,500,000 in a molecular weight distribution curve obtained from measurement by gel permeation chromatography (GPC);

(Step B) a step of obtaining a polymer solution containing a low-molecular-weight modified conjugated diene polymer having a peak of peak molecular weight of from 50,000 to 200,000 in a molecular weight distribution curve obtained from measurement by gel permeation chromatography (GPC) and modified with a modifier having at least one nitrogen atom;

(Step C) a step of mixing the polymers obtained in (Step A) and (Step B) together with a mass ratio of (high-molecular-weight conjugated diene polymer):(low-molecular-weight modified conjugated diene polymer)=15:85 to 85:15 to obtain a polymer mixture; and (Step D) a step of desolvating the polymer mixture obtained in (Step C) when the polymer mixture is a polymer solution.

Advantageous Effects of Invention

The present invention can provide a modified conjugated diene polymer having superior balance between low hysteresis loss and wet skid resistance, abrasion resistance enough for practical use, and superior processability.

MODE FOR CARRYING OUT THE INVENTION

Hereinafter, embodiments of the present invention (hereinafter, referred to as "the present embodiment") will be described in detail; however, the present invention is not limited to modes shown in the following, and can be embodied with various modifications without departing from the spirit of the invention.

[Modified Conjugated Diene Polymer]

The modified conjugated diene polymer according to the present embodiment satisfies the following conditions (I) to (IV):

(I) at least two peaks are observed in a molecular weight distribution curve obtained from measurement by gel permeation chromatography (GPC);

(II) when a peak of the highest molecular weight is defined as a peak (B), a peak of the largest peak area except for the peak (B) is defined as a peak (T) in the molecular weight distribution curve, a peak molecular weight of the peak (B) is from 500,000 to 2,500,000 and a peak molecular weight of the peak (T) is from 150,000 to 600,000;

(III) an area of the peak (T) is from 30% to 80% and a total value of an area of the peak (B) and the area of the peak (T) is 65% or more when the total area of the molecular weight distribution curve is defined as 100%; and (IV) a proportion of a modified polymer chain(s) in a region ranging from a low-molecular-weight side to a point of 5% cumulative area is from 60% to 99% in the molecular weight distribution curve.

The modified conjugated diene polymer according to the present embodiment preferably satisfies the following conditions (1) to (4):

(1) at least three peaks are observed in a molecular weight distribution curve obtained from measurement by gel permeation chromatography (GPC);

(2) when a peak of the lowest molecular weight is defined as a peak (A), a peak of the highest molecular weight is defined as a peak (B) in the molecular weight distribution curve, a peak molecular weight of a peak (A) is from 50,000 to 200,000 and the peak molecular weight of a peak (B) is from 500,000 to 2,500,000;

(3) the area of the peak (A) is from 3% to 15% when the total area of the molecular weight distribution curve is defined as 100%; and (4) the proportion of the modified polymer chain(s) in the peak (A) is from 60% to 99% to the area of the peak (A).

(Weight-Average Molecular Weight)

The weight-average molecular weight of the modified conjugated diene polymer according to the present embodiment is preferably from 100,000 to 2,000,000, more preferably from 200,000 to 1,500,000, and even more preferably from 350,000 to 1,100,000, for processability and the performance such as abrasion resistance of a modified conjugated diene polymer composition described later.

The weight-average molecular weight of the modified conjugated diene polymer can be measured in a manner described in Examples.

(Peak Molecular Weight)

The modified conjugated diene polymer according to the present embodiment has at least two peaks in a molecular weight distribution curve obtained from measurement by GPC.

The term "peak" in a molecular weight distribution curve in the present embodiment refers to a peak having an area of 1.0% or more with a peak top when the total area of a molecular weight distribution curve obtained from measurement by GPC is defined as 100%.

The term "peak top" refers to a point of a local maximum between base lines or local minimums.

When one peak is observed, cold flow (a phenomenon that molded rubber flows out and deforms at room temperature) is intense, and moreover lower strength is imparted to a modified conjugated diene polymer composition.

When two peaks are observed, on the other hand, the cold flow can be effectively prevented, and enhanced balance can be achieved between abrasion resistance and processability. When three peaks are observed, it is preferable for balancing abrasion resistance and processability at a high level.

The number of peaks in a molecular weight distribution curve of the modified conjugated diene polymer according to the present embodiment can be controlled to two or more through the loading of each modifier, the type of each modifier, or mixing copolymers having different peak molecular weights.

As a peak of the highest molecular weight of at least two peaks in a molecular weight distribution curve of the modified conjugated diene polymer according to the present embodiment is defined as a peak (B) and a peak of the largest peak area except for the peak (B) is defined as a peak (T), the peak molecular weight of the peak (B) is from 500,000 to 2,500,000, preferably from 500,000 to 2,000,000, and more preferably from 550,000 to 1,500,000, for abrasion resistance and prevention of powder generation in the modified conjugated diene polymer in dehydration drying.

The phrase "prevention of powder generation in the modified conjugated diene polymer in dehydration drying" refers to preventing generation of powder when the modified conjugated diene polymer is subjected to dehydration drying. Generation of powder, which poses a risk of dust explosion and lower production stability, can be prevented through controlling the peak molecular weight of the peak (B) within the above range. The amount of powder generated in the modified conjugated diene polymer in dehydration drying can be checked by measuring the particle size distribution of the modified conjugated diene polymer sampled after a step of dehydration drying in a production process.

The molecular weight of the peak (T) is from 150,000 to 600,000, preferably from 160,000 to 550,000, and more preferably from 180,000 to 500,000, for processability and preventing the modified conjugated diene polymer from adhering in a production process.

The phrase "preventing the modified conjugated diene polymer from adhering in a production process" refers to preventing the modified conjugated diene polymer from adhering to a wall surface or bottom of a production apparatus in a production process. Adhesion of the modified conjugated diene polymer to a wall surface or bottom of a production apparatus in a production process, which results in lower quality stability, for example, due to the degradation of the modified conjugated diene polymer by heat, can be prevented through controlling the peak (T) within the above range. If the modified conjugated diene polymer in the form of powder and/or particles adheres in a production apparatus in a step of dehydrating and/or desolvating the modified conjugated diene polymer or any of the subsequent steps, the modified conjugated diene polymer adhering degrades over time and the degraded product contaminates the final product, which may totally deteriorate the quality of the modified conjugated diene polymer. Accordingly, the modified conjugated diene polymer adhering needs to be removed regularly; when a step of drying is performed in continuous operation in an industrial production process, however, the operation inevitably needs to be suspended to remove the modified conjugated diene polymer adhering and the production efficiency may be lowered.

Through adjusting the molecular weight of the peak (T) of the modified conjugated diene polymer according to the present embodiment within the specified range, as described above, or adjusting the molecular weight distribution of the modified conjugated diene polymer according to the present embodiment, the modified conjugated diene polymer can be prevented from adhering, the load of the removal task can be mitigated, and suspension of continuous operation can be less frequent, and thus higher production efficiency can be achieved in a production process.

The adhesion of the modified conjugated diene polymer in a production process can be checked through measuring the amount of the modified conjugated diene polymer adhering to a wall surface or bottom after dehydration drying in the production process.

When a peak of the lowest molecular weight of the three or more peaks in a molecular weight distribution curve of the preferred modified conjugated diene polymer according to the present embodiment is defined as a peak (A) and a peak of the highest molecular weight is defined as peak (B), the peak molecular weight of the peak (A) is preferably from 50,000 to 200,000, more preferably from 50,000 to 180,000, and even more preferably from 50,000 to 160,000, for enhanced processability, reduced hysteresis loss, and preventing the conjugated diene polymer from adhering in a production process.

The peak molecular weights of the peak (A), the peak (T), and the peak (B) can be controlled in the above numerical ranges through adjusting the loading of a polymerization initiator.

For processability and preventing the modified conjugated diene polymer from adhering in a production process, the peak (T), which is a peak of the largest peak area except for the peak (B), is observed in a molecular weight distribution curve of the modified conjugated diene polymer according to the present embodiment.

For enhanced reproducibility of polymerization, the number of peaks except for the peak (T) and the peak (B) is preferably three or less, more preferably two or less, and even more preferably one or less.

In the case that a peak except for the peak (T) and the peak (B) is observed, the peak molecular weight of the "peak except for the peak (T) and the peak (B)" is preferably from 50,000 to 200,000, more preferably from 50,000 to 180,000, and even more preferably from 50,000 to 160,000, for enhanced processability, reduced hysteresis loss, and preventing the modified conjugated diene polymer from adhering in a production process.

In the case that three or more peaks are observed in a molecular weight distribution curve of the modified conjugated diene polymer according to the present embodiment, it is preferable that at least one or more peaks be present between the peak (A) and the peak (B).

Examination by the present inventors has revealed that the molecular weights of the peak (A) and the peak (B) make a larger contribution to processability and abrasion resistance. Accordingly, control of the molecular weight or area of a peak present between the peak (A) and the peak (B) is not highly required for better abrasion resistance.

For production stability, on the other hand, the number or peaks except for the peak (A) and the peak (B) is preferably three or less, more preferably two or less, and even more preferably one.

Further, for balance between processability and abrasion resistance, the peak molecular weight of a peak except for the peak (A) and the peak (B) is preferably from 150,000 to 800,000, and more preferably from 150,000 to 600,000.

(Molecular Weight Distribution)

As the total area of a molecular weight distribution curve obtained for the modified conjugated diene polymer according to the present embodiment from measurement by GPC is defined as 100%, and a peak of the lowest molecular weight is defined as a peak (A), a peak of the highest molecular weight as a peak (B), and a peak of the largest peak area except for the peak (B) as a peak (T), the area of the peak (A) is from 3% to 15%, more preferably from 3% to 12%, and even more preferably from 3% to 10%, for balance between abrasion resistance and processability. Change in Mooney viscosity after polymerization can be reduced by setting the area of the peak (A) within the range.

The area of the peak (B) is preferably from 10% to 70%, more preferably from 15% to 65%, and even more preferably from 20 to 60%, for balance between abrasion resistance and processability.

Further, the area of the peak (T) is from 30% to 80%, preferably from 32% to 80%, and even more preferably from 35% to 75%, for processability and prevention of powder generation in the modified conjugated diene polymer in dehydration drying.

Furthermore, the total value of the area of the peak (B) and the area of the peak (T) is 65% or more, preferably 70% or more, and more preferably from 75% to 97%, for preventing the modified conjugated diene polymer from adhering in a production process.

In the case that peaks are overlapping in calculation of the peak area of each peak, a perpendicular is drawn from a local minimum present between peaks, and the areas of the peaks divided by the perpendicular are calculated.

The areas of the peak (A), the peak (B), and the peak (T), and the total value of the area of the peak (B) and the area of the peak (T) can be controlled in the above numerical ranges through adjusting the loading of each modifier and the mixing ratio, in other words, blend ratio between copolymers having different peak molecular weights in a production process for the modified conjugated diene polymer.

The molecular weight distribution (weight-average molecular weight/number-average molecular weight) of the modified conjugated diene polymer according to the present embodiment is preferably from 1.20 to 3.00, more preferably from 1.20 to less than 2.50, and even more preferably from 1.25 to less than 2.40, for processability and lower hysteresis loss.

The proportion of the modified polymer chain(s) in a region ranging from a low-molecular-weight side to a point of 5% cumulative area in a molecular weight distribution curve of the modified conjugated diene polymer according to the present embodiment is from 60 to 99%, preferably from 65% to 99%, and more preferably from 70% to 99%, for lower hysteresis loss.

The point of 5% cumulative area from a low-molecular-weight side is a point at which a cumulative area integrated from a starting point of a molecular weight of 100 reaches 5% in the molecular weight distribution curve.

The proportion of the modified polymer chain(s) in a region ranging from a low-molecular-weight side to a point of 5% cumulative area is the proportion of the modified polymer chain(s) of conjugated diene polymer in a region ranging from a low-molecular-weight side, specifically, a starting point of a molecular weight of 100, to a point at which a cumulative area integrated from the starting point reaches 5%.

The proportion of the modified polymer chain(s) in a region ranging from a low-molecular-weight side to a point of 5% cumulative area in the molecular weight distribution curve can be determined in a manner described in Examples.

The proportion of the modified polymer chain(s) in a region ranging from a low-molecular-weight side to a point of 5% cumulative area in the molecular weight distribution curve can be controlled within the above numerical range through use of a polymerization initiator obtained by reacting a compound having at least one nitrogen atom in the molecule and an organic lithium compound, or adjusting the loading of each modifier.

The proportion of the modified polymer chain(s) in the peak (A) in the modified conjugated diene polymer according to the present embodiment is preferably from 60% to 99%, more preferably from 70% to 99%, and even more preferably from 75% to 99%.

The proportion of the modified polymer chain(s) in the peak (A) indicates the modification rate of conjugated diene polymer in the peak (A).

Cases that the proportion of the modified polymer chain(s) in the peak (A) is 60% or more are preferred because good balance is achieved between low hysteresis loss and wet skid properties, and cases that the proportion of the modified polymer chain(s) in the peak (A) is 99% or less are preferred because good processability is achieved.

Cases that the proportion of the modified polymer chain(s) in the peak (A) is less than 60% are not preferred because low hysteresis loss is significantly deteriorated.

The proportion of the modified polymer chain(s) in the peak (A) in the modified conjugated diene polymer can be controlled within the above numerical range through use of a polymerization initiator obtained by reacting a compound having at least one nitrogen atom in the molecule and an organic lithium compound, or adjusting the loading of each modifier. It is preferred to add from 0.6 to 1.0 mol of a compound having at least one nitrogen atom in the molecule per mole of an organic lithium compound to be actually added.

The proportion of the modified polymer chain(s) in the peak (A) can be basically determined in measurement with GPC as described in Examples, and alternatively determined by using the following formulae when the peak molecular weight, peak area, and total proportion of the modified polymer chain(s) in the modified conjugated diene polymer are already known.

Proportion (%) of the modified polymer chain(s) in modified conjugated diene polymer=peak area (%) due to the modified polymer chain(s) in peak (A)+area (%) except for peak (A)     [Formula 1]

Proportion (%) of the modified polymer chain(s) in peak (A)=(peak area (%) due to the modified polymer chain(s) in peak (A)/peak area (%) of peak (A))×100     [Formula 2]

For Example 1 in Japanese Patent Laid-Open No. 2012-172077, for example, it is inferred that contribution of non-modified parts is only to the peak (A), and it is understood from values recited in Example 1 that the proportion of the modified polymer chain(s) in the modified conjugated diene polymer is 90% and the area except for the peak (A) is 86%, and hence the peak area due to the modified polymer chain(s) in the peak (A) is calculated from [Formula 1] to be 4%, and the proportion of modified polymer chain(s) in the peak (A) is calculated from [Formula 2] to be 28.6%.

(Mooney Viscosity)

The Mooney viscosity of the modified conjugated diene polymer according to the present embodiment is preferably from 40 to 90, more preferably from 45 to 85, and even more preferably from 50 to 85, for production stability.

The Mooney viscosity of the modified conjugated diene polymer can be controlled in the above numerical range through the loading of a polymerization initiator or the loading of each modifier.

(Nitrogen Content)

The nitrogen content of the modified conjugated diene polymer according to the present embodiment is from 60 to 600 ppm, preferably from 80 to 500 ppm, and more preferably from 80 to 450 ppm, for improved balance between low hysteresis loss and wet skid resistance.

The nitrogen content of the modified conjugated diene polymer can be controlled in the above numerical range through use of a polymerization initiator obtained by reacting a compound having at least one nitrogen atom in the molecule and an organic lithium compound, or selection of the type of each modifier and adjusting the loading of each modifier.

The modified conjugated diene polymer according to the present embodiment may be any one selected from the group consisting of polymer obtained by polymerization of one conjugated diene compound, copolymer obtained by copolymerization of two or more conjugated diene compounds, and copolymer obtained by copolymerization of one or two or more conjugated diene compounds and a vinyl aromatic compound.

The copolymer obtained by copolymerization of a conjugated diene compound or conjugated diene compounds and a vinyl aromatic compound may be random copolymer or block copolymer.

Examples of the random copolymer include butadiene-isoprene random copolymer, butadiene-styrene random copolymer, isoprene-styrene random copolymer, and butadiene-isoprene-styrene random copolymer.

The composition distribution of monomers in copolymer chains is not limited, and, for example, complete random copolymer, which has an almost statistically random composition, and taper (gradient) random copolymer, which has a composition distributed like a taper, are acceptable. The bonding mode of conjugated diene, that is, the composition including 1,4-bonds and 1,2-bonds may be homogeneous or according to a distribution.

The content of the aromatic vinyl compound in the modified conjugated diene polymer according to the present embodiment is preferably from 10 to 70% by mass, more preferably from 10 to 65% by mass, and even more preferably from 10 to 60% by mass, for balancing low hysteresis loss and wet skid resistance.

The content of the aromatic vinyl compound can be measured in a manner described later in Examples, and can be controlled in the above numerical range through the amount of use of the aromatic vinyl compound for polymerization.

The vinyl bond content of a conjugated diene-based compound moiety in the modified conjugated diene polymer according to the present embodiment is preferably from 25 to 70%, more preferably from 25 to 68%, and even more preferably from 25 to 65%, for abrasion resistance.

The vinyl bond content can be measured in a manner described later in Examples, and can be controlled in the above numerical range through reaction temperature or the loading or type of a polar compound described later.

The content of the aromatic vinyl compound of polymer chain(s) in the peak (B) in the modified conjugated diene polymer according to the present embodiment is preferably from 10 to 70% by mass, more preferably from 10 to 65% by mass, and even more preferably from 10 to 60% by mass, for balancing low hysteresis loss and wet skid resistance.

The vinyl bond content of a conjugated diene-based compound moiety of polymer chain(s) in the peak (B) is preferably from 25 to 70%, more preferably from 25 to 68%, and even more preferably from 25 to 65% by mass, for abrasion resistance.

The content of the aromatic vinyl compound in the peak (A) in the modified conjugated diene polymer according to the present embodiment is preferably from 10 to 70% by mass, more preferably from 10 to 65% by mass, and even more preferably from 10 to 60% by mass, for balancing low hysteresis loss and wet skid resistance.

The vinyl bond content of a conjugated diene-based compound moiety of polymer chain(s) in the peak (A) is preferably from 25 to 70%, more preferably from 25 to 68%, and even more preferably from 25 to 65%, for abrasion resistance.

The content of the aromatic vinyl compound of polymer chain(s) in the peak (B) can be controlled in the above numerical range through adjusting the amount of use of the aromatic vinyl compound for polymerization.

The vinyl bond content of a conjugated diene compound moiety of polymer chain(s) in the peak (B) can be controlled in the above numerical range through adjusting reaction temperature or the loading or type of a polar compound described later.

The content of the aromatic vinyl compound of polymer chain(s) in the peak (A) can be controlled in the above numerical range through adjusting the amount of use of the aromatic vinyl compound for polymerization.

The vinyl bond content of a conjugated diene compound moiety of polymer chain(s) in the peak (A) can be controlled in the above numerical range through adjusting reaction temperature or the loading or type of a polar compound described later.

The proportion of the modified polymer chain(s) contained in the modified conjugated diene polymer according to the present embodiment is preferably from 40% to 99%, more preferably from 60 to 99%, and even more preferably from 80 to 99%, for improved balance between low hysteresis loss and wet skid resistance.

The proportion of the modified polymer chain(s) contained in the modified conjugated diene polymer can be determined from the proportion of the modified polymer chain(s) shown in Examples, and can be controlled within the above numerical range through use of a polymerization initiator obtained by reacting a compound having at least one nitrogen atom in the molecule and an organic lithium compound, or adjusting the loading of each modifier.

The proportion of the modified polymer chain(s) in the peak (B) of the highest molecular weight in a molecular weight distribution curve obtained for the modified conjugated diene polymer according to the present embodiment in measurement with GPC is preferably 60% or more, more preferably 65% or more, and even more preferably 70% or more to the area of the peak (B), for enhanced abrasion resistance.

The proportion of the modified polymer chain(s) in the peak (B) can be determined from the proportion of the modified polymer chain(s) shown in Examples, and can be controlled within the above numerical range through use of a polymerization initiator obtained by reacting a compound having at least one nitrogen atom in the molecule and an organic lithium compound, or adjusting the loading of each modifier.

[Method for Producing Conjugated Diene Polymer]

There are a first method and a second method for producing the modified conjugated diene polymer according to the present embodiment, where the production methods include a step of producing a conjugated diene polymer including a vinyl aromatic compound unit and a conjugated diene compound unit, and (1) a polymer having at least two molecular weight peaks is produced by polymerization in the first production method and (2) two or more polymers are mixed together in the second production method.

(First Production Method)

The first production method includes (Step 1) to (Step 3):

(Step 1) a step of forming a conjugated diene polymer by polymerization, the conjugated diene polymer having a peak molecular weight of from 50,000 to 200,000 in a molecular weight distribution curve obtained from measurement by gel permeation chromatography (GPC);

(Step 2) a step of adding at least two modifiers to the conjugated diene polymer to obtain a polymer solution containing a modified conjugated diene polymer; and (Step 3) a step of desolvating the polymer solution obtained in (Step 2).

(Step 1)

In (Step 1), the peak molecular weight in a molecular weight distribution curve obtained for a conjugated diene polymer to be formed by polymerization in measurement with gel permeation chromatography (GPC) is preferably from 50,000 to 200,000, more preferably from 50,000 to 180,000, and even more preferably from 50,000 to 160,000, for processability and reduced hysteresis loss.

In (Step 1), it is preferred to add a polymerization initiator at the initiation of polymerization, and the polymerization initiator is preferably a reaction product of a compound having a nitrogen atom in the molecule and an organic lithium, for improved balance between low hysteresis loss and wet skid resistance.

(Conjugated Diene Polymer Obtained in (Step 1))

The conjugated diene polymer to be obtained in (Step 1) is a copolymer of a conjugated diene compound and a vinyl aromatic compound, and the content of the vinyl aromatic compound in the conjugated diene polymer is preferably from 10% by mass to 70% by mass, more preferably from 10% by mass to 65% by mass, and even more preferably from 10% by mass to 60% by mass, for balancing low hysteresis loss and wet skid resistance. The vinyl bond content of a conjugated diene-based compound moiety in the conjugated diene polymer is preferably from 25 to 70%, more preferably from 25 to 68%, and even more preferably from 25 to 65%.

When a polymerization initiator formed by reacting a compound having a modifying group is used, a copolymer the starting end of which is modified is formed by polymerization. The conjugated diene polymer is preferably modified at the starting end, and the fraction of the modified polymer chain(s) is preferably from 60% to 99%, more preferably from 65% to 99%, and even more preferably from 70% to 99%, for abrasion resistance and low hysteresis loss.

(Step 2)

In (Step 2), at least two modifiers are added to the conjugated diene polymer to obtain a modified conjugated diene polymer.

It is preferred to add three or less modifiers, and it is more preferred to add two modifiers, for reproducibility of polymerization in production.

Further, the modifiers to be added in (Step 2) include modifiers differing in the number of functional groups.

For example, combination of an octafunctional modifier and a tetrafunctional modifier, combination of hexafunctional modifier and a trifunctional modifier, and combination of an octafunctional modifier, a tetrafunctional modifier, and a bifunctional modifier may be used, and, for example, combination of a hexafunctional modifier, a trifunctional modifier, and another trifunctional modifier may be also used.

(Step 2) is followed by (Step 1), and (Step 2) is preferably initiated within 30 minutes, more preferably, initiated within 20 minutes after the completion of (Step 1), to prevent active ends of the conjugated diene polymer obtained in (Step 1) from being deactivated.

When many active ends are deactivated during polymerization or after the completion of polymerization in (Step 1), the area of the peak (A) is larger, and the low hysteresis loss and abrasion resistance are deteriorated.

(Step 3)

In (Step 3), the thus-obtained polymer solution containing a modified conjugated diene polymer is desolvated.

Known desolvating methods can be used. Examples thereof include a method in which the solvent is separated through steam stripping or the like, and the conjugated diene polymer is then collected through filtration, and dehydrated and dried to obtain the conjugated diene polymer, a method of concentrating with a flushing tank and further devolatilizing with a vent extruder or the like, and a method of directly devolatilizing with a drum dryer or the like.

In the case that the conjugated diene polymer is a copolymer obtained by copolymerization of one or two or more conjugated diene compounds and a vinyl aromatic compound, the content of the vinyl aromatic compound to the total amount of use of monomers for polymerization for the copolymer is preferably from 10% by mass to 70% by mass, more preferably from 10% by mass to 65% by mass, and even more preferably from 10% by mass to 60% by mass, for balancing low hysteresis loss and wet skid resistance.

<Conjugated Diene Compound>

Examples of the conjugated diene compound include, but are not limited to, 1,3-butadiene, isoprene, 2,3-dimethyl-1, 3-butadiene, 1,3-pentadiene, 3-methyl-1,3-pentadiene, 1,3-heptadiene, and 1,3-hexadiene.

One of these may be used singly, and two or more thereof may be used in combination.

Preferred examples of the conjugated diene compound for industrial availability include 1,3-butadiene and isoprene.

<Vinyl Aromatic Compound>

Examples of the vinyl aromatic compound include, but are not limited to, styrene, α-methylstyrene, p-methylstyrene, vinylethylbenzene, 2-vinylnaphthalene, divinylbenzene, and diphenylethylene.

One of these may be used singly, and two or more thereof may be used in combination. Preferred examples of the compound for industrial availability include styrene.

The block ratio of the vinyl aromatic compound is determined in a method of oxidative decomposition of block copolymer by using tert-butyl peroxide with osmium tetroxide as a catalyst (a method described in I. M. KOLTHOFF et al., J. Polym. Sci. 1, 429 (1946)). The block ratio of the vinyl aromatic compound in the modified conjugated diene polymer according to the present embodiment is preferably less than 5% by mass for balance between low hysteresis loss and wet skid resistance.

The microstructure (cis/trans ratio, vinyl bond content) of the modified conjugated diene polymer according to the present embodiment can be arbitrarily controlled, for example, through polymerization temperature during polymerization, and the type and loading of a polar compound, each described later.

Since a higher vinyl bond content generally leads to lower abrasion resistance, the vinyl bond content of a conjugated diene-based compound moiety of the modified conjugated diene polymer according to the present embodiment is preferably from 25 to 70%, more preferably from 25 to 68%, and even more preferably from 25 to 65%, for the purpose of achieving good abrasion resistance for practical use.

In the case that the conjugated diene polymer is a copolymer of butadiene and styrene, the vinyl bond content (1,2-bond content) of the butadiene bonding units can be determined by using a Hampton's method (R. R. Hampton, Analytical Chemistry, 21, 923 (1949)).

When the microstructure (the bond contents of the conjugated diene copolymer) is within the above range and the glass transition temperature of the copolymer is in the range of from −65° C. to −15° C., a vulcanized product with more superior balance between low hysteresis loss and wet skid resistance can be obtained.

In determination of glass transition temperature, in accordance with ISO 22768: 2006, a DSC curve is recorded while the temperature is raised within a given temperature range, and a peak top (inflection point) in the DSC differential curve is defined as glass transition temperature.

It is preferable that the polymerization reaction to form a conjugated diene polymer before active end modification and the subsequent modification reaction of a polymerization-terminating end for the modified conjugated diene polymer according to the present embodiment be performed in a specific solvent.

Examples of the solvent include, but are not limited to, hydrocarbon solvents such as aliphatic hydrocarbons including butane, pentane, hexane, isopentane, heptane, octane, and isooctane; alicyclic hydrocarbons including cyclopentane, methylcyclopentane, cyclohexane, methylcyclohexane, and ethylcyclohexane; and aromatic hydrocarbons including benzene, toluene, ethylbenzene, and xylene.

One of these may be used singly, and two or more thereof may be used in combination.

<Polymerization Initiator>

In the method for producing the modified conjugated diene polymer according to the present embodiment, a specific polymerization initiator containing a compound having at least one nitrogen atom in the molecule and an organic lithium compound may be used.

The polymerization initiator is preferably a polymerization initiator containing an organic lithium compound having at least one nitrogen atom in the molecule, and may contain a nitrogen-free organic lithium compound.

Examples of the compound having at least one nitrogen atom in the molecule include compounds represented by formulas (1) and (2) below, and the organic lithium compound having at least one nitrogen atom in the molecule may be prepared in advance in a given reactor, or prepared by reacting a compound having at least one nitrogen atom in the molecule and an organic lithium concomitantly with or before copolymerization described later.

[Compound Having At Least One Nitrogen Atom in Molecule]

For the compound having at least one nitrogen atom in the molecule, a compound represented by the following formula (1) or (2) can be used.

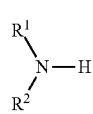

(1)

In the formula (1), $R^1$ and $R^2$ may be the same or different, and are each any one selected from the group consisting of an alkyl group having from 1 to 12 carbon atoms, a cycloalkyl group having from 3 to 14 carbon atoms, and an aralkyl group having from 6 to 20 carbon atoms.

$R^1$ and $R^2$ may be bonding to each other to form a cyclic structure together with the adjacent nitrogen atom, and in this case $R^1$ and $R^2$ are forming a hydrocarbon group such that the total number of carbon atoms is from 4 to 12, and the hydrocarbon group may have an unsaturated bond or a branched structure.

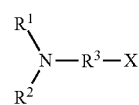

(2)

In the formula (2), $R^1$ and $R^2$ are the same as $R^1$ and $R^2$ in the formula (1), and $R^3$ is an alkylene group having from 1 to 20 carbon atoms or any one of formulas (3) to (5).

In the case that $R^3$ is an alkylene group having from 1 to 20 carbon atoms, X is any one of Cl, Br, and I; in the case that $R^3$ is any one of the following formulas (3) to (5), X is a hydrogen atom.

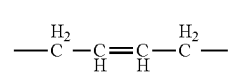

(3)

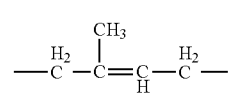

(4)

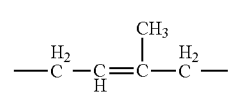

(5)

The conjugated diene polymer constituting a modified conjugated diene polymer obtained in the method for producing the modified conjugated diene polymer according to the present embodiment may be a polymer of a single conjugated diene compound or a copolymer of different conjugated diene compounds, or a copolymer of a conjugated diene compound and a compound copolymerizable with the conjugated diene compound. An example is a copolymer of a conjugated diene compound and an aromatic vinyl compound.

In (Step 1) as a polymerization step, it is preferred to use a polymerization initiator containing a compound having at least one nitrogen atom in the molecule represented by the formula (1) or (2) and an organic lithium compound, and a conjugated diene compound or a conjugated diene compound and an aromatic vinyl compound is/are polymerized or copolymerized to obtain a conjugated diene polymer having an active end.

The polymerization initiator preferably contains an organic lithium compound having at least one nitrogen atom in the molecule, the organic lithium compound obtained by reacting a compound having at least one nitrogen atom in the molecule and an organic lithium compound and represented by the formula (7) or (8) described later, and may contain a nitrogen-free organic lithium compound.

The organic lithium compound having at least one nitrogen atom in the molecule and represented by the formula (7) or (8) may be prepared in advance in a given reactor, or prepared by feeding a compound having at least one nitrogen atom in the molecule and an organic lithium into a reactor for polymerization or copolymerization and reacting them concomitantly with or before polymerization or copolymerization.

As a preferred mode of the conjugated diene polymer obtained in the polymerization step of (Step 1), the organic lithium compound and the compound having at least one nitrogen atom in the molecule are preferably added with an equimolar ratio to set the proportion of polymer chain(s) having a structure derived from the compound represented by the formula (1) or (2) at a molecular end to from 60% by mass to 99% by mass.

The organic lithium compound is typically dissolved in a solvent and used as a solution, and some molecules of the organic lithium compound actually added lack activity because of impurities in the solvent or impurities in a monomer as a starting material. For this reason, from 0.6 to 1.0 mol of the compound represented by the formula (1) or (2) is preferably added per mole of the organic lithium compound to be actually added so that the active organic lithium and the compound having at least one nitrogen atom in the molecule are equimolar.

[Compound Represented by Formula (1) or (2)]

In the method for producing the modified conjugated diene polymer according to the present embodiment, as described above, use of a compound represented by the formula (7) or (8) described later, which is a compound formed by reacting the compound having at least one nitrogen atom in the molecule and represented by the formula (1) or (2) and an organic lithium compound, as the polymerization initiator is preferred for reduced hysteresis loss.

In the formulas, $R^1$ and $R^2$ may be the same or different, and are each any one selected from the group consisting of an alkyl group having from 1 to 12 carbon atoms, a cycloalkyl group having from 3 to 14 carbon atoms, and an aralkyl group having from 6 to 20 carbon atoms.

Examples of the groups $R^1$ and $R^2$ in the formula (1) include, but are not limited to, methyl, ethyl, propyl, butyl, octyl, cyclopropyl, cyclohexyl, 3-phenyl-1-propyl, isobutyl, decyl, heptyl, and phenyl.

Examples of the compound represented by the formula (1) include, but are not limited to, dimethylamine, diethylamine, dibutylamine, dipropylamine, diheptylamine, dihexylamine, dioctylamine, di(2-ethylhexyl)amine, didecylamine, ethylpropylamine, ethylbutylamine, ethylbenzylamine, and methylphenethylamine, and analogs of them satisfying the conditions for the formula (1) are also included therein.

The compound represented by the formula (1) is preferably dibutylamine or dihexylamine, and more preferably dibutylamine, for reduction of the hysteresis loss of a conjugated diene polymer composition described later and reduction of the uncomfortable odor of a modified conjugated diene polymer described later.

In the formula (1), $R^1$ and $R^2$ may be bonding to each other to form a cyclic structure together with the adjacent nitrogen atom, and in this case $R^1$ and $R^2$ are forming a hydrocarbon group such that the total number of carbon atoms is from 4 to 12, and the hydrocarbon group may have an unsaturated bond or a branched structure.

Examples of the compound represented by the formula (1) in the case that $R^1$ and $R^2$ are bonding to each other include, but are not limited to, piperidine, hexamethyleneimine, azacyclooctane, 1,3,3-trimethyl-6-azabicyclo[3.2.1]octane, 1,2,3,6-tetrahydropyridine, and 3,5-dimethylpiperidine, and analogs of them satisfying the above conditions are also included therein.

The compound represented by the formula (1) is preferably piperidine, hexamethyleneimine, azacyclooctane, 1,3,3-trimethyl-6-azabicyclo[3.2.1]octane, or 3,5-dimethylpiperidine, and more preferably piperidine, hexamethyleneimine, or 3,5-dimethylpiperidine, for reduction of the hysteresis loss of a conjugated diene polymer composition described later and reduction of the uncomfortable odor of a conjugated diene polymer described later.

In the formula (2), $R^1$ and $R^2$ have the same definitions as $R^1$ and $R^2$ in the formula (1).

$R^3$ is an alkylene group having from 1 to 20 carbon atoms or any one of the formulae (3) to (5).

Here, in the case that $R^3$ is an alkylene group having from 1 to 20 carbon atoms, X is any one of Cl, Br, and I; in the case that $R^3$ is any one of the formulae (3) to (5), X is a hydrogen atom.

In the compound represented by the formula (2), the number of carbon atoms of $R^3$ is preferably from 2 to 16, and more preferably from 3 to 10, for reactivity to and interaction with an inorganic filler such as carbon black and silica.

Examples of the compound represented by the formula (2) in the case that $R^3$ is an alkylene group having 1 to 20 carbon atoms include, but are not limited to, 3-chloro-dimethylpropan-1-amine, 3-chloro-diethylpropan-1-amine, 3-chloro-dibutylpropan-1-amine, 3-chloro-dipropylpropan-1-amine, 3-chloro-diheptylpropan-1-amine, 3-chloro-dihexylpropan-1-amine, 3-chloropropyl-ethylhexan-1-amine, 3-chloro-didecylpropan-1-amine, 3-chloro-ethylpropan-1-amine, 3-chloro-ethylbutan-1-amine, 3-chloro-ethylpropan-1-amine, benzyl-3-chloro-ethylpropan-1-amine, 3-chloro-ethylphenethylpropan-1-amine, 3-chloro-methylphenethylpropan-1-amine, 1-(3-chloropropyl)piperidine, 1-(3-chloropropyl)hexamethyleneimine, 1-(3-chloropropyl)azacyclooctane, 6-(3-chloropropyl)-1,3,3-trimethyl-6-azabicyclo[3.2.1]octane, 1-(3-chloropropyl)-1,2,3,6-tetrahydropyridine, 1-(3-bromopropyl)hexamethyleneimine, 1-(3-iodopropyl)hexamethyleneimine, 1-(3-chlorobutyl)hexamethyleneimine, 1-(3-chloropentyl)hexamethyleneimine, 1-(3-chlorohexyl)hexamethyleneimine, and 1-(3-chlorodecyl)hexamethyleneimine, and analogs of them satisfying the above conditions are also included therein. The compound represented by the formula (2) is preferably 3-chloro-dibutylpropan-1-amine or 1-(3-chloropropyl)hexamethyleneimine, and more preferably 1-(3-chloropropyl)piperidine or 1-(3-chloropropyl)hexamethyleneimine, for reactivity to and interaction with an inorganic filler such as carbon black and silica.

Examples of the compound represented by the formula (2) in the case that $R^3$ is any one of the above formulae (3) to (5) include, but are not limited to, N,N-dimethyl-2-butenyl-1-amine, N,N-diethyl-2-butenyl-1-amine, N,N-dibutyl-2-butenyl-1-amine, N,N-dipropyl-2-butenyl-1-amine, N,N-diheptyl-2-butenyl-1-amine, N,N-dihexyl-2-butenyl-1-amine, N,N-dioctyl-2-butenyl-1-amine, N,N-(di-2-ethylhexyl)-2-butenyl-1-amine, N,N-didecyl-2-butenyl-1-amine, N,N-ethylpropyl-2-butenyl-1-amine, N,N-ethylfutyl-2-butenyl-1-amine, N,N-ethylbenzyl-2-butenyl-1-amine, N,N-methylphenethyl-2-butenyl-1-amine, N,N-dimethyl-2-methyl-2-butenyl-1-amine, N,N-diethyl-2-methyl-2-butenyl-1-amine, N,N-dibutyl-2-methyl-2-butenyl-1-amine, N,N-dipropyl-2-methyl-2-butenyl-1-amine, N,N-diheptyl-2-methyl-2-butenyl-1-amine, N,N-dihexyl-2-methyl-2-butenyl-1-amine, N,N-dimethyl-3-methyl-2-butenyl-1-amine, N,N-diethyl-3-methyl-2-butenyl-1-amine, N,N-dibutyl-3-methyl-2-butenyl-1-amine, N,N-dipropyl-3-methyl-2-butenyl-1-amine, N,N-diheptyl-3-methyl-2-butenyl-1-amine, N,N-dihexyl-3-methyl-2-butenyl-1-amine, 1-(2-butenyl)piperidine, 1-(2-butenyl)hexamethyleneimine, 1-(2-butenyl)azacyclooctane, 6-(2- butenyl)-1,3,3-trimethyl-6-azabicyclo[3.2.1]octane, 1-(2-butenyl)-1,2,3,6-tetrahydropyridine, (2-methyl-2-butenyl)hexamethyleneimine, and (3-methyl-2-butenyl)hexamethyleneimine, and analogs of them satisfying the above conditions are also included therein.

The compound represented by the formula (2) is preferably N,N-dibutyl-2-butenyl-1-amine or 1-(2-butenyl)hexamethyleneimine, and more preferably 1-(2-butenyl)piperidine or 1-(2-butenyl)hexamethyleneimine, for reduction of the hysteresis loss of a modified conjugated diene polymer composition described later.

[Organic Lithium Compound]

Examples of the organic lithium compound contained in the polymerization initiator in the polymerization step of the method for producing the modified conjugated diene polymer according to the present embodiment include, but are not limited to, n-butyllithium, sec-butyllithium, t-butyllithium, n-propyllithium, and i-propyllithium.

The organic lithium compound of the compound represented by the formula (1) or (2) can be produced through reaction by adding a specific organic lithium compound in the presence of the compound represented by the formula (1) or (2).

Polymerization is initiated when the organic lithium compound of the compound represented by the formula (1) or (2) reacts with a monomer to be polymerized. The organic lithium compound of the compound represented by the formula (1) or (2) may be any compound capable of undergoing anionic polymerization, and a compound represented by the following formula (7) or (8) can be used.

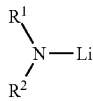
(7)

In the formula (7), $R^1$ and $R^2$ may be the same or different, and are each any one selected from the group consisting of an alkyl group having from 1 to 12 carbon atoms, a cycloalkyl group having from 3 to 14 carbon atoms, and an aralkyl group having from 6 to 20 carbon atoms.

Examples of $R^1$ and $R^2$ include, but are not limited to, groups including methyl, ethyl, propyl, butyl, octyl, cyclopropyl, cyclohexyl, 3-phenyl-1-propyl, isobutyl, decyl, heptyl, and phenyl.

Examples of the compound represented by the formula (7) include, but are not limited to, dimethylaminolithium, diethylaminolithium, dibutylaminolithium, dipropylaminolithium, diheptylaminolithium, dihexylaminolithium, dioctylaminolithium, di-2-ethylhexylaminolithium, didecylaminolithium, ethylpropylaminolithium, ethylbutylaminolithium, ethylbenzylaminolithium, and methylphenethylaminolithium, and analogs of them satisfying the above conditions are also included therein.

The compound represented by the formula (7) is preferably dibutylaminolithium or dihexylaminolithium, for solubility in solvent and reduction of the hysteresis loss of a modified conjugated diene polymer composition described later. More preferred is dibutylamine.

In the formula (7), $R^1$ and $R^2$ may be bonding to each other to form a cyclic structure together with the adjacent nitrogen atom, and in this case $R^1$ and $R^2$ are forming a hydrocarbon group such that the total number of carbon atoms is from 4 to 12, and the hydrocarbon group may have an unsaturated bond or a branched structure.

Examples of the compound represented by the formula (7) in the case that $R^1$ and $R^2$ are bonding to each other include, but are not limited to, piperidinolithium, hexamethyleneiminolithium, lithiumazacyclooctane, lithium-1,3,3-trimethyl-6-azabicyclo[3.2.1]octane, 1,2,3,6-tetrahydropyridinolithium, and 3,5-dimethylpiperidinolithium, and analogs of them satisfying the above conditions are also included therein.

The compound represented by the formula (7) is preferably piperidinolithium, hexamethyleneiminolithium, lithiumazacyclooctane, lithium-1,3,3-trimethyl-6-azabicyclo [3.2.1]octane, or 3,5-dimethylpiperidinolithium, and more preferably piperidinolithium, hexamethyleneiminolithium, or 3,5-dimethylpiperidinolithium, for the solubility of the polymerization initiator in solvent and reduction of the uncomfortable odor of a modified conjugated diene polymer described later.

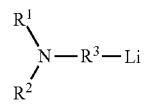
(8)

In the formula (8), $R^1$ and $R^2$ may be the same or different, and are each any one selected from the group consisting of an alkyl group having from 2 to 12 carbon atoms, a cycloalkyl group having from 8 to 14 carbon atoms, and an aralkyl group having from 6 to 20 carbon atoms. $R^3$ is an alkylene group having from 1 to 20 carbon atoms or any one of the following formulas (3) to (5).

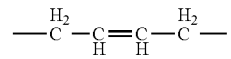
(3)

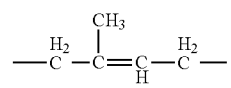
(4)

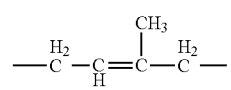
(5)

In the case that $R^3$ is an alkylene group having from 1 to 20 carbon atoms in the formula (8), the number of carbon atoms of $R^3$ is preferably from 2 to 16, and more preferably from 3 to 10, for reactivity to and interaction with an inorganic filler such as carbon black and silica.

Examples of the compound represented by the formula (8) in the case that $R^3$ is an alkylene group having from 1 to 20 carbon atoms include, but are not limited to, (3-(dimethylamino)-propyl)lithium, (3-(diethylamino)-propyl)lithium, (3-(dipropylamino)-propyl)lithium, (3-(dibutylamino)-propyl)lithium, (3-(dipentylamino)-propyl)lithium, (3-(dihexylamino)-propyl)lithium, (3-(dioctylamino)-propyl)lithium, (3-(ethylhexylamino)-propyl)lithium, (3-(didecylamino)-propyl)lithium, (3-(ethylpropylamino)-propyl)lithium, (3-(ethylbutylamino)-propyl)lithium, (3-(ethylbenzylamino)-propyl)lithium, (3-(methylphenethylamino)-propyl)lithium, (4-(dibutylamino)-butyl)lithium, (5-(dibutylamino)-pentyl)lithium, (6-(dibutylamino)-hexyl)lithium, and (10-(dibutylamino)-decyl)lithium, and analogs of them satisfying the above conditions are also included therein.

More preferred as the compound represented by the formula (8) is (3-(dibutylamino)-propyl)lithium, for reactivity to and interaction with an inorganic filler such as carbon and silica.

Examples of the compound represented by the formula (8) in the case that $R^3$ is any one of the formulae (3) to (5) include, but are not limited to, (4-(dimethylamino)-2-butenyl)lithium, (4-(diethylamino)-2-butenyl)lithium, (4-(dibutylamino)-2-butenyl)lithium, (4-(dipropylamino)-2-butenyl)lithium, (4-(diheptylamino)-2-butenyl)lithium, (4-(dihexylamino)-2-butenyl)lithium, (4-(dioctylamino)-2-butenyl)lithium, (4-(di-2-ethylhexylamino)-2-butenyl)lithium, (4-(didecylamino)-2-butenyl)lithium, (4-(ethylpropylamino)-2-butenyl)lithium, (4-(ethylbutylamino)-2-butenyl)lithium, (4-(ethylbenzylamino)-2-butenyl)lithium, (4-(methylphenethylamino)-2-butenyl)lithium, (4-(dimethylamino)-2-methyl-2-butenyl)lithium, (4-(diethylamino)-2-methyl-2-butenyl)lithium, (4-(dibutylamino)-2-methyl-2-butenyl)lithium, (4-(dipropylamino)-2-methyl-2-butenyl)lithium, (4-(diheptylamino)-2-methyl-2-butenyl)lithium, (4-(dihexylamino)-2-methyl-2-butenyl)lithium, (4-(dimethylamino)-3-methyl-2-butenyl)lithium, (4-(diethylamino)-3-methyl-2-butenyl)lithium, (4-(dibutylamino)-3-methyl-2-butenyl)lithium, (4-(dipropylamino)-3-methyl-2-butenyl)lithium, (4-(diheptylamino)-3-methyl-2-butenyl)lithium, and (4-(dihexylamino)-3-methyl-2-butenyl)lithium, and analogs of them satisfying the above conditions are also included therein.

Preferred are (4-(dimethylamino)-2-butenyl)lithium, (4-(diethylamino)-2-butenyl)lithium, and (4-(dibutylamino)-2-butenyl)lithium, and more preferred is (4-(dibutylamino)-2-butenyl)lithium, for reactivity as a polymerization initiator.

In the formula (8), $R^1$ and $R^2$ may be bonding to each other to form a cyclic structure together with the adjacent nitrogen atom, and in this case $R^1$ and $R^2$ are forming a hydrocarbon group such that the total number of carbon atoms is from 4 to 12, and the hydrocarbon group may have an unsaturated bond or a branched structure.

Examples of the compound represented by the formula (8) in the case that $R^1$ and $R^2$ are bonding to each other include, but are not limited to, (3-(piperidinyl)propyl) lithium, (3-(hexamethyleneiminyl)propyl) lithium, (3-(heptamethyleneiminyl)propyl) lithium, (3-(octamethyleneiminyl)propyl)lithium, (3-(1,3,3-trimethyl-6-azabicyclo[3.2.1]octanyl)propyl)lithium, (3-(1,2,3,6-tetrahydropyridinyl)propyl)lithium, (2-(hexamethyleneiminyl)ethyl)lithium, (4-(hexamethyleneiminyl)butyl)lithium, (5-(hexamethyleneiminyl)pentyl)lithium, (6-(hexamethyleneiminyl)hexyl)lithium, (10-(hexamethyleneiminyl)decyl)lithium, (4-(piperidinyl)-2-butenyl)lithium, (4-(hexamethyleneiminyl)-2-butenyl)lithium, (4-(heptamethyleneiminyl)-2-butenyl)lithium, (4-(octamethyleneiminyl)-2-butenyl)lithium, (4-(1,3,3-trimethyl-6-azabicyclo[3.2.1]octanyl)-2-butenyl)lithium, (4-(1,2,3,6-tetrahydropyridinyl)-2-butenyl)lithium, (4-(hexamethyleneiminyl)-2-methyl-2-butenyl)lithium, and (4-(hexamethyleneiminyl)-3-methyl-2-butenyl)lithium, and analogs of them satisfying the above conditions are also included therein.

The compound represented by the formula (8) is preferably (3-(piperidinyl)propyl)lithium, (3-(hexamethyleneiminyl)propyl)lithium, (3-(1,2,3,6-tetrahydropyridinyl)propyl) lithium, (4-(piperidinyl)-2-butenyl)lithium, or (4-(hexamethyleneiminyl)-2-butenyl)lithium, and more preferably (3-(piperidinyl)propyl)lithium, (4-(piperidinyl)-2-butenyl)lithium, (3-(hexamethyleneiminyl)propyl) lithium, or (4-(hexamethyleneiminyl)-2-butenyl)lithium, for reactivity to and interaction with an inorganic filler such as carbon black and silica.

The organic lithium compound having at least one nitrogen atom in the molecule represented by the formula (7) or (8) may be prepared in advance before the above-described polymerization step, and conventionally known preparation methods can be applied.

The organic lithium compound represented by the formula (8) in the case that $R^3$ is an alkylene group having from 1 to 20 carbon atoms can be obtained, for example, in a manner such that the amine represented by the formula (1) and an organic lithium compound are reacted together in a hydrocarbon solvent to prepare a lithium amide compound, with which a dihalogenated alkyl represented by the following formula (9) is reacted and an organic lithium compound is further reacted.

$$X^1—R^{3a}—X^2 \qquad (9)$$

In the formula (9), $X^1$ and $X^2$ are each any one of halogen atoms of I, Br, and Cl, and different from each other.

By taking advantage of difference in reactivity provided by the configuration such that $X^1$ and $X^2$ are different halogen atoms, halogen with the higher reactivity is first reacted with a lithium amide compound, and subsequently the other halogen is reacted with an organic lithium compound to afford a compound as illustrated in the formula (8). In the formula (9), $R^{3a}$ is an alkylene group having from 1 to 20 carbon atoms, preferably an alkylene group having from 2 to 16 carbon atoms, and more preferably an alkylene group having from 3 to 10 carbon atoms.

Examples of the compound represented by the formula (9) include, but are not limited to, 1-bromo-3-chloropropane, 1-bromo-4-chlorobutane, 1-bromo-5-chloropentane, 1-bromo-6-chlorohexane, 1-bromo-10-chlorodecane, 1-bromo-3-iodopropane, 1-bromo-4-iodobutane, 1-bromo-5-iodopentane, 1-bromo-6-iodohexane, 1-bromo-10-iododecane, 1-chloro-3-iodopropane, 1-chloro-4-iodobutane, 1-chloro-5-iodopentane, 1-chloro-6-iodohexane, and 1-chloro-10-iododecane.

Preferred as the compound represented by the formula (9) are 1-bromo-3-chloropropane, 1-bromo-4-chlorobutane, 1-bromo-5-chloropentane, 1-bromo-6-chlorohexane, and 1-bromo-10-chlorodecane, and more preferred are 1-bromo-3-chloropropane, 1-bromo-4-chlorobutane, and 1-bromo-6-chlorohexane, for reactivity and safety.

The reaction temperature in preparing a lithium amide compound by using the formula (1), an organic lithium compound, and a hydrocarbon solvent is preferably from 0 to 80° C., and the reaction temperature is preferably from 10 to 70° C. for productivity.

The reaction temperature in reacting the lithium amide compound and the compound represented by the formula (9) is preferably from −78 to 70° C., and more preferably from −50 to 50° C. The reaction temperature in the subsequent reaction between the compound obtained and an organic lithium compound is preferably from −78 to 70° C., and more preferably from −50 to 50° C.

In the case that $R^3$ of the organic lithium compound having at least one nitrogen atom in the molecule and represented by the formula (8) is any one of the formulas (3) to (5), the organic lithium compound of the formula (8) can be synthesized by using the following steps (I) to (IV).

Step (I): reacting the compound represented by the formula (1) and an organic lithium compound in a hydrocarbon solvent to synthesize a lithium amide compound.

Step (II): reacting the lithium amide compound obtained and butadiene or isoprene in a hydrocarbon solvent.

Step (III): adding an alcohol to deactivate lithium and subjecting the resulting product to distillation under reduced pressure.

Step (IV): reacting the product obtained through the distillation and an organic lithium compound in a hydrocarbon solvent.

The reaction temperature in the step (I) of preparing a lithium amide compound by using the compound represented by the formula (1), an organic lithium compound, and a hydrocarbon solvent is preferably from 0 to 80° C., and, the reaction temperature is preferably from 10 to 70° C. for productivity.

Although known materials of alcohol can be used, alcohols of low molecular weight are preferred, and, for example, methanol, ethanol, and isopropanol are preferred, and ethanol is more preferred.

The reaction temperature in the step (IV) is preferably from 0 to 80° C., and more preferably from 10 to 70° C.

In preparing the organic lithium compound represented by the formula (7) or (8), a polar compound may be added to the system. This provides effects of accelerating formation of the lithium compound represented by the formula (7) or (8) and solubilizing in hydrocarbon solvent.

<Polar Compound>

A polar compound may be added in the polymerization reaction step to form a conjugated diene polymer by polymerization in the method for producing the modified conjugated diene polymer according to the present embodiment.

Addition of a polar compound allows the aromatic vinyl monomer and the conjugated diene monomer to randomly copolymerize, and hence a polar compound can be used as a vinylating agent to control the microstructure of a conjugated diene part.

In addition, addition of a polar compound is effective, for example, for improving the polymerization rate.

Examples of the polar compound include, but are not limited to, ethers such as tetrahydrofuran, diethyl ether, dioxane, ethylene glycoldimethyl ether, ethylene glycoldibutyl ether, diethylene glycoldimethyl ether, diethylene glycoldibutyl ether, dimethoxybenzene, and 2,2-bis(2-oxolanyl)propane; tertiary amine compounds such as tetramethylethylenediamine, dipiperidinoethane, trimethylamine, triethylamine, pyridine, and quinuclidine; alkali metal alkoxide compounds such as potassium t-amylate, potassium t-butyrate, sodium t-butyrate, and sodium amylate; and phosphine compounds such as triphenylphosphine.

One of these polar compounds may be used singly, and two or more thereof may be used in combination.

Use of two or more polar compounds, specifically, use of tetrahydrofuran and other polar compounds is preferred because a sharper molecular weight distribution can be achieved.

The amount of use of the polar compound is not limited, and can be selected, for example, in accordance with the purpose.

In typical cases, the amount of use of the polar compound is preferably from 0.01 to 100 mol per mole of the above-described polymerization initiator.

The polar compound (vinylating agent) can be used as a regulator for the microstructure of a conjugated diene moiety in the polymer in an appropriate amount depending on a vinyl bond content intended.

Many polar compounds simultaneously exhibit randomizing effect effective in copolymerization of the conjugated diene monomer and the aromatic vinyl monomer, and hence can be used for adjusting the distribution of the aromatic vinyl monomer or as an adjuster for the styrene block content.

For example, a method of intermittently adding part of 1,3-butadiene during copolymerization, as described in Japanese Patent Laid-Open No. 59-140211, may be used to randomize the conjugated diene monomer and the aromatic vinyl monomer.

When a polymerization initiator formed by reacting a compound having a modifying group is used, a copolymer the starting end of which is modified is obtained, as described above. The conjugated diene polymer obtained in the polymerization step preferably has been modified at the starting end, and it is preferred in such a case to set the proportion of polymer chain(s) having the structure derived from the compound represented by the formula (1) or (2) at a molecular end in the modified conjugated diene polymer obtained to from 60% by mass to 99% by mass. In this case, the organic lithium compound and the compound having at least one nitrogen atom in the molecule are preferably added with an equimolar ratio.

In addition to the regulation of the ratio, the solution temperature at initiation of polymerization and the reaction peak temperature are preferably adjusted to set the proportion of polymer chain(s) having the structure derived from the compound represented by the formula (1) or (2) at a molecular end in the conjugated diene polymer to from 60% by mass to 99% by mass.

The solution temperature at initiation of polymerization (hereinafter, also referred to as "polymerization initiation temperature") is preferably 10° C. or more. To obtain a conjugated diene polymer in which the proportion of polymer chain(s) having the structure derived from the compound represented by the formula (1) or (2) at a molecular end is from 60% by mass to 99% by mass, the solution temperature at initiation of polymerization is preferably 44° C. or less.

The solution temperature at initiation of polymerization is more preferably 15° C. or more, and even more preferably 20° C. or more. The solution temperature at initiation of polymerization is more preferably 41° C. or less.

When the organic lithium compound represented by the formula (7) or (8) is reacted as a polymerization initiator, the reaction peak temperature is preferably 70° C. or more from the viewpoints of the conversion rate of monomers and reaction time. Further, the reaction peak temperature is preferably 90° C. or less to attain a coupling rate of from 70% to 95% by reacting a coupling agent. The reaction peak temperature is preferably 72° C. or more, and more preferably 73° C. or more. The reaction peak temperature is preferably 85° C. or less, and more preferably 80° C. or less.

By setting the polymerization initiation temperature to from 10 to 44° C. and setting the reaction peak temperature to from 70 to 85° C., a conjugated diene polymer can be obtained in which the proportion of polymer chain(s) having the structure derived from the compound represented by the formula (1) or (2) at a molecular end is from 60 to 99% by mass.

By setting the polymerization initiation temperature to from 20 to 41° C. and setting the reaction peak temperature to from 73 to 80° C., a conjugated diene polymer can be obtained in which the proportion of polymer chain(s) having the structure derived from the compound represented by the formula (1) or (2) at a molecular end is from 80% to 98% by mass.

In a production process for the modified conjugated diene polymer according to the present embodiment, the above-described organic lithium compound having at least one nitrogen atom in the molecule and represented by the formula (7) or (8) is used as a polymerization initiator to grow through anionic polymerization to obtain a conjugated diene polymer (Step 1), at least two modifiers are added thereto to obtain a polymer solution containing a modified conjugated diene polymer (Step 2), and the polymer solution is desolvated to obtain a modified conjugated diene polymer intended (Step 3).

For the modified conjugated diene polymer according to the present embodiment, a polymer having an active end formed by growing reaction through living anionic polymerization is preferred because a conjugated diene polymer having a high modification rate can be obtained.

After a conjugated diene polymer having a peak molecular weight of from 50,000 to 200,000 in a molecular weight distribution curve obtained from measurement by GPC (Step 1) is obtained as described above, at least two modifiers are added to the conjugated diene polymer to obtain a polymer solution containing a modified conjugated diene polymer (Step 2).

<Coupling Agent (Modifier)>

It is preferred for reactivity between the functional group of a coupling agent and an inorganic filler such as silica and balance between low hysteresis loss and wet skid resistance in a vulcanized product to react an active end of the conjugated diene polymer with a compound represented by the following formula (6) to obtain a modified conjugated diene polymer.

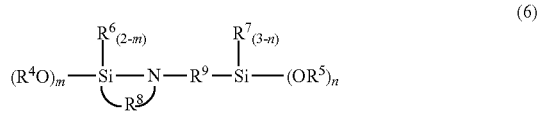

(6)

In the formula (6), $R^4$ to $R^7$ each independently represent an alkyl group having from 1 to 20 carbon atoms or an aryl group having from 6 to 20 carbon atoms; $R^8$ represents an alkylene group having from 3 to 10 carbon atoms; $R^9$ represents an alkylene group having from 1 to 20 carbon atoms; m is an integer of 1 or 2; and n is an integer of 2 or 3.

In the compound represented by the formula (6) (hereinafter, also referred to as "the coupling agent represented by the formula (6)"), it is preferable that m be 2 and n be 3.

This provides increased reactivity between the functional group of the coupling agent and an inorganic filler such as silica and enhanced balance between fuel-saving performance and wet skid performance in a vulcanized product, and enhanced processability can be achieved.

Examples of the coupling agent represented by the formula (6) include, but are not limited to, 2,2-dimethoxy-1-(3-trimethoxysilylpropyl)-1-aza-2-silacyclopentane, 2,2-diethoxy-1-(3-triethoxysilylpropyl)-1-aza-2-silacyclopentane, 2,2-dimethoxy-1-(4-trimethoxysilylbutyl)-1-aza-2-silacyclohexane, 2,2-dimethoxy-1-(5-trimethoxysilylpentyl)-1-aza-2-silacycloheptane, 2,2-dimethoxy-1-(3-dimethoxymethylsilylpropyl)-1-aza-2-silacyclopentane, 2,2-diethoxy-1-(3-diethoxyethylsilylpropyl)-1-aza-2-silacyclopentane, 2-methoxy-2-methyl-1-(3-trimethoxysilylpropyl)-1-aza-2-silacyclopentane, 2-ethoxy-2-ethyl-1-(3-triethoxysilylpropyl)-1-aza-2-silacyclopentane, 2-methoxy-2-methyl-1-(3-dimethoxymethylsilylpropyl)-1-aza-2-silacyclopentane, and 2-ethoxy-2-ethyl-1-(3-diethoxyethylsilylpropyl)-1-aza-2-silacyclopentane.

As described above, it is preferable for reactivity to and interaction between the functional group of the coupling agent and an inorganic filler such as silica and for processability that m be 2 and n be 3 in the formula (6); specifically, 2,2-dimethoxy-1-(3-trimethoxysilylpropyl)-1-aza-2-silacyclopentane and 2,2-diethoxy-1-(3-triethoxysilylpropyl)-1-aza-2-silacyclopentane are preferred.

The coupling rate of the modified conjugated diene polymer with the coupling agent represented by the formula (6) is preferably from 70 to 95% by mass for reactivity to and interaction between the functional group of the coupling agent and an inorganic filler such as silica and for processability.

The lower limit of the coupling rate is preferably 75% by mass or more, and more preferably 80% by mass or more.

The upper limit of the coupling rate is preferably 93% by mass or less, and more preferably 90% by mass or less.

The coupling rate can be controlled within the range through adjusting the reaction peak temperature before addition of the coupling agent represented by the formula (6) in the polymerization step.

The reaction temperature, reaction time in reacting the coupling agent and an active end of the conjugated diene polymer obtained in (Step 1) are not limited, it is preferred to react at from 0 to 120° C. for 30 seconds or more.

In order to attain a sufficient coupling rate in modification reaction between the coupling agent represented by the formula (6) and the conjugated diene polymer, the total number of moles of alkoxy groups bonding to a silyl group in the compound represented by the formula (6) is preferably 0.6 times or more the number of moles of lithium constituting the above-described polymerization initiator, and preferably 3 times or less the number of moles of lithium constituting the above-described polymerization initiator, from the viewpoint of the cost of the modifier, in addition to the viewpoint that it is preferred to obtain a branched polymer component through coupling of polymer ends for improved processability.

The total number of moles is more preferably in the range of from 0.8 to 2.5 times, even more preferably, from 0.8 to 2 times the number of moles of lithium constituting the above-described polymerization initiator.

It is only required for the coupling step that a modified conjugated diene polymer is obtained through reaction between an active end of the conjugated diene copolymer obtained in the polymerization step and the coupling agent represented by the formula (6), where the action is inferred as follows.

In the case that an azasilane compound, which has a cyclic structure, such as 2,2-dimethoxy-1-(3-trimethoxysilylpropyl)-1-aza-2-silacyclopentane is used as a coupling agent, for example, an active end of the conjugated diene polymer reacts with an alkoxysilyl group or an Si—N bonding portion of the coupling agent to form a bond between an end of the conjugated diene polymer and Si (see the formula (10) below).

In the case that 4 mol of active ends of the conjugated diene polymer react per mole of the coupling agent, for example, a modified conjugated diene polymer in which four molecular chains are coupled as illustrated in the formula (10) below is obtained.

Further, reaction with an alcohol or water forms a secondary amino group. The modified conjugated diene polymer having such a secondary amino group and alkoxysilyl groups is inferred to impart superior balance between low hysteresis loss and wet skid resistance and abrasion resistance enough for practical use to a vulcanized product formed by using the modified conjugated diene polymer, and allow the vulcanized product to exhibit superior processability.

The mechanism of action in the coupling step is not limited to the described example.

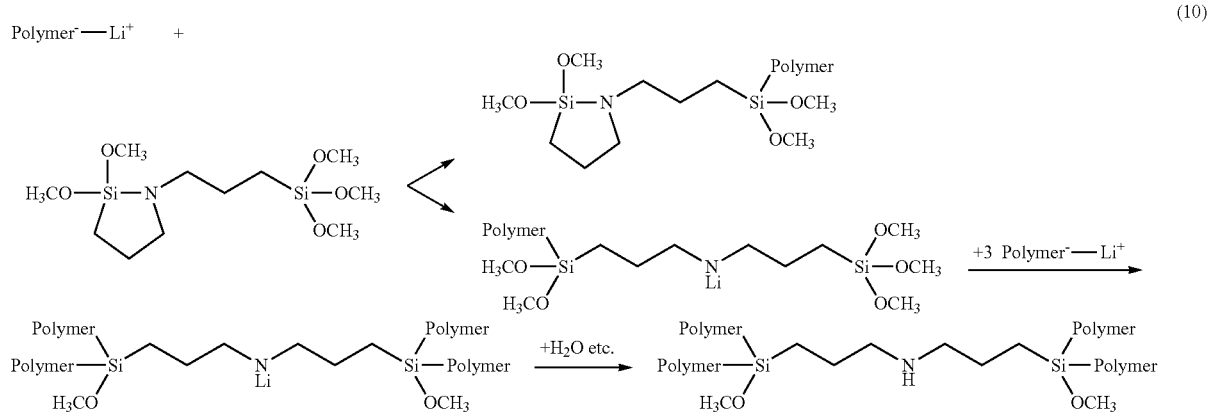

(10)

The modified conjugated diene polymer obtained in the above-described coupling step has a nitrogen atom-containing functional group at a starting end, and a vulcanized product formed by using the modified conjugated diene polymer is superior in balance between fuel-saving performance and wet skid resistance, and superior in abrasion resistance and processability.

When the modified conjugated diene polymer obtained in the above-described coupling step has one secondary amino group and at least one alkoxysilyl group, the modified conjugated diene polymer can impart superior balance between low hysteresis loss and wet skid resistance and abrasion resistance enough for practical use to a vulcanized product formed by using the modified conjugated diene polymer, and allows the vulcanized product to exhibit superior processability.

In the method for producing the modified conjugated diene polymer according to the present embodiment, the coupling agent is not limited to those described above, and a compound having a structure differing from those of the above coupling agents may be used as a coupling agent (modifier).

Coupling agents having an amino group are preferred for balance between low hysteresis loss and wet skid resistance in a vulcanized product.

Examples of such coupling agents include, but are not limited to, 3-(4-methylpiperazin-1-yl)propyltriethoxysilane, 1-[3-(diethoxyethylsilyl)propyl]-4-methylpiperazine, 1-[3-(trimethoxysilyl)propyl]-3-methylimidazolidine, 1-[3-(diethoxysilyl)propyl]-3-ethylimidazolidine, 1-[3-(triethoxysilyl)propyl]-3-methylhexahydropyrimidine, 1-[3-(dimethoxymethylsilyl)propyl]-3-methylhexahydropyrimidine, 3-[3-(tributoxysilyl)propyl]-1-methyl-1,2,3,4-tetrahydropyrimidine, 3-[3-(dimethoxymethylsilyl)propyl]-1-ethyl-1,2,3,4-tetrahydropyrimidine, 1-(2-ethoxyethyl)-3-[3-(trimethoxysilyl)propyl]imidazolidine, (2-{3-[3-(trimethylsilyl)propyl]tetrahydropyrimidine-yl}ethyl)dimethylamine, 1-[3-(triethoxysilyl)propyl]-4-(trimethylsilyl)piperazine, 1-[3-(dimethoxymethylsilyl)propyl]-4-(trimethylsilyl)piperazine, 1-[3-(tributoxysilyl)propyl]-4-(trimethylsilyl)piperazine, 1-[3-(diethoxyethylsilyl)propyl]-3-(triethylsilyl)imidazolidine, 2-(trimethoxysilanyl)-1,3-dimethylimidazolidine, 1-[3-(triethoxysilyl)propyl]-3-(trimethylsilyl)imidazolidine, 1-[3-(dimethoxymethylsilyl)propyl]-3-(trimethylsilyl)hexahydropyrimidine, 1-[3-(triethoxysilyl)propyl]-3-(trimethylsilyl) hexahydropyrimidine, and 1-[4-(triethoxysilyl)propyl]-4-(trimethylsilyl)piperazine.

Further examples include, but are not limited to, 2-[3-(trimethoxysilyl)propyl]-1,3-dimethylimidazolidine, 2-[3-(trimethoxysilyl)propyl]-1,3-(bistrimethylsilyl)imidazolidine, 2-(diethoxydiethylsilyl)-1,3-diethylimidazolidine, 2-(triethoxysilyl)-1,4-diethylpiperazine, 2-(dimethoxymethylsilyl)-1, 4-dimethylpiperazine, 5-(triethoxysilyl)-1,3-dipropylhexahydropyrimidine, 5-(diethoxyethylsilyl)-1,3-diethylhexahydropyrimidine, {2-[3-(2-dimethylaminoethyl)-2-(ethyldimethoxysilyl)-imidazolidine-1-yl]-ethyl}-dimethylamine, 5-(trimethoxysilyl)-1,3-bis-(2-methoxyethyl)-hexahydropyrimidine, 5-(ethyldimethoxysilyl)-1,3-bis-(2-trimethylsilylethyl)-hexahydropyrimidine1-1,3-dimethylimidazolidine, 2-(3-diethoxyethylsilyl-propyl)-1,3-diethylimidazolidine, 2-(3-triethoxysilyl-propyl)-1,4-diethylpiperazine, 2-(3-dimethoxymethylsilyl-propyl)-1,4-dimethylpiperazine, 5-(3-triethoxysilyl-propyl)-1,3-dipropylhexahydropyrimidine, 5-(3-diethoxyethylsilyl-propyl)-1,3-diethylhexahydropyrimidine, {2-[3-(2-dimethylaminoethyl)-2-(3-ethyldimethoxysilyl-propyl)-imidazolidine-1-yl]-ethyl}-dimethylamine, 5-(3-trimethoxysilyl-propyl)-1,3-bis-(2-methoxyethyl)-hexahydropyrimidine, 5-(3-ethyldimethoxysilyl-propyl)-1, 3-bis-(2-trimethylsilylethyl)-hexahydropyrimidine, 2-[3-(trimethoxysilyl)propyl]-1,3-bis(trimethylsilyl) imidazolidine, 2-(diethoxyethylsilyl)-1,3-bis(triethylsilyl) imidazolidine, 2-(triethoxysilyl)-1,4-bis(trimethylsilyl) piperazine, 2-(dimethoxymethylsilyl)-1,4-bis (trimethylsilyl)piperazine, and 5-(triethoxysilyl)-1,3-bis (tripropylsilyl)hexahydropyrimidine.

Further examples include, but are not limited to, [3-(1-hexamethyleneimino)propyl]triethoxysilane, [3-(1-hexamethyleneimino)propyl]trimethoxysilane, [2-(1-hexamethyleneimino)ethyl]triethoxysilane, [2-(1-hexamethyleneimino) ethyl]trimethoxysilane, [3-(1-pyrrolidinyl)propyl] triethoxysilane, [3-(1-pyrrolidinyl)propyl]trimethoxysilane, [3-(1-heptamethyleneimino)propyl]triethoxysilane, [3-(1- dodecamethyleneimino)propyl]triethoxysilane, [3-(1-hexamethyleneimino)propyl]diethoxymethylsilane, [3-(1-hexamethyleneimino)propyl]diethoxyethylsilane, N-[3-(triethoxysilyl)-propyl]-N,N'-diethyl-N'-trimethylsilylethane-1,2-diamine, N-[2-(trimethoxysilanyl)-ethyl]-N,N', N'-trimethylethane-1,2-diamine, and N,N-bis(trimethylsilyl) aminopropylmethyldiethoxysilane.

Further examples include tetraglycidyl meta-xylenediamine, tetraglycidyl aminodiphenylmethane, tetraglycidyl-p-phenylenediamine, diglycidyl aminomethylcyclohexane, and tetraglycidyl-1,3-bisaminomethylcyclohexane. Further examples include, but are not limited to, isocyanate compounds such as 2,4-tolylene diisocyanate, 2,6-tolylene diisocyanate, diphenylmethane diisocyanate, diphenylethane diisocyanate, and 1,3,5-benzene triisocyanate.

<Other Coupling Agents>

The coupling agent for the modified conjugated diene polymer according to the present embodiment is not limited to those described above, and may be a coupling agent having a modifying group of another type.

Examples of the modifying group of another type include, but are not limited to, an epoxy group, a carbonyl group, a carboxylate ester group, a carboxylic acid amide group, an acid anhydride group, a phosphate group, a phosphite group, an epithio group, a thiocarbonyl group, a thiocarboxylate ester group, a dithiocarboxylate ester group, a thiocarboxylic acid amide group, an imino group, an ethyleneimino group, a halogen group, an alkoxysilyl group, an isocyanate group, a thioisocyanate group, a conjugated diene group, and an arylvinyl group, and examples of the coupling agent having a modifying group of another type include coupling agents having one or more functional groups selected from the listed groups.

Examples of such other coupling agents include, but are not limited to, halogenated silane compounds such as silicon tetrachloride, silicon tetrabromide, silicon tetraiodide, monomethyltrichlorosilicon, monoethyltrichlorosilicon, monobutyltrichlorosilicon, monohexyltrichlorosilicon, monomethyltribromosilicon, and bistrichlorosilylethane; and alkoxy halogenated silane compounds such as monochlorotrimethoxysilane, monobromotrimethoxysilane, dichlorodimethoxysilane, dibromodimethoxysilane, trichloromethoxysilane, and tribromomethoxysilane.

Further examples include, but are not limited to, alkoxysilane compounds such as tetramethoxysilane, tetraethoxysilane, tetrabutoxysilane, and alkyltriphenoxysilane; and compounds having an imino group and an alkoxysilyl group such as tristrimethoxysilylpropylamine, triethoxysilylpropylamine, N-(1,3-dimethylbutylidene)-3-(triethoxysilyl)-1-propaneamine, N-(1,3-dimethylbutylidene)-3-(tributoxysilyl)-1-propaneamine, N-(1-methylpropylidene)-3-(triethoxysilyl)-1-propaneamine, N-ethylidene-3-(triethoxysilyl)-1-propaneamine, and N-(3-triethoxysilylpropyl)-4,5-dihydroimidazole.

Further, when the modified conjugated diene polymer obtained in the above-described modification step has a structure including one to six branches, this modified conjugated diene polymer and the corresponding modified conjugated diene polymer composition have superior processability. For this reason, it is more preferable for the modified conjugated diene polymer obtained in the modification step to have a structure including one to six branches.

The coupling rate (modification rate) of the modified conjugated diene polymer obtained by using the method for producing the modified conjugated diene polymer according to the present embodiment can be determined from the amount of adsorption on a column packed with silica particles in measurement with gel permeation chromatography (GPC). That is, the coupling rate (modification rate) is the fraction of polymer having a functional group component.

The coupling rate (modification rate) is measured after an active end has been deactivated after the coupling (modification) step.

To quantify polymer having a functional group component, a method of measuring with chromatography capable of separating modified components having a functional group from unmodified components can be applied. Examples of methods with such chromatography include a method of quantification by using a GPC column including a packing material of a polar substance such as silica to adsorb functional group components thereon with an internal standard of a nonadsorbable component for comparison.

After the polymerization step, in which an organic lithium compound as a polymerization initiator is added to a conjugated diene monomer in the presence of the compound represented by the formula (1) or (2) to polymerize the conjugated diene monomer, or after the step of further reacting with the above-described coupling agent (hereinafter, also referred to as "modification step") in the method for producing the modified conjugated diene polymer according to the present embodiment, a deactivating agent, a neutralizing agent, or the like may be added to the solution of the modified conjugated diene polymer, as necessary.

Examples of the deactivating agent include, but are not limited to, water and alcohol such as methanol, ethanol, and isopropanol.

Examples of the neutralizing agent include, but are not limited to, carboxylic acid such as stearic acid, oleic acid, and versatic acid; aqueous solution of inorganic acid; and carbon dioxide gas.

After the above-described modification step (Step 2), the polymer solution is desolvated to obtain a modified conjugated diene polymer.

Known methods can be used to obtain the modified conjugated diene polymer according to the present embodiment from the polymer solution.

Examples of the method include a method in which the solvent is separated through steam stripping or the like, and the conjugated diene polymer is then collected through filtration, and further dehydrated and dried to obtain the conjugated diene polymer, a method of concentrating with a flushing tank and further devolatilizing with a vent extruder or the like, and a method of directly devolatilizing with a drum dryer or the like.

Examples of methods for producing the modified conjugated diene polymer according to the present embodiment so that the modified conjugated diene polymer according to the present embodiment has at least two peaks include, but are not limited to, (1) a method of adding to a conjugated diene polymer before modification two or more modifiers differing in the number of functional groups, (2) a method of blending together at least two conjugated diene polymers after modification, as a second production method described later, and (3) a method in which a modifier is added to a conjugated diene polymer before modification so that the amount of the modifier is insufficient to the number of active ends, and a conjugated diene compound and an aromatic vinyl compound are additionally added to react, and a modifier is further added, as necessary.

The peak molecular weight of each peak can be controlled, for example, through the loading of the initiator or the number of functional groups of each modifier.

The area ratio of each peak can be controlled, for example, through the type, loading, or blend ratio of each modifier, though the method is not limited thereto.

The nitrogen content can be controlled, for example, through the type or loading of the initiator, or the type or loading of each modifier.

(Second Production Method)

Alternatively, the modified conjugated diene polymer according to the present embodiment can be produced by using a second production method described in the following.

The second production method includes (Step A) to (Step D):

(Step A) a step of obtaining a polymer solution containing a high-molecular-weight conjugated diene polymer having a peak of peak molecular weight of from 500,000 to 2,500,000 in a molecular weight distribution curve obtained from measurement by gel permeation chromatography (GPC);

(Step B) a step of obtaining a polymer solution containing a low-molecular-weight modified conjugated diene polymer having a peak of peak molecular weight of from 50,000 to 200,000 in a molecular weight distribution curve obtained from measurement by gel permeation chromatography (GPC) and modified with a modifier having at least one nitrogen atom;

(Step C) a step of mixing the polymers obtained in (Step A) and (Step B) together with a mass ratio of (high-molecular-weight conjugated diene polymer):(low-molecular-weight modified conjugated diene polymer)=15:85 to 85:15; and (Step D) a step of desolvating the polymer mixture obtained in (Step C) when the polymer mixture is a polymer solution.

(Step A) and (Step B) may be performed in an arbitrary order, and may be performed concurrently.

(Step C) is performed after or concomitantly with (Step A) and (Step B), and (Step D) is performed after (Step C).

<(Step A)>

In (Step A) in the method for producing the modified conjugated diene polymer according to the present embodiment, the polymer solution containing a high-molecular-weight conjugated diene polymer having a peak of peak molecular weight of from 500,000 to 2,500,000 in a molecular weight distribution curve obtained from measurement by gel permeation chromatography (GPC) is a polymer solution in which the high-molecular-weight conjugated diene polymer has been formed by polymerization, or a polymer solution obtained by adding a solvent to a high-molecular-weight conjugated diene polymer in the form of solid after being desolvated to dissolve the high-molecular-weight conjugated diene polymer.

The solvent may be any solvent capable of dissolving the high-molecular-weight conjugated diene polymer therein, and, for example, hexane and cyclohexane are preferred.

The concentration of the high-molecular-weight conjugated diene polymer in the polymer solution obtained in (Step A) is preferably from 3% by mass to 40% by mass, and more preferably from 5% by mass to 30% by mass.

<High-Molecular-Weight Conjugated Diene Polymer>

The high-molecular-weight conjugated diene polymer in the polymer solution obtained in (Step A) is a homopolymer of a conjugated diene compound, or a copolymer of a conjugated diene compound and a vinyl aromatic compound.

The fraction of the conjugated diene compound in the high-molecular-weight conjugated diene polymer is preferably 30% by mass or more, and, for balancing low hysteresis loss and wet skid properties, the fraction of the vinyl aromatic compound is preferably 5% by mass or more, and more preferably 10% by mass or more. The vinyl bond content of a conjugated diene-based compound moiety in the high-molecular-weight conjugated diene polymer is preferably from 25 to 70%, more preferably from 25 to 68%, and even more preferably from 25 to 65%.

The weight-average molecular weight of the high-molecular-weight conjugated diene polymer in GPC in terms of polystyrene is preferably from 450,000 to 1,500,000, and more preferably from 450,000 to 1,200,000. For abrasion resistance, the peak molecular weight in GPC in terms of polystyrene is preferably from 500,000 to 2,500,000, and more preferably from 500,000 to 2,000,000.

For balancing processability and abrasion resistance, the area of the peak of peak molecular weight of from 500,000 to 2,500,000 is preferably from 20% to 90%, and more preferably from 25% to 88%, as the area of a molecular weight distribution curve obtained for the high-molecular-weight conjugated diene polymer in GPC is defined as 100%.

The high-molecular-weight conjugated diene polymer to be obtained in (Step A) may be modified or unmodified. However, the high-molecular-weight conjugated diene polymer is preferably modified for low hysteresis loss, and the fraction of a conjugated diene polymer having a nitrogen atom is preferably from 60% by mass to 99% by mass. The nitrogen content is preferably from 20 ppm to 200 ppm.

<(Step B)>

The polymer solution containing a low-molecular-weight modified conjugated diene polymer having a peak of peak molecular weight of from 50,000 to 200,000 in a molecular weight distribution curve obtained from measurement by gel permeation chromatography (GPC) and modified with a modifier having at least one nitrogen atom in (Step B) in the method for producing the modified conjugated diene polymer according to the present embodiment is a polymer solution in which the low-molecular-weight modified conjugated diene polymer has been formed by polymerization, or a polymer solution obtained by adding a solvent to a low-molecular-weight modified conjugated diene polymer in the form of solid after being desolvated to dissolve the low-molecular-weight modified conjugated diene polymer.

The modifier is a modifier having at least one nitrogen-containing functional group.

The solvent may be any solvent capable of dissolving the low-molecular-weight modified conjugated diene polymer therein, and, for example, hexane and cyclohexane are preferred.

The concentration of the low-molecular-weight modified conjugated diene polymer in the polymer solution to be obtained in (Step B) is preferably from 3% by mass to 40% by mass, and more preferably from 5% by mass to 30% by mass.

<Low-Molecular-Weight Modified Conjugated Diene Polymer>

The low-molecular-weight modified conjugated diene polymer in the polymer solution obtained in (Step B) is a copolymer of a conjugated diene compound and a vinyl aromatic compound, and the fraction of the conjugated diene compound in the low-molecular-weight modified conjugated diene polymer is preferably 30% by mass or more, and, for balancing low hysteresis loss and wet skid properties, the fraction of the vinyl aromatic compound is preferably 5% by mass or more, and more preferably 10% by mass or more. The vinyl bond content of a conjugated diene-based compound moiety in the low-molecular-weight conjugated diene polymer is preferably from 25 to 70%, more preferably from 25 to 68%, and even more preferably from 25 to 65%.

The weight-average molecular weight of the low-molecular-weight conjugated diene polymer in GPC in terms of polystyrene is preferably from 120,000 to 350,000, and more preferably from 150,000 to 350,000.

For processability, the low-molecular-weight modified conjugated diene polymer has a peak of peak molecular weight of from 50,000 to 200,000 in GPC in terms of polystyrene, and preferably has a peak of peak molecular weight of from 60,000 to 150,000. Cases with a peak molecular weight of 50,000 or more are preferred because of good balance between low hysteresis loss and abrasion resistance.

For improved balance between processability and abrasion resistance, the area of the peak of peak molecular weight of from 50,000 to 200,000 is preferably from 5% to 60%, and more preferably from 5% to 40%, as the area of a molecular weight distribution curve obtained for the low-molecular-weight modified conjugated diene polymer in GPC is defined as 100%.

For abrasion resistance and low hysteresis loss, the fraction of the modified polymer chain(s) in the low-molecular-weight modified conjugated diene polymer is preferably from 60% to 99%, more preferably from 65% to 99%, and even more preferably from 70% to 99%. The nitrogen content is preferably from 120 ppm to 800 ppm.

<(Step C)>

In (Step C) in the method for producing the modified conjugated diene polymer according to the present embodiment, the polymers obtained in (Step A) and (Step B) are mixed together.

In mixing the polymer solutions together, it is preferred to mix the polymer solutions together to homogeneous state.

For balances between low hysteresis loss and wet skid properties and between abrasion resistance and processability, the blend ratio is in the range of (high-molecular-weight conjugated diene polymer):(low-molecular-weight modified conjugated diene polymer)=15:85 to 85:15 in a mass ratio, preferably 20:80 to 80:20, and even more preferably 30:70 to 70:30.

<(Step D)>

In (Step D) in the method for producing the modified conjugated diene polymer according to the present embodiment, the polymer mixture obtained in (Step C) is desolvated when the polymer mixture is a polymer solution.

In this desolvation step, known methods with a desolvating agent can be used.

Examples of the method include a method in which the solvent is separated through steam stripping or the like, and the conjugated diene polymer is then collected through filtration, and further dehydrated and dried to obtain the conjugated diene polymer, a method of concentrating with a flushing tank and further devolatilizing with a vent extruder or the like, and a method of directly devolatilizing with a drum dryer or the like.

A method of mixing of the high-molecular-weight conjugated diene polymer and the low-molecular-weight modified conjugated diene polymer together in the method for producing the modified conjugated diene polymer according to the present embodiment is not limited to the above-described method, and, for example, a method may be used in which solvent is separated in advance from the polymer solution obtained in (Step A) and the polymer solution obtained in (Step B) through steam stripping or the like, each polymer is collected through filtration, and further dehydrated and dried, and the resulting solids of polymers are mixed together, and a method may be used in which one of the polymer solutions may be converted into a solid and mixed with the other polymer solution.

An additive such as a rubber stabilizer and an extender oil may be added to the modified conjugated diene polymer according to the present embodiment.

For preventing gel formation after polymerization and for enhanced stability in processing, a rubber stabilizer is preferably added to the modified conjugated diene polymer according to the present embodiment.

Known rubber stabilizers can be used, and antioxidants such as 2,6-di-tert-butyl-4-hydroxytoluene (BHT), n-octadecyl-3-(4'-hydroxy-3'5'-di-tert-butylphenol)propionate, and 2-methyl-4,6-bis[(octylthio)methyl]phenol are preferred, though the rubber stabilizer is not limited thereto.

In order to further improve the processability of the modified conjugated diene polymer according to the present embodiment, an extender oil can be added to the conjugated diene copolymer, as necessary.

The method of adding an extender oil to the conjugated diene polymer is not limited, and a method is preferred in which an extender oil is added to the polymer solution and mixed to form an oil-extended copolymer solution, which is desolvated.

Examples of the extender oil include, but are not limited to, aromatic oil, naphthenic oil, and paraffinic oil. Aromatic oil substitutes having 3% by mass or less of polycyclic aromatic (PCA) components as measured in the IP346 method are preferred for environmental safety, preventing oil bleeding, and wet grip properties.

Examples of such aromatic oil substitutes include TDAE (Treated Distillate Aromatic Extracts) and MES (Mild Extraction Solvate) shown in kautschuk Gumml Kunststoffe 52(12) 799 (1999), and RAE (Residual Aromatic Extracts).

The loading of the extender oil is not limited, and typically from 10 to 60 parts by mass, and preferably from 20 to 37.5 parts by mass, based on 100 parts by mass of the conjugated diene polymer.

[Modified Conjugated Diene Polymer Composition]

The modified conjugated diene polymer composition according to the present embodiment contains a rubber composition containing the above-described modified conjugated diene polymer according to the present embodiment and a specific rubber component; and a reinforcing filler, a vulcanizing agent, and a vulcanization accelerator.

Examples of the reinforcing filler include silica-based inorganic fillers.

A suitable example of the modified conjugated diene polymer composition according to the present embodiment is a modified conjugated diene polymer composition containing: 100 parts by mass of a rubber component preferably containing 20 parts by mass or more of the modified conjugated diene polymer according to the present embodiment; from 1 part by mass to 150 parts by mass of a reinforcing filler; and from 0.1 parts by mass to 20 parts by mass in total of a vulcanizing agent and a vulcanization accelerator.

(Rubber Component)

A rubbery polymer differing from the modified conjugated diene polymer according to the present embodiment can be used for the rubber component.

Examples of the rubbery polymer differing from the modified conjugated diene polymer according to the present embodiment include, but are not limited to, conjugated diene polymer or hydrogenated products thereof; random copolymer of a conjugated diene-based compound and a vinyl aromatic compound, or hydrogenated products thereof; block copolymer of a conjugated diene-based compound and a vinyl aromatic compound, or hydrogenated products thereof; non-diene polymer; and natural rubber.

Specific examples of the rubbery polymer differing from the modified conjugated diene polymer according to the present embodiment include butadiene rubber or hydrogenated products thereof; isoprene rubber and hydrogenated products thereof; styrenic elastomer such as styrene-butadiene rubber or hydrogenated products thereof, styrene-butadiene block copolymer or hydrogenated products thereof, and styrene-isoprene block copolymer or hydrogenated products thereof; and acrylonitrile-butadiene rubber or hydrogenated products thereof.

Examples of the non-diene polymer include, but are not limited to, olefinic elastomer such as ethylene-propylene rubber, ethylene-propylene-diene rubber, ethylene-butene-diene rubber, ethylene-butene rubber, ethylene-hexene rubber, and ethylene-octene rubber; butyl rubber; brominated butyl rubber; acrylic rubber; fluororubber; silicone rubber; chlorinated polyethylene rubber; epichlorohydrin rubber; α,β-unsaturated nitrile-acrylate-conjugated diene copolymer rubber; urethane rubber; and polysulfide rubber.

The rubbery polymers mentioned above may be each a modified rubber to which a polar functional group such as a hydroxy group and an amino group has been imparted.

The weight-average molecular weight of each of the rubbery polymers mentioned above is preferably 2,000 to 2,000,000, and more preferably 5,000 to 1,500,000, for balance between performance and processing properties.

Alternatively, what is called liquid rubber, which has low molecular weight, can be used.

Only one of the above rubbery polymers may be used singly, and two or more thereof may be used in combination.

In the case that the rubber composition constituting the modified conjugated diene polymer composition according to the present embodiment contains the modified conjugated diene polymer according to the present embodiment and any of the above rubbery polymers, the blend ratio (mass ratio) of them as modified conjugated diene polymer/rubbery polymer is preferably from 20/80 to 100/0, more preferably from 30/70 to 90/10, and even more preferably from 50/50 to 80/20.

When the blend ratio as modified conjugated diene polymer/rubbery polymer is within the range, a vulcanized product having superior balance between low hysteresis loss and wet skid resistance, and having more satisfactory abrasion resistance can be obtained.

The modified conjugated diene polymer composition according to the present embodiment is particularly suitable, for example, as a composition for various footwear.

In order to obtain a composition having further superior balance between rebound resilience and wet skid properties, the block ratio of the vinyl aromatic compound is preferably 15% by mass or less, and more preferably 3% by mass or less.

Such a modified conjugated diene polymer composition is particularly suitable, for example, as a composition for tires.

(Reinforcing Filler)

When a silica-based inorganic filler is dispersed as a reinforcing filler in the modified conjugated diene polymer according to the present embodiment, a vulcanized product of the modified conjugated diene polymer has superior balance between low hysteresis loss and wet skid resistance and abrasion resistance enough for practical use, and thus superior processability can be imparted.

The silica-based inorganic filler is not limited, and any known silica-based inorganic filler can be used; however, solid particles including constituent units of $SiO_2$ or $Si_3Al$ are preferred, and solid particles including constituent units of $SiO_2$ or $Si_3Al$ as a primary component are more preferred.

Here, the term "primary component" refers to a component contained in the silica-based inorganic filler such that the content of the component is 50% by mass or more, preferably 70% by mass or more, and even more preferably 80% by mass or more.

Examples of the silica-based inorganic filler include, but are not limited to, silica, clay, talc, mica, diatomaceous earth, wollastonite, montmorillonite, zeolite, and inorganic fibrous materials such as glass fibers. In addition, a surface-hydrophobized silica-based inorganic filler or a mixture of a silica-based inorganic filler and an inorganic filler based on a non-silica material can be used.

Among them, silica and glass fibers are preferred, and silica is more preferred, for strength, abrasion resistance, and so forth.

Examples of silica include dry silica, wet silica, and synthesized silicate silica. Among them, wet silica is preferred because of superior balance between improving effect on fracture properties and wet skid resistance, and the nitrogen adsorption specific surface area of the silica-based inorganic filler as determined in a BET adsorption method is preferably from 100 to 300 $m^2/g$, and more preferably from 170 to 250 $m^2/g$, to achieve good abrasion resistance and fracture properties for practical use.

As necessary, a silica-based inorganic filler having a relatively small specific surface area (e.g., a specific area of 200 $m^2/g$ or less) and a silica-based inorganic filler having a relatively large specific surface area (e.g., a specific area of 200 $m^2/g$ or more) can be used in combination. Thereby, good abrasion resistance and fracture properties and low hysteresis loss can be balanced at a high level.

In the case that a silica-based inorganic filler is used as a reinforcing filler for the modified conjugated diene polymer composition according to the present embodiment, the content of the silica-based inorganic filler is preferably from 1 to 150 parts by mass, preferably from 5 to 150 parts by mass, and more preferably from 20 to 100 parts by mass, based on 100 parts by mass of the rubber composition containing the modified conjugated diene polymer according to the present embodiment.

The content of the silica-based inorganic filler is preferably 0.5 parts by mass or more to allow the silica-based inorganic filler to exhibit the effect of addition, and, on the other hand, preferably 300 parts by mass or less to disperse the silica-based inorganic filler sufficiently to make the processability and abrasion resistance of the composition enough for practical use.

(Carbon Black)

The modified conjugated diene polymer composition according to the present embodiment may contain carbon black.

The carbon black is not limited, and carbon blacks of various classes including SRF, FEF, HAF, ISAF, and SAF can be used. Among them, carbon blacks having a nitrogen adsorption specific surface area of 50 $m^2/g$ or more and a dibutyl phthalate (DBP) adsorption of 80 mL/100 g are preferred.

The content of carbon black is preferably from 0.5 to 100 parts by mass, more preferably from 3 to 100 parts by mass, and even more preferably from 5 to 50 parts by mass, based on 100 parts by mass of the rubber composition containing the modified conjugated diene polymer according to the present embodiment.

The content of carbon black is preferably 0.5 parts by mass or more for exhibition of performance required for tire application, etc., such as dry grip performance and conductivity, and is preferably 100 parts by mass or less for dispersibility.

(Metal Oxide/Metal Hydroxide)

The modified conjugated diene polymer composition according to the present embodiment may contain a metal oxide or metal hydroxide in addition to the above-described silica-based inorganic filler and carbon black.

The metal oxide is a solid particle including constituent units of the chemical formula $M_xO_y$ as a primary component, where M represents a metal atom, and x and y each represent an integer of from 1 to 6, and applicable examples thereof include, but are not limited to, alumina, titanium oxide, magnesium oxide, and zinc oxide. In addition, a mixture of a metal oxide and an inorganic filler other than metal oxides can be used.

Examples of the metal hydroxide include, but are not limited to, aluminum hydroxide, magnesium hydroxide, and zirconium hydroxide.

(Silane Coupling Agent)

The conjugated diene polymer composition according the present embodiment may contain a silane coupling agent.

The silane coupling agent has a function to strengthen the interaction between the rubber component and the silica-based inorganic filler, and has groups having affinity for or bondability to the rubber composition and the silica-based inorganic filler, respectively, and compounds having a sulfur bonding moiety, an alkoxysilyl group, and a silanol group moiety in one molecule are typically used.

Examples of the silane coupling agent include, but are not limited to, bis-[3-(triethoxysilyl)-propyl]-tetrasulfide, bis-[3-(triethoxysilyl)-propyl]-disulfide, and bis-[2-(triethoxysilyl)-ethyl]-tetrasulfide.

The content of the silane coupling agent is preferably from 0.1 to 30 parts by mass, more preferably from 0.5 to 20 parts by mass, and even more preferably from 1 to 15 parts by mass, based on 100 parts by mass of the silica-based inorganic filler. When the amount of the silane coupling agent blended is within the range, more significant effect of addition of the silane coupling agent is achieved.

(Rubber Softener)

The modified conjugated diene polymer composition according to the present embodiment may contain a rubber softener to improve processability.

Mineral oil and liquid or low-molecular-weight synthesized softeners are suitable as the rubber softener.

Mineral oil rubber softeners include oils called process oils or extender oils used for softening or bulking of rubber, or improving the processability of rubber, and, among them, oils as a mixture of an aromatic ring, a naphthenic ring, and a paraffinic chain in which the number of carbon atoms of the paraffinic chain accounts for 50% or more of the total number of carbon atoms are called paraffinic oils, oils as such a mixture in which the number of carbon atoms of the naphthenic ring accounts for from 30 to 45% of the total number of carbon atoms are called naphthenic oils, and oils as such a mixture in which the number of carbon atoms of the aromatic ring accounts for more than 30% of the total number of carbon atoms are called aromatic oils.

Preferred as the rubber softener to be used for the conjugated diene polymer composition are aromatic oil substitutes having 3% by mass or less of polycyclic aromatic (PCA) components as measured in the IP346 method for environmental safety, preventing oil bleeding, and wet skid properties.

The content of the rubber softener is preferably from 0 to 100 parts by mass, more preferably from 10 to 90 parts by mass, and even more preferably from 30 to 90 parts by mass, based on 100 parts by mass of the rubber composition containing the modified conjugated diene polymer according to the present embodiment.

When the content of the rubber softener is more than 100 parts by mass based on 100 parts by mass of the rubber composition, bleeding-out is easily to occur and stickiness may be caused to the surface of the modified conjugated diene polymer composition according to the present embodiment.

(Additional Additives)

An additional softener or filler other than those described above may be used for the modified conjugated diene polymer composition according to the present embodiment, and various additives may be further used such as a heat stabilizer, an antistatic agent, a weathering stabilizer, an anti-aging agent, a colorant, and a lubricant.

Known softeners can be used as the additional softener.

Specific examples of the additional filler include calcium carbonate, magnesium carbonate, aluminum sulfate, and barium sulfate.

Known materials can be used for the heat stabilizer, antistatic agent, weathering stabilizer, anti-aging agent, colorant, and lubricant.

(Method for Producing Modified Conjugated Diene Polymer Composition)

The method for producing the modified conjugated diene polymer composition according to the present embodiment is not limited.

Examples of the method include a method of melt-kneading together the above-described rubber composition, reinforcing filler, vulcanizing agent, and vulcanization accelerator, and, as necessary, the above-described various materials by using a common mixer such as an open roll, a Banbury mixer, a kneader, a single-screw extruder, a twin-screw extruder, and a multi-screw extruder; and a method in which the components are dissolved in a solvent and mixed together and the solvent is then removed through heating.

Among them, the melt-kneading method with a roll, a Banbury mixer, a kneader, or an extruder is preferred for productivity and good kneading.

Methods of kneading the conjugated diene polymer and the various materials together in one operation and methods of mixing them together in multiple operations are both applicable.

The conjugated diene polymer composition is suitably used as a vulcanized product.

The vulcanized product can be obtained by mixing together the modified conjugated diene polymer and reinforcing filler, and, as necessary, an inorganic filler such as carbon black, a rubbery polymer differing from the modified conjugated diene polymer, a silane coupling agent, a rubber softener, a vulcanizing agent, and a vulcanization accelerator/vulcanization aid, and heating the mixture to vulcanize.

Applicable examples of the vulcanizing agent include radical generators such as organic peroxides and azo compounds, oxime compounds, nitroso compounds, polyamine compounds, sulfur, and sulfur compounds. Sulfur compounds include sulfur monochloride, sulfur dichloride, disulfide compounds, and polysulfide polymer compounds.

The content of the vulcanizing agent is typically from 0.01 to 20 parts by mass, and preferably from 0.1 to 15 parts by mass, based on 100 parts by mass of the rubber component containing the modified conjugated diene polymer according to the present embodiment. Known vulcanization methods can be applied, and the vulcanization temperature is typically from 120 to 200° C., and preferably from 140 to 180° C.

Conventionally known materials can be used for the vulcanization accelerator, and examples thereof include vulcanization accelerators/aids of sulfenamide, guanidine, thiram, aldehyde-amine, aldehyde-ammonia, thiazole, thiourea, and dithiocarbamate.

The content of the vulcanization accelerator is typically from 0.01 to 20 parts by mass, and more preferably from 0.1 to 15 parts by mass, based on 100 parts by mass of the rubber component containing the modified conjugated diene polymer according to the present embodiment.

The content of the vulcanizing agent and vulcanization accelerator is preferably from 0.1 parts by mass to 20 parts by mass, more preferably from 0.1 to 18 parts by mass, and even more preferably from 0.1 to 15 parts by mass, based on 100 parts by mass of the rubber composition containing the modified conjugated diene polymer according to the present embodiment.

Applicable examples of the vulcanization aid include zinc flower and stearic acid.

The modified conjugated diene polymer composition according to the present embodiment can be crosslinked by adding a vulcanizing agent, a vulcanization accelerator, and various additives, etc., and used as a rubber composition for producing a rubber product intended.

The rubber composition formed through crosslinking the modified conjugated diene polymer composition can be used for tires, anti-vibration rubbers, and various products for industrial use.

EXAMPLES

Hereinafter, the present embodiment will be described in detail with reference to specific Examples and Comparative Examples; however, the present embodiment is by no means limited to the following Examples.

Analysis of samples was performed in the following manner.

(1) Bonded Styrene Content (St Content)

A sample of 100 mg of a modified conjugated diene polymer obtained in each of Examples and Comparative Examples described later was placed in a graduated cylinder and chloroform was added thereto to a volume of 100 mL to dissolve the sample, and the resultant was used as a measurement sample.

By using a V-550 produced by JASCO Corporation, the bonded styrene content (% by mass) was measured from UV absorption at 254 nm due to the phenyl group of styrene.

(2) Microstructure of Butadiene Moiety (1,2-Vinyl Bond Content)

A sample of 50 mg of a modified conjugated diene polymer obtained in each of Examples and Comparative Examples described later was dissolved in 50 mL of carbon disulfide, and an infrared spectrum in the range of from 600 to 1,000 $cm^{-1}$ was obtained in measurement with a solution cell, and the microstructure of the butadiene moiety (1,2-vinyl bond content (%)) was determined from a specific absorbance by using the calculation formula of the Hampton's method.

(3) Mooney Viscosity

A Mooney viscosity of a modified conjugated diene polymer obtained in each of Examples and Comparative Examples described later was measured as follows.

Mooney viscosity was measured by using a Mooney viscometer (produced by Ueshima Seisakusho Co., Ltd., "VR1132") in accordance with JIS K 6300 (ISO 289-1).

The measurement temperature was 100° C. First, a sample was preheated for 1 minute, and a rotor was rotated at 2 rpm, and the torque measured after 4 minutes was used as the Mooney viscosity ($ML_{1+4}$ viscosity).

(4) GPC Molecular Weight Distribution

A specimen of a modified conjugated diene polymer was subjected to GPC (2695 produced by Waters Corporation) with a polystyrene-based gel column (column: 3 of PLgel MiniMix-C, column oven temperature: 35° C., 865-CO produced by JASCO Corporation, THF flow rate: 0.35 mL, sample concentration: 0.1% by mass, injection volume: 50 μL, RI detector: 2414 produced by Waters Corporation) to determine the chromatograph.

A calibration curve was prepared by using commercially available standard monodispersed polystyrenes having known molecular weights, and used to determine the number of peaks, peak molecular weights, peak areas, weight-average molecular weight, number-average molecular weight, and molecular weight distribution value from the GPC chromatogram obtained.

A peak of the lowest molecular weight was defined as a peak (A), a peak of the highest molecular weight as a peak (B), and a peak of the largest peak area except for the peak (B) as a peak (T).

Tetrahydrofuran (THF) was used as an eluent.

In 20 mL of THF, 10 mg of a measurement sample was dissolved, which was injected into the column for measurement. The measurement was performed at an oven temperature of 40° C.

(5-1) Proportion of the Modified Polymer Chain(s) in Modified Conjugated Diene Polymer In determination of the proportion of the modified polymer chain(s) in a modified conjugated diene polymer, the property of modified conjugated diene polymer having a nitrogen atom or the like to be adsorbed on a GPC column with a packing material of silica-based gel is utilized; specifically, a sample solution containing a sample and standard polystyrene having a molecular weight of 5,000 (polystyrene is not adsorbed on the column) was subjected to GPC (2695 produced by Waters Corporation) with a polystyrene-based gel column (column: 3 of PLgel Mini-Mix-C, column oven temperature: 35° C., 865-CO produced by JASCO Corporation, THF flow rate: 0.35 mL, RI detector: 2414 produced by Waters Corporation) and GPC (2695 produced by Waters Corporation) with a silica-based gel column (column: 1 of Zorbax PSM 1000-S, 1 of PSM 300-S, 1 of PSM 60-S, three columns in total, column oven temperature: 35° C., 865-CO produced by JASCO Corporation, THF flow rate: 0.7 mL/min, RI detector: 2414 produced by Waters Corporation) to determine a chromatogram for each measurement with an RI detector, and the amount of adsorption of the conjugated diene polymer having a nitrogen atom or the like adsorbed on the silica column was calculated from the difference between the chromatograms to determine the proportion of polymer chain(s) having a structure modified with a compound having a nitrogen atom or the like at a molecular end (hereinafter, also referred to as "proportion of modified polymer chain(s)").

In the measurement, 10 mg of the sample was dissolved in 20 mL of THF together with 5 mg of the standard polystyrene, and 100 μL of the resultant was injected.

In the specific procedure of calculation, the areas (%) determined for the polystyrene-based gel column and the silica-based column were applied to the following formula.

$$\text{Proportion of modified polymer chain} = \frac{(a/b) - (c/d)}{(a/b)} \times 100(\%)$$

The definitions of a, b, c, and d in the formula are as follows.
a: Area (%) for entire polymer determined with polystyrene-based gel (PLgel)
b: Area (%) for low-molecular-weight internal standard polystyrene (PS) determined with polystyrene-based gel (PLgel)
c: Area (%) for entire polymer determined with silica-based column (Zorbax)
d: Area (%) for low-molecular-weight internal standard polystyrene (PS) determined with silica-based column (Zorbax)

(5-2) Proportion of Modified Polymer Chain(s) in Peak (A) or Peak (B)

In determination of the proportion of modified polymer chain(s) in the peak (A) or the peak (B), calculation was made by using the following formula in the same manner as the above calculation method for proportions of modified polymer chain(s).

$$\text{Proportion of modified polymer chain(s) in peak } (A) \text{ or peak } (B) = \frac{(e/f) - (g/h)}{(e/f)} \times 100(\%)$$

e: Area (%) of given peak determined with polystyrene-based gel (PLgel)
f: Area (%) for low-molecular-weight internal standard polystyrene (PS) determined with polystyrene-based gel (PLgel)
g: Area (%) of given peak determined with silica-based column (Zorbax)
h: Area (%) for low-molecular-weight internal standard polystyrene (PS) determined with silica-based column (Zorbax)

(5-3) Proportion of Modified Polymer Chain(s) in Region Ranging from Low-Molecular-Weight Side to Point of 5% Cumulative Area A specimen of a modified conjugated diene polymer was subjected to GPC (2695 produced by Waters Corporation) with a polystyrene-based gel column (column: 3 of PLgel MiniMix-C, column oven temperature: 35° C., 865-CO produced by JASCO Corporation, THF flow rate: 0.35 mL, sample concentration: 0.1% by mass, injection volume: 50 µL, RI detector: 2414 produced by Waters Corporation) to determine the chromatograph.

Molecular weight was determined at a point of 5% cumulative area from a molecular weight of 100 as the starting point. This molecular weight is defined as Mp5.

Next, measurement was performed in the same manner as for the proportion of modified polymer chain(s) in a modified conjugated diene polymer.

The proportion of modified polymer chain(s) in a region ranging from a low-molecular-weight side to a point of 5% cumulative area was calculated by using the following formula.

$$\text{Proportion of modified polymer chain in region ranging from low-molecular-weight side to point of 5\% cumulative area} = \frac{(i/j) - (k/l)}{(i/j)} \times 100(\%)$$

i: Area (%) of molecular weight of Mp5 or less in area of given peak determined with polystyrene-based gel (PLgel)
j: Area (%) for low-molecular-weight internal standard polystyrene (PS) determined with polystyrene-based gel (PLgel)
k: Area (%) of molecular weight of Mp5 or less in area of given peak determined with silica-based column (Zorbax)
l: Area (%) for low-molecular-weight internal standard polystyrene (PS) determined with silica-based column (Zorbax)

(6) Coupling Rate

For determination of a coupling rate, a specimen of a conjugated diene polymer to which a coupling agent had been added was subjected to GPC (2695 produced by Waters Corporation) with a polystyrene-based gel column (column: 3 of PLgel MiniMix-C, column oven temperature: 35° C., 865-CO produced by JASCO Corporation, THF flow rate: 0.35 mL, sample concentration: 0.1% by mass, injection volume: 50 µL, RI detector: 2414 produced by Waters Corporation) to determine the chromatograph.

The coupling rate was calculated from the ratio between a peak area without coupling (a peak of lower molecular weight) and a peak area with coupling (a peak of higher molecular weight).

(7) Nitrogen Content

Nitrogen contents were calculated by using TN-2100H produced by Mitsubishi Chemical Analytech Co., Ltd. in accordance with a method described in "4. Chemiluminescence method" in JIS K 2609: 1998 "Crude petroleum and petroleum products—Determination of nitrogen content".

Example 1

Into a temperature-controllable autoclave having 40 L inner volume equipped with a stirrer and a jacket used as a reactor, 2,220 g of 1,3-butadiene, 780 g of styrene, 21,000 g of cyclohexane, and polar substances consisting of 2 g of tetrahydrofuran (THF), 4.73 g of 2,2-bis(2-oxolanyl)propane (BOP), and 2.81 g of piperidine (Pip) were loaded, where impurities had been removed from the materials in advance, and the inner temperature of the reactor was retained at 43° C.

Further, 2.01 g of n-butyllithium as a polymerization initiator was fed to the reactor.

After the initiation of polymerization reaction, the temperature in the reactor began to elevate through heat generation due to polymerization, and ultimately reached 74° C.

Two minutes after the reaction temperature reached the peak, 1.42 g of tristrimethoxysilylpropylamine (Cup-4) was added to the reactor, and 2 minutes thereafter 1.91 g of 3-(4-methylpiperazin-1-yl)propyltriethoxysilane (Cup-2) was further added thereto, and the resultant was subjected to coupling reaction for 10 minutes.

To the polymer solution, 11 g of n-octadecyl-3-(3,5-di-t-butyl-4-hydroxyphenyl)-propionate and 4.5 g of 4,6-bis(octylthiomethyl)-o-cresol as antioxidants were added to afford a modified conjugated diene polymer (sample 1).

Analysis of the sample 1 found that the bonded styrene content was 26% by mass and the bonded butadiene content was 74% by mass.

The vinyl bond content (1,2-bond content) of the microstructure of the butadiene moiety determined by calculation from measurement results with an infrared spectrometer in accordance with the Hampton's method was 56%. Other analytical values are shown in Table 1.

Example 2

Into a temperature-controllable autoclave of 40 L inner volume equipped with a stirrer and a jacket used as a reactor, 2,220 g of 1,3-butadiene, 780 g of styrene, 21,000 g of cyclohexane, and polar substances consisting of 2 g of tetrahydrofuran (THF), 4.73 g of 2,2-bis(2-oxolanyl)propane (BOP), and 2.81 g of piperidine (Pip) were loaded, where impurities had been removed from the materials in advance, and the inner temperature of the reactor was retained at 43° C.

Further, 2.01 g of n-butyllithium as a polymerization initiator was fed to the reactor.

After the initiation of polymerization reaction, the temperature in the reactor began to elevate through heat generation due to polymerization, and ultimately reached 76° C.

Two minutes after the reaction temperature reached the peak, 0.95 g of tristrimethoxysilylpropylamine was added to the reactor, and 2 minutes thereafter 2.67 g of 3-(4-methyl-piperazin-1-yl)propyltriethoxysilane was further added thereto, and the resultant was subjected to coupling reaction for 10 minutes.

To the polymer solution, 11 g of n-octadecyl-3-(3,5-di-t-butyl-4-hydroxyphenyl)-propionate and 4.5 g of 4,6-bis(octylthiomethyl)-o-cresol as antioxidants were added to afford a modified conjugated diene polymer (sample 2).

Analysis of the sample 2 found that the bonded styrene content was 25% by mass and the bonded butadiene content was 75% by mass.

The vinyl bond content (1,2-bond content) of the microstructure of the butadiene moiety determined by calculation from measurement results with an infrared spectrometer in accordance with the Hampton's method was 56%.

Other analytical values are shown in Table 1.

Example 3

Into a temperature-controllable autoclave of 40 L inner volume equipped with a stirrer and a jacket used as a reactor, 2,220 g of 1,3-butadiene, 780 g of styrene, 21,000 g of cyclohexane, and polar substances consisting of 2 g of tetrahydrofuran (THF), 4.73 g of 2,2-bis(2-oxolanyl)propane (BOP), and 2.81 g of piperidine (Pip) were loaded, where impurities had been removed from the materials in advance, and the inner temperature of the reactor was retained at 44° C.

Further, 2.01 g of n-butyllithium as a polymerization initiator was fed to the reactor.

After the initiation of polymerization reaction, the temperature in the reactor began to elevate through heat generation due to polymerization, and ultimately reached 76° C.

Two minutes after the reaction temperature reached the peak, 0.47 g of tristrimethoxysilylpropylamine was added to the reactor, and 2 minutes thereafter 3.43 g of 3-(4-methyl-piperazin-1-yl)propyltriethoxysilane was further added thereto, and the resultant was subjected to coupling reaction for 10 minutes.

To the polymer solution, 11 g of n-octadecyl-3-(3,5-di-t-butyl-4-hydroxyphenyl)-propionate and 4.5 g of 4,6-bis(octylthiomethyl)-o-cresol as antioxidants were added to afford a modified conjugated diene polymer (sample 3).

Analysis of the sample 3 found that the bonded styrene content was 26% by mass and the bonded butadiene content was 74% by mass.

The vinyl bond content (1,2-bond content) of the microstructure of the butadiene moiety determined by calculation from measurement results with an infrared spectrometer in accordance with the Hampton's method was 55%.

Other analytical values are shown in Table 1.

Example 4

Into a temperature-controllable autoclave of 40 L inner volume equipped with a stirrer and a jacket used as a reactor, 2,220 g of 1,3-butadiene, 780 g of styrene, 21,000 g of cyclohexane, and polar substances consisting of 2 g of tetrahydrofuran (THF), 4.73 g of 2,2-bis(2-oxolanyl)propane (BOP), and 3.27 g of hexamethyleneimine (HMI) were loaded, where impurities had been removed from the materials in advance, and the inner temperature of the reactor was retained at 43° C.

Piperidinolithium, which had been prepared as a polymerization initiator in advance by reacting 2.8 g of piperidine (Pip), 1.0 g of tetrahydrofuran, and 2.01 g of n-butyllithium, was totally fed to the reactor.

After the initiation of polymerization reaction, the temperature in the reactor began to elevate through heat generation due to polymerization, and ultimately reached 72° C.

Two minutes after the reaction temperature reached the peak, 0.95 g of tristrimethoxysilylpropylamine was added to the reactor, and 2 minutes thereafter 2.67 g of 3-(4-methyl-piperazin-1-yl)propyltriethoxysilane was further added thereto, and the resultant was subjected to coupling reaction for 10 minutes.

To the polymer solution, 11 g of n-octadecyl-3-(3,5-di-t-butyl-4-hydroxyphenyl)-propionate and 4.5 g of 4,6-bis(octylthiomethyl)-o-cresol as antioxidants were added to afford a modified conjugated diene polymer (sample 4).

Analysis of the sample 4 found that the bonded styrene content was 26% by mass and the bonded butadiene content was 74% by mass.

The vinyl bond content (1,2-bond content) of the microstructure of the butadiene moiety determined by calculation from measurement results with an infrared spectrometer in accordance with the Hampton's method was 56%.

Other analytical values are shown in Table 1.

Example 5

Into a temperature-controllable autoclave of 40 L inner volume equipped with a stirrer and a jacket used as a reactor, 2,220 g of 1,3-butadiene, 780 g of styrene, 21,000 g of cyclohexane, and polar substances consisting of 2 g of tetrahydrofuran (THF), 6.88 g of 2,2-bis(2-oxolanyl)propane (BOP), and 4.64 g of hexamethyleneimine (HMI) were loaded, where impurities had been removed from the materials in advance, and the inner temperature of the reactor was retained at 41° C.

Further, 2.85 g of n-butyllithium as a polymerization initiator was fed to the reactor.

After the initiation of polymerization reaction, the temperature in the reactor began to elevate through heat generation due to polymerization, and ultimately reached 77° C.

Two minutes after the reaction temperature reached the peak, 2.00 g of tristrimethoxysilylpropylamine was added to the reactor, and 2 minutes thereafter 2.70 g of 3-(4-methyl-piperazin-1-yl)propyltriethoxysilane was further added thereto, and the resultant was subjected to coupling reaction for 10 minutes.

To the polymer solution, 11 g of n-octadecyl-3-(3,5-di-t-butyl-4-hydroxyphenyl)-propionate and 4.5 g of 4,6-bis(octylthiomethyl)-o-cresol as antioxidants were added to afford a modified conjugated diene polymer (sample 5).

Analysis of the sample 5 found that the bonded styrene content was 26% by mass and the bonded butadiene content was 74% by mass.

The vinyl bond content (1,2-bond content) of the microstructure of the butadiene moiety determined by calculation from measurement results with an infrared spectrometer in accordance with the Hampton's method was 58%.

Other analytical values are shown in Table 1.

Example 6

Into a temperature-controllable autoclave of 40 L inner volume equipped with a stirrer and a jacket used as a reactor, 2,220 g of 1,3-butadiene, 780 g of styrene, 21,000 g of cyclohexane, and polar substances consisting of 2 g of tetrahydrofuran (THF), 6.88 g of 2,2-bis(2-oxolanyl)propane (BOP), and 3.98 g of piperidine (Pip) were loaded, where impurities had been removed from the materials in advance, and the inner temperature of the reactor was retained at 41° C.

Further, 2.85 g of n-butyllithium as a polymerization initiator was fed to the reactor.

After the initiation of polymerization reaction, the temperature in the reactor began to elevate through heat generation due to polymerization, and ultimately reached 76° C.

Two minutes after the reaction temperature reached the peak, 1.34 g of tristrimethoxysilylpropylamine was added to the reactor, and 2 minutes thereafter 3.78 g of 3-(4-methyl-piperazin-1-yl)propyltriethoxysilane was further added thereto, and the resultant was subjected to coupling reaction for 10 minutes. To the polymer solution, 11 g of n-octadecyl-3-(3,5-di-t-butyl-4-hydroxyphenyl)-propionate and 4.5 g of 4,6-bis(octylthiomethyl)-o-cresol as antioxidants were added to afford a modified conjugated diene polymer (sample 6).

Analysis of the sample 6 found that the bonded styrene content was 26% by mass and the bonded butadiene content was 74% by mass.

The vinyl bond content (1,2-bond content) of the microstructure of the butadiene moiety determined by calculation from measurement results with an infrared spectrometer in accordance with the Hampton's method was 56%.

Other analytical values are shown in Table 1.

Example 7

Into a temperature-controllable autoclave of 40 L inner volume equipped with a stirrer and a jacket used as a reactor, 2,220 g of 1,3-butadiene, 780 g of styrene, 21,000 g of cyclohexane, and polar substances consisting of 2 g of tetrahydrofuran (THF), 4.73 g of 2,2-bis(2-oxolanyl)propane (BOP), and 2.81 g of piperidine (Pip) were loaded, where impurities had been removed from the materials in advance, and the inner temperature of the reactor was retained at 43° C.

Further, 2.01 g of n-butyllithium as a polymerization initiator was fed to the reactor.

After the initiation of polymerization reaction, the temperature in the reactor began to elevate through heat generation due to polymerization, and ultimately reached 76° C.

Two minutes after the reaction temperature reached the peak, 0.47 g of tristrimethoxysilylpropylamine was added to the reactor, and 2 minutes thereafter 0.78 g of 2,2-dimethoxy-1-(3-trimethoxysilylpropyl)-1-aza-2-silacyclopentane was further added thereto, and 2 minutes thereafter 1.91 g of 3-(4-methylpiperazin-1-yl)propyltriethoxysilane was further added, and the resultant was subjected to coupling reaction for 10 minutes.

To the polymer solution, 11 g of n-octadecyl-3-(3,5-di-t-butyl-4-hydroxyphenyl)-propionate and 4.5 g of 4,6-bis(octylthiomethyl)-o-cresol as antioxidants were added to afford a modified conjugated diene polymer (sample 7).

Analysis of the sample 7 found that the bonded styrene content was 25% by mass and the bonded butadiene content was 75% by mass.

The vinyl bond content (1,2-bond content) of the microstructure of the butadiene moiety determined by calculation from measurement results with an infrared spectrometer in accordance with the Hampton's method was 56%.

Other analytical values are shown in Table 1.

Example 8

Into a temperature-controllable autoclave of 40 L inner volume equipped with a stirrer and a jacket used as a reactor, 2,220 g of 1,3-butadiene, 780 g of styrene, 21,000 g of cyclohexane, and polar substances consisting of 2 g of tetrahydrofuran (THF), 4.73 g of 2,2-bis(2-oxolanyl)propane (BOP), and 2.81 g of piperidine (Pip) were loaded, where impurities had been removed from the materials in advance, and the inner temperature of the reactor was retained at 43° C.

Further, 2.01 g of n-butyllithium as a polymerization initiator was fed to the reactor.

After the initiation of polymerization reaction, the temperature in the reactor began to elevate through heat generation due to polymerization, and ultimately reached 75° C.

Two minutes after the reaction temperature reached the peak, 0.47 g of tristrimethoxysilylpropylamine was added to the reactor, and 2 minutes thereafter 0.96 g of silicon tetrachloride was added thereto, and the resultant was subjected to coupling reaction for 10 minutes.

To the polymer solution, 11 g of n-octadecyl-3-(3,5-di-t-butyl-4-hydroxyphenyl)-propionate and 4.5 g of 4,6-bis(octylthiomethyl)-o-cresol as antioxidants were added to afford a modified conjugated diene polymer (sample 8).

Analysis of the sample 8 found that the bonded styrene content was 25% by mass and the bonded butadiene content was 75% by mass.

The vinyl bond content (1,2-bond content) of the microstructure of the butadiene moiety determined by calculation from measurement results with an infrared spectrometer in accordance with the Hampton's method was 56%.

Other analytical values are shown in Table 1.

Example 9

Into a temperature-controllable autoclave of 40 L inner volume equipped with a stirrer and a jacket used as a reactor, 2,220 g of 1,3-butadiene, 780 g of styrene, 21,000 g of cyclohexane, and polar substances consisting of 2 g of tetrahydrofuran (THF), 4.73 g of 2,2-bis(2-oxolanyl)propane (BOP), and 2.81 g of piperidine (Pip) were loaded, where impurities had been removed from the materials in advance, and the inner temperature of the reactor was retained at 44° C.

Further, 2.01 g of n-butyllithium as a polymerization initiator was fed to the reactor.

After the initiation of polymerization reaction, the temperature in the reactor began to elevate through heat generation due to polymerization, and ultimately reached 75° C.

Two minutes after the reaction temperature reached the peak, 0.95 g of tristrimethoxysilylpropylamine was added to the reactor, and 2 minutes thereafter 2.67 g of 3-(4-methyl-piperazin-1-yl)propyltriethoxysilane was further added thereto, and the resultant was subjected to coupling reaction for 10 minutes.

To the polymer solution, 11 g of n-octadecyl-3-(3,5-di-t-butyl-4-hydroxyphenyl)-propionate and 4.5 g of 4,6-bis(octylthiomethyl)-o-cresol as antioxidants were added to afford a modified conjugated diene polymer (sample 9).

Analysis of the sample 9 found that the bonded styrene content was 27% by mass and the bonded butadiene content was 73% by mass.

The vinyl bond content (1,2-bond content) of the microstructure of the butadiene moiety determined by calculation from measurement results with an infrared spectrometer in accordance with the Hampton's method was 54%.

Other analytical values are shown in Table 1.

Example 29

Into a temperature-controllable autoclave of 40 L inner volume equipped with a stirrer and a jacket used as a reactor, 2,220 g of 1,3-butadiene, 780 g of styrene, 21,000 g of cyclohexane, and polar substances consisting of 2 g of tetrahydrofuran (THF), 4.73 g of 2,2-bis(2-oxolanyl)propane (BOP), and 2.49 g of hexamethyleneimine (HMI) were loaded, where impurities had been removed from the materials in advance, and the inner temperature of the reactor was retained at 43° C.

Further, 1.53 g of n-butyllithium as a polymerization initiator was fed to the reactor.

After the initiation of polymerization reaction, the temperature in the reactor began to elevate through heat generation due to polymerization, and ultimately reached 74° C.

Two minutes after the reaction temperature reached the peak, 0.95 g of tristrimethoxysilylpropylamine was added to the reactor, and 2 minutes thereafter 1.25 g of 2,2-dimethoxy-1-(3-trimethoxysilylpropyl)-1-aza-2-silacyclopentane was added thereto, and the resultant was subjected to coupling reaction for 3 minutes, to which 1.10 g of 1,3-dimethyl-2-dimethylimidazolidinone was then added, and the resultant was further reacted for 10 minutes.

To the polymer solution, 11 g of n-octadecyl-3-(3,5-di-t-butyl-4-hydroxyphenyl)-propionate and 4.5 g of 4,6-bis(octylthiomethyl)-o-cresol as antioxidants were added to afford a modified conjugated diene polymer (sample 15).

Analysis of the sample 15 found that the bonded styrene content was 26% by mass and the bonded butadiene content was 73% by mass.

The vinyl bond content (1,2-bond content) of the microstructure of the butadiene moiety determined by calculation from measurement results with an infrared spectrometer in accordance with the Hampton's method was 55%.

Other analytical values are shown in Table 1.

Comparative Example 1

In Comparative Example 1, Y031 produced by Asahi Kasei Corporation was used as a starting material rubber.

Comparative Example 2

Into a temperature-controllable autoclave of 40 L inner volume equipped with a stirrer and a jacket used as a reactor, 2,220 g of 1,3-butadiene, 780 g of styrene, 21,000 g of cyclohexane, and polar substances consisting of 2 g of tetrahydrofuran (THF) and 4.73 g of 2,2-bis(2-oxolanyl)propane (BOP) were loaded, where impurities had been removed from the materials in advance, and the inner temperature of the reactor was retained at 43° C.

Further, 2.01 g of n-butyllithium as a polymerization initiator was fed to the reactor.

After the initiation of polymerization reaction, the temperature in the reactor began to elevate through heat generation due to polymerization, and ultimately reached 75° C.

Two minutes after the reaction temperature reached the peak, 0.95 g of tristrimethoxysilylpropylamine was added to the reactor, and 2 minutes thereafter 2.67 g of 3-(4-methyl-piperazin-1-yl)propyltriethoxysilane was further added thereto, and the resultant was subjected to coupling reaction for 10 minutes.

To the polymer solution, 11 g of n-octadecyl-3-(3,5-di-t-butyl-4-hydroxyphenyl)-propionate and 4.5 g of 4,6-bis(octylthiomethyl)-o-cresol as antioxidants were added to afford a modified conjugated diene polymer (sample 10).

Analysis of the sample 10 found that the bonded styrene content was 27% by mass and the bonded butadiene content was 73% by mass.

The vinyl bond content (1,2-bond content) of the microstructure of the butadiene moiety determined by calculation from measurement results with an infrared spectrometer in accordance with the Hampton's method was 54%.

Other analytical values are shown in Table 1.

Comparative Example 3

Into a temperature-controllable autoclave of 40 L inner volume equipped with a stirrer and a jacket used as a reactor, 2,220 g of 1,3-butadiene, 780 g of styrene, 21,000 g of cyclohexane, and polar substances consisting of 2 g of tetrahydrofuran (THF), 4.73 g of 2,2-bis(2-oxolanyl)propane (BOP), and 2.81 g of piperidine (Pip) were loaded, where impurities had been removed from the materials in advance, and the inner temperature of the reactor was retained at 44° C.

Further, 2.01 g of n-butyllithium as a polymerization initiator was fed to the reactor.

After the initiation of polymerization reaction, the temperature in the reactor began to elevate through heat generation due to polymerization, and ultimately reached 76° C.

Two minutes after the reaction temperature reached the peak, 0.47 g of tristrimethoxysilylpropylamine was added to the reactor, and 2 minutes thereafter 2.38 g of 3-(4-methyl-piperazin-1-yl)propyltriethoxysilane was further added thereto, and the resultant was subjected to coupling reaction for 10 minutes.

To the polymer solution, 11 g of n-octadecyl-3-(3,5-di-t-butyl-4-hydroxyphenyl)-propionate and 4.5 g of 4,6-bis(octylthiomethyl)-o-cresol as antioxidants were added to afford a modified conjugated diene polymer (sample 11).

Analysis of the sample 11 found that the bonded styrene content was 26% by mass and the bonded butadiene content was 74% by mass.

The vinyl bond content (1,2-bond content) of the microstructure of the butadiene moiety determined by calculation from measurement results with an infrared spectrometer in accordance with the Hampton's method was 55%.

Other analytical values are shown in Table 1.

Comparative Example 4

Into a temperature-controllable autoclave of 40 L inner volume equipped with a stirrer and a jacket, as a reactor, 2,220 g of 1,3-butadiene, 780 g of styrene, 21,000 g of cyclohexane, and polar substances consisting of 2 g of tetrahydrofuran (THF), 3.53 g of 2,2-bis(2-oxolanyl)propane (BOP), and 2.10 g of piperidine (Pip) were loaded, where impurities had been removed from the materials in advance, and the inner temperature of the reactor was retained at 46° C.

Further, 1.50 g of n-butyllithium as a polymerization initiator was fed to the reactor.

After the initiation of polymerization reaction, the temperature in the reactor began to elevate through heat generation due to polymerization, and ultimately reached 77° C.

Two minutes after the reaction temperature reached the peak, 1.59 g of 2,2-dimethoxy-1-(3-trimethoxysilylpropyl)-1-aza-2-silacyclopentane was added to the reactor, and the resultant was subjected to coupling reaction for 10 minutes.

To the polymer solution, 11 g of n-octadecyl-3-(3,5-di-t-butyl-4-hydroxyphenyl)-propionate and 4.5 g of 4,6-bis(octylthiomethyl)-o-cresol as antioxidants were added to afford a modified conjugated diene polymer (sample 12).

Analysis of the sample 12 found that the bonded styrene content was 27% by mass and the bonded butadiene content was 73% by mass.

The vinyl bond content (1,2-bond content) of the microstructure of the butadiene moiety determined by calculation from measurement results with an infrared spectrometer in accordance with the Hampton's method was 57%.

Other analytical values are shown in Table 1.

Comparative Example 11

Into a temperature-controllable autoclave of 40 L inner volume equipped with a stirrer and a jacket used as a reactor, 2,220 g of 1,3-butadiene, 780 g of styrene, 21,000 g of cyclohexane, and polar substances consisting of 2 g of tetrahydrofuran (THF) and 4.26 g of 2,2-bis(2-oxolanyl)propane (BOP) were loaded, where impurities had been removed from the materials in advance, and the inner temperature of the reactor was retained at 48° C.

Further, 1.77 g of n-butyllithium as a polymerization initiator was fed to the reactor.

After the initiation of polymerization reaction, the temperature in the reactor began to elevate through heat generation due to polymerization, and ultimately reached 75° C.

Two minutes after the reaction temperature reached the peak, 0.64 g of 2,2-dimethoxy-1-(3-trimethoxysilylpropyl)-1-aza-2-silacyclopentane was added to the reactor, and 1 minute thereafter 2.35 g of 1-[3-(triethoxysilyl)propyl]-4-methylpiperazine was added thereto, and the resultant was subjected to coupling reaction for 10 minutes.

To the polymer solution, 11 g of n-octadecyl-3-(3,5-di-t-butyl-4-hydroxyphenyl)-propionate and 4.5 g of 4,6-bis(octylthiomethyl)-o-cresol as antioxidants were added to afford a modified conjugated diene polymer (sample 14).

Analysis of the sample 14 found that the bonded styrene content was 26% by mass and the bonded butadiene content was 74% by mass.

The vinyl bond content (1,2-bond content) of the microstructure of the butadiene moiety determined by calculation from measurement results with an infrared spectrometer in accordance with the Hampton's method was 56%.

Other analytical values are shown in Table 1.

TABLE 1

| Polymer | | | Comparative Example 1 Y031 | Example 1 Sample 1 | Example 2 Sample 2 | Example 3 Sample 3 | Example 4 Sample 4 | Example 5 Sample 5 | Example 6 Sample 6 | Example 7 Sample 7 |
|---|---|---|---|---|---|---|---|---|---|---|
| St content | | (% by mass) | 26 | 26 | 25 | 26 | 26 | 26 | 26 | 25 |
| 1,2-Vinyl bond content | | (%) | 56 | 56 | 56 | 55 | 56 | 58 | 56 | 56 |
| Coupling rate | | (%) | 50 | 93 | 93 | 90 | 92 | 93 | 92 | 90 |
| Number of peaks | | | 3 | 3 | 3 | 3 | 3 | 3 | 3 | 4 |
| Molecular weight distribution | | | 1.6 | 1.51 | 1.45 | 1.43 | 1.42 | 1.7 | 1.77 | 1.41 |
| Peak molecular weight | Peak (A) | (×10,000) | 25 | 14 | 14 | 14 | 14 | 10 | 10 | 14 |
| | Peak (T) | (×10,000) | 42 | 41 | 41 | 41 | 41 | 26 | 19 | 43 |
| | Peak (B) | (×10,000) | 84 | 74 | 75 | 74 | 74 | 56 | 56 | 75 |
| Peak area ratio | Peak (A) | (%) | 50 | 7 | 7 | 10 | 8 | 7 | 8 | 10 |
| | Peak (T) | (%) | 35 | 40 | 57 | 71 | 56 | 40 | 55 | 48 |
| | Peak (B) | (%) | 15 | 53 | 36 | 19 | 36 | 53 | 37 | 18 |
| | Peak (B) + Peak (T) | (%) | 50 | 93 | 93 | 90 | 92 | 93 | 92 | 66 |
| St content for each peak | Peak (A) | (% by mass) | 26 | 26 | 25 | 26 | 26 | 26 | 26 | 25 |
| | Peak (B) | (% by mass) | 26 | 26 | 25 | 26 | 26 | 26 | 26 | 25 |
| Vinyl content for each peak | Peak (A) | (%) | 56 | 56 | 56 | 55 | 56 | 58 | 56 | 56 |
| | Peak (B) | (%) | 56 | 56 | 56 | 55 | 56 | 58 | 56 | 56 |
| Moony viscosity ($ML_{1+4}$ viscosity) | | | 55 | 72 | 62 | 53 | 53 | 63 | 48 | 74 |
| Proportion of modified polymer chain(s) in region ranging from low-molecular-weight side to point of 5% cumulative area | | (%) | 71 | 84 | 84 | 82 | 94 | 87 | 87 | 82 |
| Proportion of modified polymer chain(s) in peak (A) | | (%) | 75 | 86 | 85 | 85 | 95 | 88 | 87 | 85 |
| Proportion of modified polymer chain(s) in peak (B) | | (%) | 100 | 100 | 100 | 100 | 100 | 100 | 100 | 100 |

TABLE 1-continued

| | | | | | | | | | |
|---|---|---|---|---|---|---|---|---|---|
| Proportion of modified polymer chain(s) in modified conjugated diene polymer | (%) | 82 | 97 | 97 | 96 | 96 | 96 | 96 | 97 |
| Nitrogen content | (ppm) | 130 | 198 | 216 | 235 | 231 | 281 | 310 | 189 |

| Polymer | | | Example 8 Sample 8 | Example 9 Sample 9 | Example 29 Sample 15 | Comparative Example 2 Sample 10 | Comparative Example 3 Sample 11 | Comparative Example 4 Sample 12 | Comparative Example 11 Sample 14 |
|---|---|---|---|---|---|---|---|---|---|
| St content | | (% by mass) | 25 | 27 | 26 | 27 | 26 | 27 | 26 |
| 1,2-Vinyl bond content | | (%) | 56 | 54 | 55 | 54 | 55 | 57 | 56 |
| Coupling rate | | (%) | 90 | 93 | 67 | 92 | 62 | 88 | 86 |
| Number of peaks | | | 3 | 3 | 2 | 3 | 3 | 2 | 3 |
| Molecular weight distribution | | | 1.4 | 1.74 | 1.39 | 1.5 | 2.27 | 1.25 | 1.32 |
| Peak molecular weight | Peak (A) | (×10,000) | 14 | 14 | 24 | 14 | 14 | 19 | 16 |
| | Peak (T) | (×10,000) | 43 | 27 | 24 | 27 | 27 | 19 | 31 |
| | Peak (B) | (×10,000) | 73 | 76 | 72 | 103 | 73 | 58 | 51 |
| Peak area ratio | Peak (A) | (%) | 10 | 7 | 33 | 8 | 38 | 12 | 14 |
| | Peak (T) | (%) | 71 | 65 | 33 | 46 | 45 | 12 | 54 |
| | Peak (B) | (%) | 19 | 28 | 67 | 46 | 17 | 88 | 32 |
| | Peak (B) + Peak (T) | (%) | 90 | 93 | 100 | 92 | 62 | 100 | 86 |
| St content for each peak | Peak (A) | (% by mass) | 25 | 27 | 26 | 27 | 26 | 27 | 26 |
| | Peak (B) | (% by mass) | 25 | 27 | 55 | 27 | 26 | 27 | 26 |
| Vinyl content for each peak | Peak (A) | (%) | 56 | 54 | 26 | 54 | 55 | 57 | 56 |
| | Peak (B) | (%) | 56 | 54 | 55 | 54 | 55 | 57 | 56 |
| Moony viscosity ($ML_{1+4}$ viscosity) | | | 75 | 63 | 66 | 75 | 42 | 65 | 51 |
| Proportion of modified polymer chain(s) in region ranging from low-molecular-weight side to point of 5% cumulative area | | (%) | 82 | 63 | 94 | 0 | 82 | 83 | 28 |
| Proportion of modified polymer chain(s) in peak (A) | | (%) | 85 | 65 | — | 0 | 87 | 85 | 29 |
| Proportion of modified polymer chain(s) in peak (B) | | (%) | 100 | 100 | 100 | 100 | 100 | 100 | 100 |
| Proportion of modified polymer chain(s) in modified conjugated diene polymer | | (%) | 95 | 95 | 98 | 94 | 94 | 96 | 90 |
| Nitrogen content | | (ppm) | 130 | 186 | 227 | 90 | 203 | 116 | 94 |

Any one of the modified conjugated diene polymers obtained in [Examples 1 to 9, and 29] and [Comparative Examples 2 to 4, and 11] and Y031 produced by Asahi Kasei Corporation in [Comparative Example 1] was used as a starting material rubber, and a modified conjugated diene polymer composition containing the corresponding starting material rubber was obtained in accordance with the formulation shown below.

Modified conjugated diene polymer (any one of samples 1 to 12, 14, and 15, and Y031): 100.0 parts by mass
Silica (produced by Evonik Degussa GmbH, Ultrasil 7000 GR): 75.0 parts by mass
Carbon black (produced by Tokai Carbon Co., Ltd., SEAST KH (N339)): 5.0 parts by mass
Silane coupling agent (produced by Evonik Degussa GmbH, Si75): 6.0 parts by mass
S-RAE oil (produced by Japan energy Inc, JOMO PROCESS NC140): 30.0 parts by mass
Wax (produced by OUCHI SHINKO CHEMICAL INDUSTRIAL CO., LTD., Sunnoc N): 1.5 parts by mass
Zinc flower: 2.5 parts by mass
Stearic acid: 2.0 parts by mass
Anti-aging agent (N-isopropyl-N'-phenyl-p-phenylenediamine): 2.0 parts by mass
Sulfur: 1.8 parts by mass
Vulcanization accelerator (N-cyclohexyl-2-benzothiazylsulfinamide): 1.7 parts by mass
Vulcanization accelerator (diphenylguanidine): 2.0 parts by mass
Total: 229.5 parts by mass The above materials were kneaded together in the following manner to afford a modified conjugated diene polymer composition.

As a first stage of kneading, a starting material rubber (any one of samples 1 to 12, 14, and 15, and Y031), the fillers (silica, carbon black), the silane coupling agent, the process oils (S-RAE oil, wax), zinc flower, and stearic acid were kneaded together by using a sealed kneader (inner volume: 0.3 L) equipped with a temperature controller at a filling rate of 65% and a rotor frequency of 50/57 rpm. At the kneading, the temperature of the sealed mixing machine was controlled so that the discharge temperature (blend) was from 155 to 160° C. to afford a modified conjugated diene polymer composition.

Next, as a second stage of kneading, the thus-obtained blend was cooled to room temperature, the anti-aging agent was then added thereto, and the blend was kneaded again to improve the dispersion of silica. In this kneading, the discharge temperature (blend) was similarly adjusted to from 155 to 160° C. through temperature control for the mixing machine.

After cooling, as a third stage of kneading, kneading was performed by using an oven roll set at 70° C. with addition of sulfur and the vulcanization accelerators. The resultant was then molded, and vulcanized with a platen press at 160° C. for 20 minutes.

After the vulcanization, the properties of the modified conjugated diene polymer composition were measured.

The measurement results for properties are shown in Table 2.

The properties of the modified conjugated diene polymer composition, as a vulcanized product after being vulcanized as described above, were measured in the following manner.

(1) Composition Mooney Viscosity (Composition ML)

In accordance with JIS K 6300-1, a Mooney viscometer was pre-heated at 130° C. for 1 minute, thereafter a rotor was rotated at 2 rpm for 4 minutes and viscosity was then measured, and the viscosity was converted to an index relative to a result for Comparative Example 1 as 100. A higher value indicates higher superiority in processability.

(2) Abrasion Resistance

In accordance with JIS K 6264-2, the amount of abrasion at a load of 44.1 N after 1,000 rotations was measured by using an AKRON abrasion tester (produced by YASUDA SEIKI SEISAKUSHO, LTD.), and converted to an index relative to a result for Comparative Example 1 as 100. A higher index indicates higher superiority in abrasion resistance.

(3) Viscoelasticity Parameter

A viscoelasticity tester (ARES) produced by Rheometric Scientific Inc. was used in a twist mode to measure a viscoelasticity parameter.

The measurement was converted into an index relative to a result for Comparative Example 1 as 100.

Tan δ measured at 0° C. with a frequency of 10 Hz and a strain of 1% was used as an index of wet skid performance. A higher value indicates better wet skid performance.

Tan δ measured at 50° C. with a frequency of 10 Hz and a strain of 3% was used as an index of a fuel-saving property. A higher value indicates lower hysteresis loss and better fuel-saving performance.

In Table 2, wet skid performance is represented as "Wet", and a fuel-saving property as "RR".

Next, Examples and Comparative Examples for preparation of a polymer by mixing a high-molecular-weight conjugated diene polymer and a low-molecular-weight modified conjugated diene polymer together will be shown.

Samples A to O were produced in Production Examples 1 to 15 as polymers for use in Examples and Comparative Examples.

(Proportion of Polymer Chain(s) Having Nitrogen Atom Before Addition of Modifier)

In determination of the proportion of polymer chain(s) having a nitrogen atom before addition of a modifier, calculation was made by using the following formula in the same manner as the above calculation method for proportions of modified polymer chain(s) in a modified conjugated diene polymer.

Proportion of polymer chain(s) having nitrogen atom $$\text{before addition of modifier} = \frac{(i/j) - (k/l)}{(i/j)} \times 100 (\%)$$

i: Area (%) of given peak determined with polystyrene-based gel (PLgel)

j: Area (%) for low-molecular-weight internal standard polystyrene (PS) determined with polystyrene-based gel (PLgel)

k: Area (%) of given peak determined with silica-based column (Zorbax)

TABLE 2

| Analytical values and results of evaluation on properties of blends | | | Comparative Example 1 | Example 1 | Example 2 | Example 3 | Example 4 | Example 5 | Example 6 | Example 7 | Example 8 |
|---|---|---|---|---|---|---|---|---|---|---|---|
| Properties of composition | Composition ML | 90 or more | 100 | 98 | 109 | 114 | 106 | 123 | 124 | 116 | 116 |
| | Abrasion resistance | 85 or more | 100 | 98 | 95 | 92 | 96 | 90 | 88 | 102 | 94 |
| | Wet | 100 or more | 100 | 103 | 107 | 106 | 108 | 113 | 112 | 110 | 105 |
| | RR | 110 or more | 100 | 126 | 130 | 132 | 132 | 120 | 124 | 123 | 114 |

| | Analytical values and results of evaluation on properties of blends | | | Example 9 | Example 29 | Comparative Example 2 | Comparative Example 3 | Comparative Example 4 | Comparative Example 11 |
|---|---|---|---|---|---|---|---|---|---|
| | Properties of composition | Composition ML | 90 or more | 117 | 114 | 126 | 120 | 82 | 107 |
| | | Abrasion resistance | 85 or more | 86 | 96 | 78 | 69 | 94 | 90 |
| | | Wet | 100 or more | 105 | 107 | 97 | 102 | 102 | 101 |
| | | RR | 110 or more | 114 | 126 | 92 | 120 | 109 | 106 |

As shown in Table 2, the modified conjugated diene polymers in Examples 1 to 9 and 29 had superior balances between processability and abrasion resistance and between wet skid performance and low hysteresis loss. In addition, the modified conjugated diene polymers in Examples 1 to 9 and 29 were confirmed to be sufficiently good for practical use in terms of prevention of powder generation in a modified conjugated diene polymer in dehydration drying, and cause a smaller amount of adhesion of a modified conjugated diene polymer enough for practical use in a production process.

l: Area (%) for low-molecular-weight internal standard polystyrene (PS) determined with silica-based column (Zorbax)

(Proportion of Polymer Chain(s) Having Nitrogen Atom After Addition of Modifier)

In determination of the proportion of polymer chain(s) having a nitrogen atom after addition of a modifier, calculation was made by using the following formula in the same manner as the above calculation method for proportions of modified polymer chain(s) in a modified conjugated diene polymer.

Proportion of polymer chain(s) having nitrogen $$\text{atom after addition of modifier} = \frac{(m/n) - (o/p)}{(m/n)} \times 100(\%)$$

m: Area (%) of given peak determined with polystyrene-based gel (PLgel)
n: Area (%) for low-molecular-weight internal standard polystyrene (PS) determined with polystyrene-based gel (PLgel)
o: Area (%) of given peak determined with silica-based column (Zorbax)
p: Area (%) for low-molecular-weight internal standard polystyrene (PS) determined with silica-based column (Zorbax)

Production Example 1

Into a temperature-controllable autoclave of 40 L inner volume equipped with a stirrer and a jacket used as a reactor, 2,220 g of 1,3-butadiene, 780 g of styrene, 21,000 g of cyclohexane, and polar substances consisting of 2 g of tetrahydrofuran (THF) and 2.72 g of 2,2-bis(2-oxolanyl) propane (BOP) were loaded, where impurities had been removed from the materials in advance, and the inner temperature of the reactor was retained at 43° C.

As a polymerization initiator, 1.17 g of n-butyllithium was fed to the reactor.

After the initiation of polymerization reaction, the temperature in the reactor began to elevate through heat generation due to polymerization, and ultimately reached 73° C.

Two minutes after the reaction temperature reached the peak, 0.67 g of silicon tetrachloride (Cup-1) was added to the reactor, and the resultant was subjected to coupling reaction for 10 minutes.

To the polymer solution, 11 g of n-octadecyl-3-(3,5-di-t-butyl-4-hydroxyphenyl)-propionate and 4.5 g of 4,6-bis(octylthiomethyl)-o-cresol as antioxidants were added to afford a polymer solution (A-1) containing a conjugated diene polymer (sample A).

Analysis of the sample A found that the bonded styrene content was 26% by mass and the bonded butadiene content was 74% by mass.

The vinyl bond content (1,2-bond content) of the microstructure of the butadiene moiety determined by calculation from measurement results with an infrared spectrometer in accordance with the Hampton's method was 55%.

Other analytical values are shown in Table 3.

Production Example 2

Into a temperature-controllable autoclave of 40 L inner volume equipped with a stirrer and a jacket used as a reactor, 2,220 g of 1,3-butadiene, 650 g of styrene, 21,250 g of cyclohexane, and polar substances consisting of 2 g of tetrahydrofuran (THF), 1.08 g of 2,2-bis(2-oxolanyl)propane (BOP), and 0.61 g of piperidine (Pip) were loaded, where impurities had been removed from the materials in advance, and the inner temperature of the reactor was retained at 55° C.

As a polymerization initiator, 0.45 g of n-butyllithium was fed to the reactor.

After the initiation of polymerization reaction, the temperature in the reactor began to elevate through heat generation due to polymerization, and ultimately reached 73° C.

Two minutes after the reaction temperature reached the peak, 0.22 g of 2,2-dimethoxy-1-(3-trimethoxysilylpropyl)-1-aza-2-silacyclopentane (Cup-1) was added to the reactor, and the resultant was subjected to coupling reaction for 10 minutes.

To the polymer solution, 9.2 g of n-octadecyl-3-(3,5-di-t-butyl-4-hydroxyphenyl)-propionate and 3.8 g of 4,6-bis (octylthiomethyl)-o-cresol as antioxidants were added to afford a polymer solution (B-1) containing a modified conjugated diene polymer (sample B).

Analysis of the sample B found that the bonded styrene content was 25% by mass and the bonded butadiene content was 75% by mass.

The vinyl bond content (1,2-bond content) of the microstructure of the butadiene moiety determined by calculation from measurement results with an infrared spectrometer in accordance with the Hampton's method was 54%.

Other analytical values are shown in Table 3.

Production Example 3

Into a temperature-controllable autoclave of 40 L inner volume equipped with a stirrer and a jacket used as a reactor, 2,220 g of 1,3-butadiene, 780 g of styrene, 21,000 g of cyclohexane, and polar substances consisting of 2 g of tetrahydrofuran (THF), 2.04 g of 2,2-bis(2-oxolanyl)propane (BOP), and 1.51 g of hexamethyleneimine (HMI) were loaded, where impurities had been removed from the materials in advance, and the inner temperature of the reactor was retained at 47° C.

As a polymerization initiator, 0.98 g of n-butyllithium was fed to the reactor.

After the initiation of polymerization reaction, the temperature in the reactor began to elevate through heat generation due to polymerization, and ultimately reached 73° C.

Two minutes after the reaction temperature reached the peak, 0.85 g of 2,2-dimethoxy-1-(3-trimethoxysilylpropyl)-1-aza-2-silacyclopentane (Cup-1) was added to the reactor, and the resultant was subjected to coupling reaction for 10 minutes.

To the polymer solution, 11 g of n-octadecyl-3-(3,5-di-t-butyl-4-hydroxyphenyl)-propionate and 4.5 g of 4,6-bis(octylthiomethyl)-o-cresol as antioxidants were added to afford a polymer solution (C-1) containing a modified conjugated diene polymer (sample C).

Analysis of the sample C found that the bonded styrene content was 25% by mass and the bonded butadiene content was 75% by mass.

The vinyl bond content (1,2-bond content) of the microstructure of the butadiene moiety determined by calculation from measurement results with an infrared spectrometer in accordance with the Hampton's method was 56%.

Other analytical values are shown in Table 3.

Production Example 4

Into a temperature-controllable autoclave of 40 L inner volume equipped with a stirrer and a jacket, as a reactor, 2,220 g of 1,3-butadiene, 780 g of styrene, 21,000 g of cyclohexane, and polar substances consisting of 2 g of tetrahydrofuran (THF), 2.72 g of 2,2-bis(2-oxolanyl)propane (BOP), and 1.83 g of piperidine (Pip) were loaded, where impurities had been removed from the materials in advance, and the inner temperature of the reactor was retained at 47° C.

As a polymerization initiator, 1.17 g of n-butyllithium was fed to the reactor.

After the initiation of polymerization reaction, the temperature in the reactor began to elevate through heat generation due to polymerization, and ultimately reached 73° C.

Two minutes after the reaction temperature reached the peak, 1.2 g of 2,2-dimethoxy-1-(3-trimethoxysilylpropyl)-1-aza-2-silacyclopentane (Cup-2) was added to the reactor, and the resultant was subjected to coupling reaction for 10 minutes.

To the polymer solution, 11 g of n-octadecyl-3-(3,5-di-t-butyl-4-hydroxyphenyl)-propionate and 4.5 g of 4,6-bis(octylthiomethyl)-o-cresol as antioxidants were added to afford a polymer solution (D-1) containing a modified conjugated diene polymer (sample D).

Analysis of the sample D found that the bonded styrene content was 26% by mass and the bonded butadiene content was 74% by mass.

The vinyl bond content (1,2-bond content) of the microstructure of the butadiene moiety determined by calculation from measurement results with an infrared spectrometer in accordance with the Hampton's method was 55%.

Other analytical values are shown in Table 3.

Production Example 5

Into a temperature-controllable autoclave of 40 L inner volume equipped with a stirrer and a jacket used as a reactor, 2,220 g of 1,3-butadiene, 780 g of styrene, 21,000 g of cyclohexane, and polar substances consisting of 2 g of tetrahydrofuran (THF), 2.72 g of 2,2-bis(2-oxolanyl)propane (BOP), and 1.83 g of piperidine (Pip) were loaded, where impurities had been removed from the materials in advance, and the inner temperature of the reactor was retained at 45° C.

As a polymerization initiator, 1.68 g of n-butyllithium was fed to the reactor.

After the initiation of polymerization reaction, the temperature in the reactor began to elevate through heat generation due to polymerization, and ultimately reached 74° C.

Two minutes after the reaction temperature reached the peak, 1.8 g of 2,2-dimethoxy-1-(3-trimethoxysilylpropyl)-1-aza-2-silacyclopentane (Cup-2) was added to the reactor, and the resultant was subjected to coupling reaction for 10 minutes.

To the polymer solution, 11 g of n-octadecyl-3-(3,5-di-t-butyl-4-hydroxyphenyl)-propionate and 4.5 g of 4,6-bis(octylthiomethyl)-o-cresol as antioxidants were added to afford a polymer solution (E-1) containing a modified conjugated diene polymer (sample E).

Analysis of the sample E found that the bonded styrene content was 26% by mass and the bonded butadiene content was 74% by mass.

The vinyl bond content (1,2-bond content) of the microstructure of the butadiene moiety determined by calculation from measurement results with an infrared spectrometer in accordance with the Hampton's method was 56%.

Other analytical values are shown in Table 3.

Production Example 6

Into a temperature-controllable autoclave of 40 L inner volume equipped with a stirrer and a jacket used as a reactor, 2,220 g of 1,3-butadiene, 780 g of styrene, 21,000 g of cyclohexane, and polar substances consisting of 2 g of tetrahydrofuran (THF), 4.87 g of 2,2-bis(2-oxolanyl)propane (BOP), and 3.84 g of piperidine (Pip) were loaded, where impurities had been removed from the materials in advance, and the inner temperature of the reactor was retained at 44° C.

As a polymerization initiator, 2.85 g of n-butyllithium was fed to the reactor.

After the initiation of polymerization reaction, the temperature in the reactor began to elevate through heat generation due to polymerization, and ultimately reached 77° C.

Two minutes after the reaction temperature reached the peak, 2.4 g of 2,2-dimethoxy-1-(3-trimethoxysilylpropyl)-1-aza-2-silacyclopentane (Cup-2) was added to the reactor, and the resultant was subjected to coupling reaction for 10 minutes.

To the polymer solution, 11 g of n-octadecyl-3-(3,5-di-t-butyl-4-hydroxyphenyl)-propionate and 4.5 g of 4,6-bis(octylthiomethyl)-o-cresol as antioxidants were added to afford a polymer solution (F-1) containing a modified conjugated diene polymer (sample F).

Analysis of the sample F found that the bonded styrene content was 27% by mass and the bonded butadiene content was 73% by mass.

The vinyl bond content (1,2-bond content) of the microstructure of the butadiene moiety determined by calculation from measurement results with an infrared spectrometer in accordance with the Hampton's method was 55%.

Other analytical values are shown in Table 3.

Production Example 7

Into a temperature-controllable autoclave of 40 L inner volume equipped with a stirrer and a jacket used as a reactor, 2,220 g of 1,3-butadiene, 780 g of styrene, 21,000 g of cyclohexane, and polar substances consisting of 2 g of tetrahydrofuran (THF), 7.0 g of 2,2-bis(2-oxolanyl)propane (BOP), and 6.64 g of hexamethyleneimine (HMI) were loaded, where impurities had been removed from the materials in advance, and the inner temperature of the reactor was retained at 41° C.

As a polymerization initiator, 4.05 g of n-butyllithium was fed to the reactor.

After the initiation of polymerization reaction, the temperature in the reactor began to elevate through heat generation due to polymerization, and ultimately reached 75° C.

Two minutes after the reaction temperature reached the peak, 3.6 g of 2,2-dimethoxy-1-(3-trimethoxysilylpropyl)-1-aza-2-silacyclopentane (Cup-2) was added to the reactor, and the resultant was subjected to coupling reaction for 10 minutes.

To the polymer solution, 11 g of n-octadecyl-3-(3,5-di-t-butyl-4-hydroxyphenyl)-propionate and 4.5 g of 4,6-bis(octylthiomethyl)-o-cresol as antioxidants were added to afford a polymer solution (G-1) containing a modified conjugated diene polymer (sample G).

Analysis of the sample G found that the bonded styrene content was 27% by mass and the bonded butadiene content was 73% by mass.

The vinyl bond content (1,2-bond content) of the microstructure of the butadiene moiety determined by calculation from measurement results with an infrared spectrometer in accordance with the Hampton's method was 56%.

Other analytical values are shown in Table 3.

Production Example 8

Into a temperature-controllable autoclave of 40 L inner volume equipped with a stirrer and a jacket used as a reactor, 2,220 g of 1,3-butadiene, 780 g of styrene, 21,000 g of cyclohexane, and polar substances consisting of 2 g of tetrahydrofuran (THF) and 11.1 g of 2,2-bis(2-oxolanyl)propane (BOP) were loaded, where impurities had been removed from the materials in advance, and the inner temperature of the reactor was retained at 40° C.

Piperidinolithium, which had been prepared as a polymerization initiator in advance by reacting 7.38 g of piperidine (Pip), 1.0 g of tetrahydrofuran, and 5.55 g of n-butyllithium, was totally fed to the reactor.

After the initiation of polymerization reaction, the temperature in the reactor began to elevate through heat generation due to polymerization, and ultimately reached 76° C.

Two minutes after the reaction temperature reached the peak, 5.9 g of 2,2-dimethoxy-1-(3-trimethoxysilylpropyl)-1-aza-2-silacyclopentane (Cup-2) was added to the reactor, and the resultant was subjected to coupling reaction for 10 minutes.

To the polymer solution, 11 g of n-octadecyl-3-(3,5-di-t-butyl-4-hydroxyphenyl)-propionate and 4.5 g of 4,6-bis(octylthiomethyl)-o-cresol as antioxidants were added to afford a polymer solution (H-1) containing a modified conjugated diene polymer (sample H).

Analysis of the sample H found that the bonded styrene content was 26% by mass and the bonded butadiene content was 74% by mass.

The vinyl bond content (1,2-bond content) of the microstructure of the butadiene moiety determined by calculation from measurement results with an infrared spectrometer in accordance with the Hampton's method was 55%.

Other analytical values are shown in Table 3.

Production Example 9

Into a temperature-controllable autoclave of 40 L inner volume equipped with a stirrer and a jacket used as a reactor, 2,220 g of 1,3-butadiene, 780 g of styrene, 21,000 g of cyclohexane, and polar substances consisting of 2 g of tetrahydrofuran (THF), 4.87 g of 2,2-bis(2-oxolanyl)propane (BOP), and 3.38 g of hexamethyleneimine (HMI) were loaded, where impurities had been removed from the materials in advance, and the inner temperature of the reactor was retained at 45° C.

As a polymerization initiator, 2.85 g of n-butyllithium was fed to the reactor.

After the initiation of polymerization reaction, the temperature in the reactor began to elevate through heat generation due to polymerization, and ultimately reached 77° C.

Two minutes after the reaction temperature reached the peak, 2.4 g of 2,2-dimethoxy-1-(3-trimethoxysilylpropyl)-1-aza-2-silacyclopentane (Cup-2) was added to the reactor, and the resultant was subjected to coupling reaction for 10 minutes.

To the polymer solution, 11 g of n-octadecyl-3-(3,5-di-t-butyl-4-hydroxyphenyl)-propionate and 4.5 g of 4,6-bis(octylthiomethyl)-o-cresol as antioxidants were added to afford a polymer solution (I-1) containing a modified conjugated diene polymer (sample I).

Analysis of the sample I found that the bonded styrene content was 26% by mass and the bonded butadiene content was 74% by mass.

The vinyl bond content (1,2-bond content) of the microstructure of the butadiene moiety determined by calculation from measurement results with an infrared spectrometer in accordance with the Hampton's method was 55%.

Other analytical values are shown in Table 3.

Production Example 10

Into a temperature-controllable autoclave of 40 L inner volume equipped with a stirrer and a jacket used as a reactor, 2,220 g of 1,3-butadiene, 780 g of styrene, 21,000 g of cyclohexane, and polar substances consisting of 2 g of tetrahydrofuran (THF), 4.87 g of 2,2-bis(2-oxolanyl)propane (BOP), and 3.84 g of piperidine (Pip) were loaded, where impurities had been removed from the materials in advance, and the inner temperature of the reactor was retained at 44° C.

As a polymerization initiator, 2.85 g of n-butyllithium was fed to the reactor.

After the initiation of polymerization reaction, the temperature in the reactor began to elevate through heat generation due to polymerization, and ultimately reached 77° C.

Five minutes after the reaction temperature reached the peak, 2 g of methanol was added to the reactor to terminate the reaction.

To the polymer solution, 11 g of n-octadecyl-3-(3,5-di-t-butyl-4-hydroxyphenyl)-propionate and 4.5 g of 4,6-bis(octylthiomethyl)-o-cresol as antioxidants were added to afford a polymer solution (J-1) containing a modified conjugated diene polymer (sample J).

Analysis of the sample J found that the bonded styrene content was 26% by mass and the bonded butadiene content was 74% by mass.

The vinyl bond content (1,2-bond content) of the microstructure of the butadiene moiety determined by calculation from measurement results with an infrared spectrometer in accordance with the Hampton's method was 55%.

Other analytical values are shown in Table 3.

Production Example 11

Into a temperature-controllable autoclave of 40 L inner volume equipped with a stirrer and a jacket used as a reactor, 2,220 g of 1,3-butadiene, 780 g of styrene, 21,000 g of cyclohexane, and polar substances consisting of 2 g of tetrahydrofuran (THF), 4.87 g of 2,2-bis(2-oxolanyl)propane (BOP), and 2.92 g of piperidine (Pip) were loaded, where impurities had been removed from the materials in advance, and the inner temperature of the reactor was retained at 45° C.

As a polymerization initiator, 0.82 g of n-butyllithium was fed to the reactor.

After the initiation of polymerization reaction, the temperature in the reactor began to elevate through heat generation due to polymerization, and ultimately reached 77° C.

Two minutes after the reaction temperature reached the peak, 2.4 g of 2,2-dimethoxy-1-(3-trimethoxysilylpropyl)-1-aza-2-silacyclopentane (Cup-2) was added to the reactor, and the resultant was subjected to coupling reaction for 10 minutes.

To the polymer solution, 11 g of n-octadecyl-3-(3,5-di-t-butyl-4-hydroxyphenyl)-propionate and 4.5 g of 4,6-bis(octylthiomethyl)-o-cresol as antioxidants were added to afford a polymer solution (K-1) containing a modified conjugated diene polymer (sample K).

Analysis of the sample K found that the bonded styrene content was 26% by mass and the bonded butadiene content was 74% by mass.

The vinyl bond content (1,2-bond content) of the microstructure of the butadiene moiety determined by calculation from measurement results with an infrared spectrometer in accordance with the Hampton's method was 55%.

Other analytical values are shown in Table 3.

Production Example 12

Into a temperature-controllable autoclave of 40 L inner volume equipped with a stirrer and a jacket used as a reactor, 2,550 g of 1,3-butadiene, 450 g of styrene, 21,000 g of cyclohexane, and polar substances consisting of 5 g of tetrahydrofuran (THF) and 0.69 g of 2,2-bis(2-oxolanyl)propane (BOP) were loaded, where impurities had been removed from the materials in advance, and the inner temperature of the reactor was retained at 51° C.

As a polymerization initiator, 1.62 g of n-butyllithium was fed to the reactor.

After the initiation of polymerization reaction, the temperature in the reactor began to elevate through heat generation due to polymerization, and ultimately reached 78° C.

Two minutes after the reaction temperature reached the peak, 1.4 g of 2,2-dimethoxy-1-(3-trimethoxysilylpropyl)-1-aza-2-silacyclopentane (Cup-2) was added to the reactor, and the resultant was subjected to coupling reaction for 10 minutes.

To the polymer solution, 11 g of n-octadecyl-3-(3,5-di-t-butyl-4-hydroxyphenyl)-propionate and 4.5 g of 4,6-bis(octylthiomethyl)-o-cresol as antioxidants were added to afford a polymer solution (L-1) containing a modified conjugated diene polymer (sample L).

Analysis of the sample L found that the bonded styrene content was 14% by mass and the bonded butadiene content was 86% by mass.

The vinyl bond content (1,2-bond content) of the microstructure of the butadiene moiety determined by calculation from measurement results with an infrared spectrometer in accordance with the Hampton's method was 29%.

Other analytical values are shown in Table 3.

Production Example 13

Into a temperature-controllable autoclave of 40 L inner volume equipped with a stirrer and a jacket, as a reactor, 2,550 g of 1,3-butadiene, 450 g of styrene, 21,000 g of cyclohexane, and polar substances consisting of 5 g of tetrahydrofuran (THF), 0.75 g of 2,2-bis(2-oxolanyl)propane (BOP), and 2.38 g of piperidine (Pip) were loaded, where impurities had been removed from the materials in advance, and the inner temperature of the reactor was retained at 53° C.

As a polymerization initiator, 1.05 g of n-butyllithium was fed to the reactor.

After the initiation of polymerization reaction, the temperature in the reactor began to elevate through heat generation due to polymerization, and ultimately reached 76° C.

Two minutes after the reaction temperature reached the peak, 1.3 g of 2,2-dimethoxy-1-(3-trimethoxysilylpropyl)-1-aza-2-silacyclopentane (Cup-2) was added to the reactor, and the resultant was subjected to coupling reaction for 10 minutes.

To the polymer solution, 11 g of n-octadecyl-3-(3,5-di-t-butyl-4-hydroxyphenyl)-propionate and 4.5 g of 4,6-bis(octylthiomethyl)-o-cresol as antioxidants were added to afford a polymer solution (M-1) containing a modified conjugated diene polymer (sample M).

Analysis of the sample M found that the bonded styrene content was 14% by mass and the bonded butadiene content was 86% by mass.

The vinyl bond content (1,2-bond content) of the microstructure of the butadiene moiety determined by calculation from measurement results with an infrared spectrometer in accordance with the Hampton's method was 30%.

Other analytical values are shown in Table 3.

Production Example 14

Into a temperature-controllable autoclave of 40 L inner volume equipped with a stirrer and a jacket used as a reactor, 2,550 g of 1,3-butadiene, 450 g of styrene, 21,000 g of cyclohexane, and polar substances consisting of 5 g of tetrahydrofuran (THF), 1.2 g of 2,2-bis(2-oxolanyl)propane (BOP), and 3.51 g of piperidine (Pip) were loaded, where impurities had been removed from the materials in advance, and the inner temperature of the reactor was retained at 48° C.

As a polymerization initiator, 2.6 g of n-butyllithium was fed to the reactor.

After the initiation of polymerization reaction, the temperature in the reactor began to elevate through heat generation due to polymerization, and ultimately reached 79° C.

Two minutes after the reaction temperature reached the peak, 2.8 g of 2,2-dimethoxy-1-(3-trimethoxysilylpropyl)-1-aza-2-silacyclopentane (Cup-2) was added to the reactor, and the resultant was subjected to coupling reaction for 10 minutes.

To the polymer solution, 11 g of n-octadecyl-3-(3,5-di-t-butyl-4-hydroxyphenyl)-propionate and 4.5 g of 4,6-bis(octylthiomethyl)-o-cresol as antioxidants were added to afford a polymer solution (N-1) containing a modified conjugated diene polymer (sample N).

Analysis of the sample N found that the bonded styrene content was 15% by mass and the bonded butadiene content was 85% by mass.

The vinyl bond content (1,2-bond content) of the microstructure of the butadiene moiety determined by calculation from measurement results with an infrared spectrometer in accordance with the Hampton's method was 31%.

Other analytical values are shown in Table 3.

Production Example 15

Into a temperature-controllable autoclave of 40 L inner volume equipped with a stirrer and a jacket used as a reactor, 2,220 g of 1,3-butadiene, 780 g of styrene, 21,000 g of cyclohexane, and polar substances consisting of 2 g of tetrahydrofuran (THF), 13.8 g of 2,2-bis(2-oxolanyl)propane (BOP), and 15.1 g of piperidine (Pip) were loaded, where impurities had been removed from the materials in advance, and the inner temperature of the reactor was retained at 41° C.

As a polymerization initiator, 11.46 g of n-butyllithium was fed to the reactor.

After the initiation of polymerization reaction, the temperature in the reactor began to elevate through heat generation due to polymerization, and ultimately reached 76° C.

Five minutes after the reaction temperature reached the peak, 7.6 g of methanol was added to the reactor to terminate the reaction.

To the polymer solution, 11 g of n-octadecyl-3-(3,5-di-t-butyl-4-hydroxyphenyl)-propionate and 4.5 g of 4,6-bis(octylthiomethyl)-o-cresol as antioxidants were added to afford a polymer solution (0-1) containing a modified conjugated diene polymer (sample 0).

Analysis of the sample 0 found that the bonded styrene content was 26% by mass and the bonded butadiene content was 74% by mass.

The vinyl bond content (1,2-bond content) of the microstructure of the butadiene moiety determined by calculation from measurement results with an infrared spectrometer in accordance with the Hampton's method was 55%.

Other analytical values are shown in Table 3.

The blending method and mass ratio are shown in Table 4, and analytical values for the blended sample are shown in Table 6.

TABLE 3

|  |  | Y031 | Production Example 1 Sample A | Production Example 2 Sample B | Production Example 3 Sample C | Production Example 4 Sample D | Production Example 5 Sample E | Production Example 6 Sample F | Production Example 7 Sample G | Production Example 8 Sample H |
|---|---|---|---|---|---|---|---|---|---|---|
| Polymerization initiator |  | — | nBL | Pip | HMI | Pip | Pip | Pip | HMI | Pip |
| Modifier |  | — | Cup1 | Cup2 | Cup2 | Cup2 | Cup2 | Cup2 | Cup2 | Cup2 |
| St content | (% by mass) | 26 | 26 | 25 | 25 | 26 | 26 | 27 | 27 | 26 |
| 1,2-Vinyl bond content | (%) | 56 | 55 | 54 | 56 | 55 | 56 | 55 | 56 | 55 |
| Peak molecular weight | Peak of lowest molecular weight | (×10,000) | 25 | 24 | 64 | 32 | 24 | 17 | 12 | 8 | 6 |
|  | Peak of highest molecular weight | (×10,000) | 84 | 72 | 173 | 102 | 72 | 49 | 30 | 20 | 16 |
| Coupling rate | (%) | 43 | 82 | 40 | 82 | 82 | 85 | 85 | 85 | 85 |
| Proportion of polymer chain(s) having nitrogen atom before addition of modifier | (%) | 0 | 0 | 78 | 83 | 83 | 83 | 85 | 87 | 95 |
| Proportion of polymer chain(s) having nitrogen atom after addition of modifier | (%) | 80 | 0 | 93 | 93 | 94 | 97 | 97 | 98 | 98 |
| Nitrogen content | (ppm) | 130 | 0 | 25 | 77 | 112 | 160 | 223 | 335 | 550 |

|  |  | Production Example 9 Sample I | Production Example 10 Sample J | Production Example 11 Sample K | Production Example 12 Sample L | Production Example 13 Sample M | Production Example 14 Sample N | Production Example 15 Sample O |
|---|---|---|---|---|---|---|---|---|
| Polymerization initiator |  | HMI | Pip | Pip | nBL | Pip | Pip | Pip |
| Modifier |  | Cup2 | — | Cup2 | Cup2 | Cup2 | Cup2 | — |
| St content | (% by mass) | 26 | 26 | 25 | 14 | 14 | 15 | 26 |
| 1,2-Vinyl bond content | (%) | 55 | 55 | 56 | 29 | 30 | 31 | 55 |
| Peak molecular weight | Peak of lowest molecular weight | (×10,000) | 12 | 12 | 12 | 19 | 24 | 12 | 3 |
|  | Peak of highest molecular weight | (×10,000) | 30 | — | 30 | 65 | 72 | 30 | — |
| Coupling rate | (%) | 85 | 0 | 85 | 80 | 80 | 80 | 0 |
| Proportion of polymer chain(s) having nitrogen atom before addition of modifier | (%) | 64 | 85 | 20 | 83 | 80 | 86 | 87 |
| Proportion of polymer chain(s) having nitrogen atom after addition of modifier | (%) | 94 | 85 | 88 | 96 | 95 | 97 | 87 |
| Nitrogen content | (ppm) | 177 | 180 | 80 | 38 | 115 | 220 | 803 |

The modifiers in Table 3 are as follows.
Pip: piperidine, HMI: hexamethyleneimine
Cup 1: silicon tetrachloride
Cup 2: 2,2-dimethoxy-1-(3-trimethoxysilylpropyl)-1-aza-2-silacyclopentane Next, the modified conjugated diene polymers in [Production Example 1] to [Production Example 15] were appropriately combined to produce blended samples.

Example 10

The polymer solution (A-1) obtained in [Production Example 1] and the polymer solution (F-1) obtained in [Production Example 6] were blended together so that the mass ratio between the sample A and the sample F satisfied sample A:sample F=40:60, and the blend was stirred for mixing to homogeneous state, from which the solvent was then removed through steam stripping and the residue was dried with a dryer to afford a blended sample.

Examples 11 to 25

Comparative Examples 6, 8, 9, and 12

Samples shown in Table 3 were blended together in the state of solution with a mass ratio shown in Table 4 in the same manner as in [Example 10], and the blend was stirred for mixing to homogeneous state, from which the solvent was then removed through steam stripping and the residue was dried with a dryer to afford a blended sample.

The blend methods and mass ratios in Examples and Comparative Examples are shown in Table 4.

Analytical values for the blended samples are shown in Table 6.

Example 26

Solvent was removed from each of the polymer solution (D-1) obtained in [Production Example 4] and the polymer solution (F-1) obtained in [Production Example 6] through steam stripping, and the residues were dried with a dryer to afford a sample D and a sample F.

Subsequently, the sample D and the sample F were kneaded together by using a sealed mixer with a mass ratio of 40:60 to afford a blended sample.

The blending method and mass ratio are shown in Table 4.

Analytical values for the blended sample are shown in Table 6.

Example 27

Solvent was removed from each of the polymer solution (D-1) obtained in [Production Example 4] and the polymer solution (G-1) obtained in [Production Example 7] through steam stripping, and the residues were dried with a dryer to afford a sample D and a sample G.

Subsequently, the sample D and the sample G were kneaded together by using a sealed mixer with a mass ratio of 60:40 to afford a blended sample.

The blending method and mass ratio are shown in Table 4.

Analytical values for the blended sample are shown in Table 6.

Comparative Example 10

Solvent was removed from the polymer solution (L-1) obtained in [Production Example 12] through steam stripping, and the residue was dried with a dryer to afford a blended sample as a single configuration.

The blending method and mass ratio are shown in Table 5.

Analytical values for the blended sample are shown in Table 7.

Example 28

The polymer solution (M-1) obtained in [Production Example 13] and the polymer solution (N-1) obtained in [Production Example 14] were blended together so that the mass ratio between the sample M and the sample N satisfied sample M:sample N=60:40, and the blend was stirred for mixing to homogeneous state, from which the solvent was then removed through steam stripping and the residue was dried with a dryer to afford a blended sample.

The blending method and mass ratio are shown in Table 5.

Analytical values for the blended sample are shown in Table 7.

TABLE 4

| | | Comparative Example 1 | Example 10 | Example 11 | Example 12 | Example 13 | Example 14 | Example 15 | Example 16 | Example 17 | Example 18 | Example 19 | Example 20 |
|---|---|---|---|---|---|---|---|---|---|---|---|---|---|
| Blending method | | — | solution | solution | solution | solution | solution | solution | solution | solution | solution | solution | solution |
| Y031 | (%) | 100 | 0 | 0 | 0 | 0 | 0 | 0 | 0 | 0 | 0 | 0 | 0 |
| Sample A | (%) | 0 | 40 | 70 | 0 | 0 | 0 | 0 | 0 | 0 | 0 | 0 | 0 |
| Sample B | (%) | 0 | 0 | 0 | 30 | 0 | 0 | 0 | 0 | 0 | 0 | 0 | 0 |
| Sample C | (%) | 0 | 0 | 0 | 0 | 20 | 80 | 60 | 40 | 20 | 0 | 0 | 0 |
| Sample D | (%) | 0 | 0 | 0 | 0 | 0 | 0 | 0 | 0 | 0 | 60 | 40 | 20 |
| Sample E | (%) | 0 | 0 | 0 | 0 | 80 | 20 | 0 | 0 | 0 | 0 | 0 | 0 |
| Sample F | (%) | 0 | 60 | 30 | 0 | 0 | 0 | 40 | 60 | 80 | 40 | 60 | 80 |
| Sample G | (%) | 0 | 0 | 0 | 0 | 0 | 0 | 0 | 0 | 0 | 0 | 0 | 0 |
| Sample H | (%) | 0 | 0 | 0 | 70 | 0 | 0 | 0 | 0 | 0 | 0 | 0 | 0 |
| Sample I | (%) | 0 | 0 | 0 | 0 | 0 | 0 | 0 | 0 | 0 | 0 | 0 | 0 |
| Sample J | (%) | 0 | 0 | 0 | 0 | 0 | 0 | 0 | 0 | 0 | 0 | 0 | 0 |
| Sample K | (%) | 0 | 0 | 0 | 0 | 0 | 0 | 0 | 0 | 0 | 0 | 0 | 0 |
| Sample O | (%) | 0 | 0 | 0 | 0 | 0 | 0 | 0 | 0 | 0 | 0 | 0 | 0 |

| | | Example 21 | Example 22 | Example 23 | Example 24 | Example 25 | Example 26 | Example 27 | Comparative Example 6 | Comparative Example 8 | Comparative Example 9 | Comparative Example 12 |
|---|---|---|---|---|---|---|---|---|---|---|---|---|
| Blending method | | solution | solution | solution | solution | solution | solid | solid | solution | solution | solution | solution |
| Y031 | (%) | 0 | 0 | 0 | 0 | 0 | 0 | 0 | 0 | 0 | 0 | 0 |
| Sample A | (%) | 0 | 0 | 0 | 0 | 0 | 0 | 0 | 0 | 0 | 0 | 80 |
| Sample B | (%) | 0 | 0 | 0 | 0 | 0 | 0 | 0 | 0 | 0 | 0 | 0 |
| Sample C | (%) | 0 | 0 | 0 | 40 | 0 | 0 | 0 | 93 | 0 | 0 | 0 |
| Sample D | (%) | 80 | 60 | 40 | 0 | 60 | 40 | 60 | 0 | 60 | 40 | 0 |
| Sample E | (%) | 0 | 0 | 0 | 0 | 0 | 0 | 0 | 0 | 0 | 0 | 0 |
| Sample F | (%) | 0 | 0 | 0 | 0 | 0 | 60 | 0 | 0 | 0 | 0 | 0 |
| Sample G | (%) | 20 | 40 | 60 | 60 | 0 | 0 | 40 | 7 | 0 | 0 | 0 |
| Sample H | (%) | 0 | 0 | 0 | 0 | 0 | 0 | 0 | 0 | 0 | 0 | 0 |
| Sample I | (%) | 0 | 0 | 0 | 0 | 40 | 0 | 0 | 0 | 0 | 0 | 0 |
| Sample J | (%) | 0 | 0 | 0 | 0 | 0 | 0 | 0 | 0 | 40 | 0 | 0 |

TABLE 4-continued

| | | | | | | | | | | | | |
|---|---|---|---|---|---|---|---|---|---|---|---|---|
| Sample K | (%) | 0 | 0 | 0 | 0 | 0 | 0 | 0 | 0 | 0 | 60 | 0 |
| Sample O | (%) | 0 | 0 | 0 | 0 | 0 | 0 | 0 | 0 | 0 | 0 | 20 |

TABLE 5

| | | Comparative Example 10 | Example 28 |
|---|---|---|---|
| Blending method | | — | solution |
| Sample L | (%) | 100 | 0 |
| Sample M | (%) | 0 | 60 |
| Sample N | (%) | 0 | 40 |

TABLE 6

| | | | Comp. Ex. 1 | Example 10 | Example 11 | Example 12 | Example 13 | Example 14 | Example 15 | Example 16 | Example 17 | Example 18 | Example 19 | Example 20 |
|---|---|---|---|---|---|---|---|---|---|---|---|---|---|---|
| Number of peaks | | | 3 | 3 | 4 | 4 | 3 | 3 | 3 | 3 | 3 | 3 | 3 | 3 |
| Molecular weight distribution | | | 1.60 | 1.41 | 1.48 | 2.59 | 1.34 | 1.46 | 1.74 | 1.67 | 1.50 | 1.44 | 1.42 | 1.40 |
| Peak molecular weight | Peak (A) | (×10,000) | 25 | 12 | 12 | 6 | 17 | 17 | 12 | 12 | 12 | 12 | 12 | 12 |
| | Peak (T) | (×10,000) | 42 | 30 | 30 | 16 | 49 | 49 | 30 | 30 | 30 | 30 | 30 | 30 |
| | Peak (B) | (×10,000) | 84 | 72 | 72 | 173 | 102 | 102 | 102 | 102 | 102 | 72 | 72 | 72 |
| Peak area ratio | Peak (A) | (%) | 50 | 5 | 4 | 7 | 11 | 5 | 6 | 9 | 11 | 5 | 7 | 10 |
| | Peak (T) | (%) | 35 | 66 | 37 | 68 | 73 | 30 | 48 | 63 | 74 | 44 | 57 | 71 |
| | Peak (B) | (%) | 15 | 29 | 59 | 10 | 16 | 65 | 46 | 28 | 15 | 51 | 36 | 19 |
| | Peak (B) + Peak (T) | (%) | 50 | 95 | 96 | 78 | 89 | 95 | 94 | 91 | 89 | 95 | 93 | 90 |
| St content for each peak | Peak (A) | (% by mass) | 26 | 26 | 26 | 25 | 25 | 25 | 25 | 25 | 25 | 26 | 26 | 26 |
| | Peak (B) | (% by mass) | 26 | 27 | 27 | 26 | 26 | 26 | 27 | 27 | 27 | 27 | 27 | 27 |
| Vinyl content for each peak | Peak (A) | (%) | 55 | 55 | 55 | 54 | 56 | 56 | 56 | 56 | 56 | 55 | 55 | 55 |
| | Peak (B) | (%) | 55 | 56 | 56 | 55 | 56 | 56 | 55 | 55 | 55 | 55 | 55 | 55 |
| Moony viscosity ($ML_{1+4}$ viscosity) | | | 55 | 60 | 85 | 72 | 61 | 92 | 84 | 64 | 52 | 74 | 62 | 52 |
| Proportion of modified polymer chain(s) in region ranging from low-molecular-weight side to point of 5% cumulative area | | (%) | 71 | 85 | 88 | 93 | 80 | 83 | 85 | 84 | 82 | 85 | 84 | 82 |
| Proportion of modified polymer chain(s) in peak (A) | | (%) | 75 | 85 | 85 | 95 | 83 | 83 | 85 | 85 | 85 | 85 | 85 | 85 |
| Proportion of modified polymer chain(s) in peak (B) | | (%) | 100 | 0 | 0 | 100 | 100 | 100 | 100 | 100 | 100 | 100 | 100 | 100 |
| Proportion of modified polymer chain(s) in modified conjugated diene polymer | | (%) | 82 | 58 | 29 | 96 | 96 | 96 | 95 | 95 | 96 | 95 | 96 | 96 |
| Nitrogen content | | (ppm) | 130 | 134 | 69 | 390 | 143 | 95 | 135 | 164 | 193 | 156 | 179 | 200 |

| | | | Example 21 | Example 22 | Example 23 | Example 24 | Example 25 | Example 26 | Example 27 | Comp. Ex. 6 | Comp. Ex. 8 | Comp. Ex. 9 | Comp. Ex. 12 |
|---|---|---|---|---|---|---|---|---|---|---|---|---|---|
| Number of peaks | | | 3 | 3 | 3 | 4 | 3 | 3 | 3 | 3 | 3 | 3 | 3 |
| Molecular weight distribution | | | 1.68 | 1.76 | 1.75 | 2.1 | 1.74 | 1.43 | 1.75 | 1.32 | 2.20 | 1.43 | 2.42 |
| Peak molecular weight | Peak (A) | (×10,000) | 8 | 8 | 8 | 8 | 12 | 12 | 8 | 8 | 12 | 12 | 3 |
| | Peak (T) | (×10,000) | 20 | 20 | 20 | 20 | 30 | 30 | 20 | 20 | 12 | 30 | 3 |
| | Peak (B) | (×10,000) | 72 | 72 | 72 | 102 | 72 | 72 | 72 | 72 | 72 | 72 | 72 |
| Peak area ratio | Peak (A) | (%) | 4 | 6 | 9 | 9 | 7 | 7 | 6 | 1 | 40 | 7 | 20 |
| | Peak (T) | (%) | 32 | 41 | 54 | 49 | 57 | 57 | 41 | 23 | 40 | 60 | 20 |
| | Peak (B) | (%) | 64 | 53 | 37 | 37 | 36 | 36 | 53 | 76 | 49 | 33 | 65 |
| | Peak (B) + Peak (T) | (%) | 96 | 94 | 91 | 86 | 93 | 93 | 94 | 99 | 89 | 93 | 85 |
| St content for each peak | Peak (A) | (% by mass) | 26 | 26 | 26 | 25 | 26 | 26 | 26 | 25 | 26 | 26 | 26 |
| | Peak (B) | (% by mass) | 27 | 27 | 27 | 27 | 26 | 27 | 27 | 27 | 26 | 25 | 26 |

TABLE 6-continued

| | | | | | | | | | | | | |
|---|---|---|---|---|---|---|---|---|---|---|---|---|
| Vinyl content for each peak | Peak (A) | (%) | 55 | 55 | 55 | 56 | 55 | 55 | 55 | 56 | 55 | 55 | 55 |
| | Peak (B) | (%) | 56 | 56 | 56 | 56 | 55 | 55 | 56 | 56 | 55 | 56 | 55 |
| Moony viscosity ($ML_{1+4}$ viscosity) | | | 79 | 66 | 47 | 65 | 65 | 65 | 68 | 101 | 42 | 59 | 61 |
| Proportion of modified polymer chain(s) in region ranging from low-molecular-weight side to point of 5% cumulative area | | (%) | 89 | 87 | 84 | 84 | 62 | 84 | 87 | 98 | 84 | 18 | 84 |
| Proportion of modified polymer chain(s) in peak (A) | | (%) | 87 | 87 | 87 | 87 | 64 | 85 | 87 | 87 | 85 | 20 | 87 |
| Proportion of modified polymer chain(s) in peak (B) | | (%) | 100 | 100 | 100 | 100 | 100 | 100 | 100 | 100 | 100 | 100 | 0 |
| Proportion of modified polymer chain(s) in modified conjugated diene polymer | | (%) | 95 | 96 | 96 | 96 | 94 | 96 | 96 | 93 | 92 | 96 | 16 |
| Nitrogen content | | (ppm) | 157 | 201 | 246 | 231 | 151 | 179 | 201 | 123 | 153 | 137 | 160 |

TABLE 7

| | | | Comparative Example 10 | Example 28 |
|---|---|---|---|---|
| Number of peaks | | | 2 | 3 |
| Molecular weight distribution | | | 1.27 | 1.66 |
| Peak molecular weight | Peak (A) | (×10,000) | 19 | 12 |
| | Peak (T) | (×10,000) | 19 | 30 |
| | Peak (B) | (×10,000) | 65 | 72 |
| Peak area ratio | Peak (A) | (%) | 20 | 5 |
| | Peak (T) | (%) | 20 | 44 |
| | Peak (B) | (%) | 80 | 51 |
| | Peak (B) + Peak (T) | (%) | 100 | 95 |
| St content for each peak | Peak (A) | (% by mass) | 14 | 14 |
| | Peak (B) | (% by mass) | 14 | 15 |
| Vinyl content for each peak | Peak (A) | (%) | 29 | 30 |
| | Peak (B) | (%) | 29 | 31 |
| Moony viscosity ($ML_{1+4}$ viscosity) | | | 71 | 63 |
| Proportion of modified polymer chain(s) in region ranging from low-molecular-weight side to point of 5% cumulative area | | (%) | 0 | 84 |
| Proportion of modified polymer chain(s) in peak (A) | | (%) | 0 | 86 |
| Proportion of modified polymer chain(s) in peak (B) | | (%) | 100 | 100 |
| Proportion of modified polymer chain(s) in modified conjugated diene polymer | | (%) | 96 | 96 |
| Nitrogen content | | (ppm) | 38 | 178 |

Any one of the modified conjugated diene polymers obtained in [Examples 10 to 27] and [Comparative Examples 6, 8, 9, and 12] and Y031 produced by Asahi Kasei Corporation in [Comparative Example 1] was used as a starting material rubber, and a modified conjugated diene polymer composition containing the corresponding starting material rubber was obtained in accordance with the formulation shown below.

Modified conjugated diene polymer (any one of Examples 10 to 27, and Comparative Examples 6, 8, 9, and 12): 100.0 parts by mass Silica (produced by Evonik Degussa GmbH, Ultrasil 7000 GR): 75.0 parts by mass Carbon black (produced by TOKAI CARBON CO., LTD., SEAST KH (N339)): 5.0 parts by mass Silane coupling agent (produced by Evonik Degussa GmbH, Si75): 6.0 parts by mass S-RAE oil (produced by Japan Energy Corporation, JOMO PROCESS NC140): 30.0 parts by mass Wax (produced by OUCHI SHINKO CHEMICAL INDUSTRIAL CO., LTD., Sunnoc N): 1.5 parts by mass Zinc flower: 2.5 parts by mass Stearic acid: 2.0 parts by mass Anti-aging agent (N-isopropyl-N'-phenyl-p-phenylenediamine): 2.0 parts by mass Sulfur: 1.8 parts by mass Vulcanization accelerator (N-cyclohexyl-2-benzothiazylsulfinamide): 1.7 parts by mass Vulcanization accelerator (diphenylguanidine): 2.0 parts by mass Total: 229.5 parts by mass The above materials were kneaded together in the following manner to afford a modified conjugated diene polymer composition.

As a first stage of kneading, a starting material rubber (any one of samples B-2 to K-2), the fillers (silica, carbon black), the silane coupling agent, the process oils (S-RAE oil, wax), zinc flower, and stearic acid were kneaded together by using a sealed kneader (inner volume: 0.3 L) equipped with a temperature controller at a filling rate of 65% and a rotor frequency of 50/57 rpm. At the kneading, the temperature of the sealed mixing machine was controlled so that the discharge temperature (blend) was 155 to 160° C. to afford a modified conjugated diene polymer composition.

Next, as a second stage of kneading, the thus-obtained blend was cooled to room temperature, the anti-aging agent was then added thereto, and the blend was kneaded again to improve the dispersion of silica. In this kneading, the discharge temperature (blend) was similarly adjusted to from 155 to 160° C. through temperature control for the mixing machine.

After cooling, as a third stage of kneading, kneading was performed by using an oven roll set at 70° C. with addition of sulfur and the vulcanization accelerators. The resultant was then molded, and vulcanized with a platen press at from 160° C. for 20 minutes.

After the vulcanization, the properties of the modified conjugated diene polymer composition were measured.

The measurement results for properties are shown in Tables 8 and 9.

The properties of the modified conjugated diene polymer composition, as a vulcanized product after being vulcanized as described above, were measured in the following manner.

(1) Composition Mooney Viscosity (Composition ML)

In accordance with JIS K 6300-1, a Mooney viscometer was pre-heated at 130° C. for 1 minute, thereafter a rotor was rotated at 2 rpm for 4 minutes and viscosity was then measured, and viscosities obtained for Examples 10 to 27 and Comparative Examples 6, 8, 9 and 12 were each converted to an index relative to a result for Comparative Example 1 as 100, and viscosity obtained for Example 28 was converted to an index relative to a result for Comparative Example 10 as 100.

A higher value indicates higher superiority in processability.

(2) Abrasion Resistance

In accordance with JIS K 6264-2, the amount of abrasion at a load of 44.1 N after 1,000 rotations was measured by using an AKRON abrasion tester (produced by YASUDA SEIKI SEISAKUSHO, LTD.), and the amounts of abrasion obtained for Examples 10 to 27 and Comparative Examples 6, 8, 9 and 12 were each converted to an index relative to a result for Comparative Example 1 as 100, and the amount of abrasion obtained for Example 28 was converted to an index relative to a result for Comparative Example 10 as 100.

A higher index indicates higher superiority in abrasion resistance.

(3) Viscoelasticity Parameter

A viscoelasticity tester (ARES) produced by Rheometric Scientific Inc. was used in a twist mode to measure a viscoelasticity parameter.

The measurements obtained for Examples 10 to 27 and Comparative Examples 6, 8, 9 and 12 were each converted to an index relative to a result for Comparative Example 1 as 100, and the measurement obtained for Example 28 was converted to an index relative to a result for Comparative Example 10 as 100.

Tan δ measured at 0° C. with a frequency of 10 Hz and a strain of 1% was used as an index of wet skid performance.

A higher value indicates better wet skid performance.

Tan δ measured at 50° C. with a frequency of 10 Hz and a strain of 3% was used as an index of a fuel-saving property. A higher value indicates lower hysteresis loss and better fuel-saving performance.

In Tables 8 and 9, wet skid performance is represented as "Wet", and a fuel-saving property as "RR".

TABLE 8

| | | | Comp. Ex. 1 | Ex. 10 | Ex. 11 | Ex. 12 | Ex. 13 | Ex. 14 | Ex. 15 | Ex. 16 | Ex. 17 | Ex. 18 | Ex. 19 | Ex. 20 | Ex. 21 |
|---|---|---|---|---|---|---|---|---|---|---|---|---|---|---|---|
| | Polymer used | | | | | | | | | | | | | | |
| Properties of composition | Composition Mooney viscosity | 90 or more | 100 | 110 | 97 | 100 | 103 | 91 | 93 | 105 | 117 | 98 | 109 | 114 | 94 |
| | Abrasion resistance | 85 or more | 100 | 92 | 96 | 110 | 94 | 113 | 93 | 90 | 87 | 97 | 95 | 91 | 102 |
| | Wet | 100 or more | 100 | 103 | 103 | 107 | 105 | 109 | 103 | 106 | 106 | 103 | 105 | 104 | 109 |
| | RR | 110 or more | 100 | 114 | 111 | 111 | 119 | 114 | 117 | 122 | 122 | 129 | 131 | 131 | 127 |

| | | | Ex. 22 | Ex. 23 | Ex. 24 | Ex. 25 | Ex. 26 | Ex. 27 | Comp. Ex. 6 | Comp. Ex. 8 | Comp. Ex. 9 | Comp. Ex. 12 |
|---|---|---|---|---|---|---|---|---|---|---|---|---|
| | Polymer used | | | | | | | | | | | |
| Properties of composition | Composition Mooney viscosity | 90 or more | 105 | 118 | 104 | 112 | 105 | 103 | 72 | 122 | 120 | 107 |
| | Abrasion resistance | 85 or more | 100 | 91 | 92 | 93 | 96 | 102 | 118 | 71 | 83 | 93 |
| | Wet | 100 or more | 109 | 111 | 110 | 104 | 104 | 108 | 109 | 99 | 98 | 100 |
| | RR | 110 or more | 126 | 123 | 112 | 118 | 123 | 122 | 107 | 109 | 98 | 91 |

TABLE 9

| | Polymer used | Comparative Example 10 | Example 28 |
|---|---|---|---|
| Properties of composition | Composition ML | 90 or more | 100 | 110 |
| | Abrasion resistance | 85 or more | 100 | 108 |
| | Wet | 100 or more | 100 | 117 |
| | RR | 110 or more | 100 | 126 |

As demonstrated from the results in Table 8, the modified conjugated diene polymer compositions in Examples 10 to 27 had superior balances between processability and abrasion resistance and between low hysteresis loss and wet skid resistance, and in contrast the modified conjugated diene polymer compositions in Comparative Examples 6, 8, 9, and 12 were poor in one or more of the performances. In addition, the modified conjugated diene polymer compositions in Examples 10 to 27 were confirmed to be sufficiently good for practical use in terms of prevention of powder generation in a modified conjugated diene polymer in dehydration drying, and cause a smaller amount of adhesion enough for practical use in production process.

As demonstrated from the results in Table 9, the modified conjugated diene polymer composition in Example 28 had superior balances between processability and abrasion resistance and between low hysteresis loss and wet skid resistance, in contrast to the modified conjugated diene polymer composition in Comparative Example 10. In addition, the modified conjugated diene polymer in Example 28 was confirmed to be sufficiently good for practical use in terms of prevention of powder generation in a modified conjugated diene polymer in dehydration drying, and cause a smaller amount of adhesion of a modified conjugated diene polymer enough for practical use in production process.

The present application is based on a Japanese patent application filed with Japan Patent Office on Sep. 23, 2016 (Japanese Patent Application No. 2016-185937), and the content is incorporated herein by reference.

INDUSTRIAL APPLICABILITY

The modified conjugated diene polymer according to the present invention exhibits superior low hysteresis loss and wet skid resistance when being processed into a vulcanized rubber, and is superior in processability in mixing with other components to produce a composition or in being processed into a vulcanized rubber, and hence can be suitably used as a material for various members such as tire treads, footwear, and products for industrial use.

The invention claimed is:

1. A modified conjugated diene polymer satisfying the following conditions (I) to (IV):
  (I) at least two peaks are observed in a molecular weight distribution curve obtained from measurement by gel permeation chromatography (GPC);
  (II) when a peak of the highest molecular weight is defined as a peak (B), a peak of the largest peak area except for the peak (B) is defined as a peak (T) in the molecular weight distribution curve, a peak molecular weight of the peak (B) is from 500,000 to 2,500,000 and a peak molecular weight of the peak (T) is from 150,000 to 600,000;
  (III) an area of the peak (T) is from 30% to 80% and a total value of an area of the peak (B) and the area of the peak (T) is 65% or more when the total area of the molecular weight distribution curve is defined as 100%; and
  (IV) a proportion of a modified polymer chain in a region ranging from a low-molecular-weight side to a point of 5% cumulative area is from 60% to 99% in the molecular weight distribution curve.

2. The modified conjugated diene polymer according to claim 1, satisfying the following conditions (1) to (4):
  (1) at least three peaks are observed in a molecular weight distribution curve obtained from measurement by gel permeation chromatography (GPC);
  (2) when a peak of the lowest molecular weight is defined as a peak (A), a peak of the highest molecular weight is defined as a peak (B) in the molecular weight distribution curve, a peak molecular weight of the peak (A) is from 50,000 to 200,000 and a peak molecular weight of the peak (B) is from 500,000 to 2,500,000;
  (3) an area of the peak (A) is from 3% to 15% when the total area of the molecular weight distribution curve is defined as 100%; and
  (4) a proportion of a modified polymer chain in the peak (A) is from 60% to 99% to the area of the peak (A).

3. The modified conjugated diene polymer according to claim 1, wherein the nitrogen content is from 60 ppm to 600 ppm.

4. The modified conjugated diene polymer according to claim 1, wherein
  a content of an aromatic vinyl compound is from 10 to 70% by mass, and
  a vinyl bond content of a conjugated diene-based compound moiety is from 25 to 70%.

5. The modified conjugated diene polymer according to claim 1, wherein a Mooney viscosity is from 40 to 90.

6. The modified conjugated diene polymer according to claim 1, wherein the proportion of the modified polymer chain contained in the modified conjugated diene polymer is from 40% to 99%.

7. The modified conjugated diene polymer according to claim 1, wherein a proportion of the modified polymer chain in the peak (B) is 60% or more to the area of the peak (B).

8. The modified conjugated diene polymer according to claim 1, wherein a molecular weight distribution (Mw/Mn) is from 1.2 to less than 2.5.

9. The modified conjugated diene polymer according to claim 1, wherein a content of an aromatic vinyl compound of polymer chains in the peak (B) is from 10 to 70% by mass and a vinyl bond content of a conjugated diene-based compound moiety is from 25 to 70%.

10. A modified conjugated diene polymer composition comprising:
  100 parts by mass of a rubber composition containing the modified conjugated diene polymer according to claim 1;
  1 part by mass to 150 parts by mass of a reinforcing filler; and
  0.1 parts by mass to 20 parts by mass in total of a vulcanizing agent and a vulcanization accelerator.

11. A tire comprising the modified conjugated diene polymer composition according to claim 10.

12. A method for producing the modified conjugated diene polymer according to claim 1, the method comprising (Step 1) to (Step 3):
  (Step 1) a step of forming a conjugated diene polymer by polymerization, the conjugated diene polymer having a peak molecular weight of from 50,000 to 200,000 in a molecular weight distribution curve obtained from measurement by gel permeation chromatography (GPC);

(Step 2) a step of adding at least two modifiers to the conjugated diene polymer to obtain a polymer solution containing a modified conjugated diene polymer; and (Step 3) a step of desolvating the polymer solution obtained in (Step 2).

13. A method for producing the modified conjugated diene polymer according to claim 1, the method comprising (Step A) to (Step D):

(Step A) a step of obtaining a polymer solution containing a high-molecular-weight conjugated diene polymer having a peak of peak molecular weight of from 500,000 to 2,500,000 in a molecular weight distribution curve obtained from measurement by gel permeation chromatography (GPC);

(Step B) a step of obtaining a polymer solution containing a low-molecular-weight modified conjugated diene polymer having a peak of peak molecular weight of from 50,000 to 200,000 in a molecular weight distribution curve obtained from measurement by gel permeation chromatography (GPC) and modified with a modifier having at least one nitrogen atom;

(Step C) a step of mixing the polymers obtained in (Step A) and (Step B) together with a mass ratio of (high-molecular-weight conjugated diene polymer):(low-molecular-weight modified conjugated diene polymer)= 15:85 to 85:15 to obtain a polymer mixture; and (Step D) a step of desolvating the polymer mixture obtained in (Step C) when the polymer mixture is a polymer solution.

* * * * *